United States Patent
Tanaka et al.

(10) Patent No.: US 12,041,344 B2
(45) Date of Patent: Jul. 16, 2024

(54) TRANSMITTING APPARATUS, RECEIVING APPARATUS, AND TRANSMISSION SYSTEM

(71) Applicant: Sony Semiconductor Solutions Corporation, Kanagawa (JP)

(72) Inventors: Kenya Tanaka, Kanagawa (JP);
Yoshiaki Matsubara, Kanagawa (JP);
Hideyuki Someya, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 290 days.

(21) Appl. No.: 17/609,628

(22) PCT Filed: May 19, 2020

(86) PCT No.: PCT/JP2020/019709
§ 371 (c)(1),
(2) Date: Nov. 8, 2021

(87) PCT Pub. No.: WO2020/261815
PCT Pub. Date: Dec. 30, 2020

(65) Prior Publication Data
US 2022/0239825 A1    Jul. 28, 2022

(30) Foreign Application Priority Data
Jun. 28, 2019   (JP) .................... 2019-121342

(51) Int. Cl.
*H04N 23/661* (2023.01)
*G06T 7/11* (2017.01)
(Continued)

(52) U.S. Cl.
CPC ............. *H04N 23/661* (2023.01); *G06T 7/11* (2017.01); *H04N 7/183* (2013.01); *H04N 23/80* (2023.01);
(Continued)

(58) Field of Classification Search
CPC ...... H04N 23/661; H04N 23/80; H04N 7/183; G06T 7/11; G06T 2207/20021; G06T 2207/20208
(Continued)

(56) References Cited

U.S. PATENT DOCUMENTS

2020/0333993 A1* 10/2020 Yoshimochi ........... G09G 5/006

FOREIGN PATENT DOCUMENTS

JP    2012-209831 A    10/2012
JP    2013-164834 A    8/2013
(Continued)

OTHER PUBLICATIONS

Subedar et al., "An Embedded Scaling-Based Arbitrary Shape Region-of-Interes Coding Method for JPEG2000", 2004, pp. 681-683 (Year: 2004).*
(Continued)

*Primary Examiner* — Joel W Fosselman
(74) *Attorney, Agent, or Firm* — Michael Best & Friedrich LLP

(57) ABSTRACT

It is an object to realize high dynamic range rendering of a partial region of interest (ROI) segmented from a captured image. A transmitting apparatus includes a controlling section that controls the acquisition of high dynamic range information as information for use in the high dynamic range rendering of image data of a ROI (Region of interest), and a transmitting section that sends out the image data of the ROI as payload data and sends out ROI information as embedded data.

18 Claims, 19 Drawing Sheets

(51) Int. Cl.
*H04N 7/18* (2006.01)
*H04N 23/80* (2023.01)

(52) U.S. Cl.
CPC ............... *G06T 2207/20021* (2013.01); *G06T 2207/20208* (2013.01)

(58) Field of Classification Search
USPC ..................................................... 348/222.1
See application file for complete search history.

(56) References Cited

FOREIGN PATENT DOCUMENTS

| | | |
|---|---|---|
| JP | 2014039170 A | 2/2014 |
| JP | 2014039219 A | 2/2014 |
| JP | 2016-201756 A | 12/2016 |
| JP | 2017531829 A | 10/2017 |
| WO | WO-2018155258 A1 | 8/2018 |
| WO | 2019/092952 A1 | 5/2019 |
| WO | 2019093072 A1 | 5/2019 |
| WO | WO-2019093072 A1 | 5/2019 |

OTHER PUBLICATIONS

International Search Report (PCT/ISA/210), International Application No. PCT/JP2020/019709, dated Jul. 13, 2020.

\* cited by examiner

ARRAY EXAMPLE B

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

| R | G | R | SHORT EXPOSURE |
| R | G | R | LONG EXPOSURE |

FIG.19

TRANSMITTING APPARATUS, RECEIVING APPARATUS, AND TRANSMISSION SYSTEM

TECHNICAL FIELD

The present disclosure relates to a transmitting apparatus, a receiving apparatus, and a transmission system.

BACKGROUND ART

In recent years, there have been growing applications in which large amounts of data are transmitted in bulk. Such applications tend to pose large loads on the transmission system, possibly causing the transmission system to go down is worst-case scenarios and fail to perform data transmission.

To avoid transmission system shutdowns, it has been known in the art to specify as object as an imaging target and transmit only a partial image of the specified object that has been segmented, rather than transmitting an entire captured image (see, for example, PTL 1 through PTL 4).

CITATION LIST

Patent Literature

[PTL 1]
  Japanese Patent Laid-open No. 2016-201756
[PTL 2]
  Japanese Patent Laid-open No. 2014-39219
[PTL 3]
  Japanese Patent Laid-open No. 2013-164834
[PTL 4]
  Japanese Patent Laid-open No. 2012-209831

SUMMARY

Technical Problem

Nothing has been examined about high dynamic range rendering is a case where a partial region of interest (ROI) segmented from a captured image is transmitted.

It is an object of the present disclosure to realize high dynamic range rendering of a partial region of interest (ROI) segmented from a captured image.

Solution to Problem

A transmitting apparatus according to an aspect of the present disclosure includes a controlling section that controls acquisition of high dynamic range information as information for use in high dynamic range rendering of image data of a ROI (Region of Interest), and a transmitting section that sends out the image data of the ROI as payload data and sends out ROI information as embedded data.

A receiving apparatus according to an aspect of the present disclosure includes a receiving section that receives a transmission signal including image data of a ROI (Region Of Interest) in payload data and including ROI information in embedded data, a controlling section that controls extraction of high dynamic range information as information for use in high dynamic range rendering of the image data of the ROI from the transmission signal received by the receiving section, and a processing section that processes the high dynamic range rendering of the image data of the ROI using the high dynamic range information extracted by the controlling section.

A transmission system according to an aspect of the present disclosure includes a transmitting apparatus including a controlling section that controls acquisition of high dynamic range information as information for use in high dynamic range rendering of image data of a ROI (Region of Interest), and a transmitting section that sends out the image data of the ROI as payload data and sends out ROI information as embedded data, and a receiving apparatus including a receiving section that receives a transmission signal including the image data of the ROI in the payload data and including the ROI information is the embedded data, a controlling section that controls extraction of the high dynamic range information as information for use in the high dynamic range rendering of the image data of the ROI from the transmission signal received by the receiving section, and a processing section that processes the high dynamic range rendering of the image data of the ROI using the high dynamic range information extracted by the controlling section.

BRIEF DESCRIPTION OF DRAWINGS

FIG. 17 is a diagram illustrating exposure patterns of image capturing elements segmented from an image capturing region illustrated in FIG. 16.

FIG. 18 is a diagram schematically illustrating as array example of a combination of exposure conditions and color arrays of image capturing elements provided in the image capturing region of an image capturing section.

FIG. 19 is a diagram illustrating exposure patterns PB1 through PB16 of the image capturing elements segmented from the array example B illustrated in FIG. 18.

DESCRIPTION OF EMBODIMENTS

Modes for carrying out the present disclosure will be described in detail hereinbelow with reference to the drawings. The description given below applies to specific examples of the present disclosure, and the present disclosure is not limited to the aspects illustrated below.

The modes for carrying out the technology according to the present disclosure (hereinafter referred to as "embodiments") will be described hereinbelow in the following order:

1. Technology 1 that is presupposed for the present disclosure (technology for transmitting a partial region (rectangular is shape) of interest (ROI) segmented from a captured image)
2. Technology 2 that is presupposed for the present disclosure (technology for transmitting a partial region (non-rectangular in shape) of interest (ROI) segmented from a captured image)
3. Principles of a high dynamic range rendering process in the first embodiment of the present disclosure
4. A transmitting apparatus, a receiving apparatus, and a transmission system according to the first embodiment of the present disclosure
5. Principles of a high dynamic range rendering process in a second embodiment of the present disclosure
6. A transmitting apparatus, a receiving apparatus, and a transmission system according to the second embodiment of the present disclosure 1. Technology 1 that is Presupposed for the Present Disclosure:

[Configuration]

In recent years, portable devices such as smartphones and camera devices have been handling progressively larger quantities of image data, and are required to speed up and consume less electric power for data transmission within themselves or between different devices. In order to meet such requirements, standardization is under way for high-speed interface standards such as C-PHY standards and D-PHY standards established by MIPI Alliance as connection interfaces for potable deices and camera devices. The C-PHY standards and D-PHY standards are interface standards for physical layers (PHY) of communication protocols. In addition, DSI for the displays of portable devices and CSI for camera devices are present as higher protocol layers than the C-PHY standards and D-PHY standards.

Figure 1:
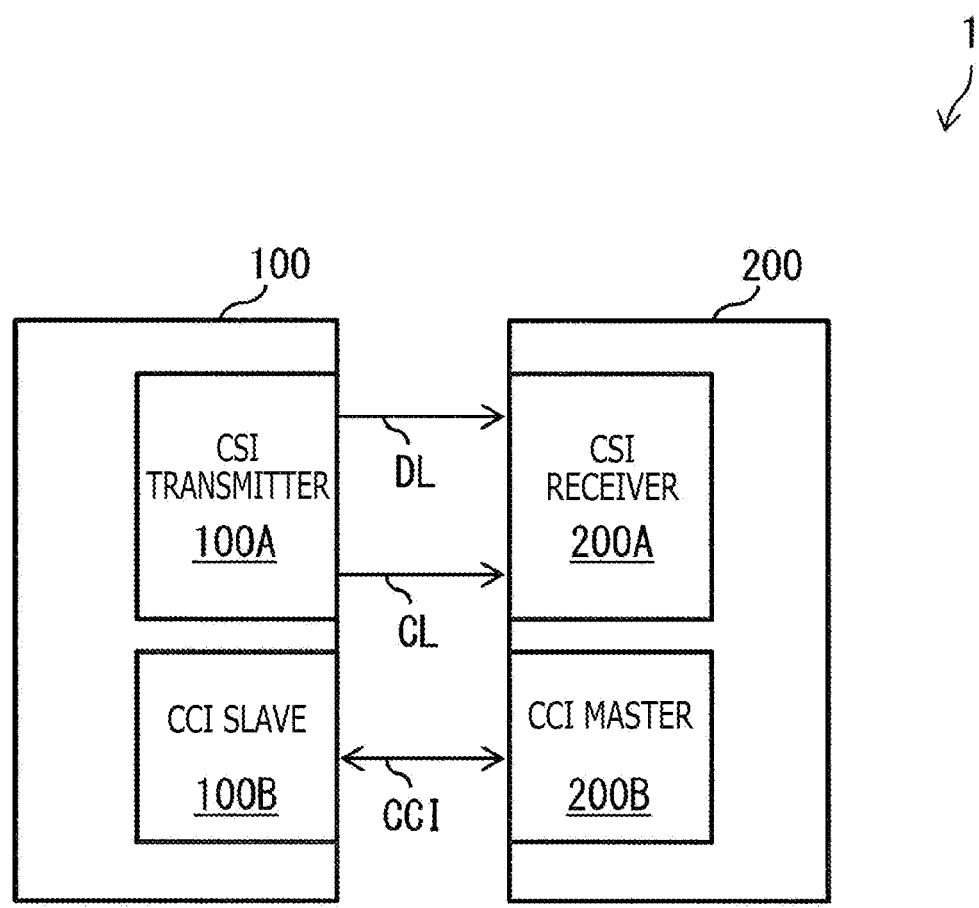
FIG. 1 is a diagram illustrating a general configurational example of a video transmission system.

A video transmission system 1 according to the technology that is presupposed for the present disclosure includes a system for transmitting and receiving signals according to various standards, and can transmit and receive signals according to the MIPI CSI-2 standards, the MIPI CSI-3 standards, or the MIPI DSI standards, for example. FIG. 1 illustrates a general configuration of the video transmission system 1 according to the technology that is presupposed for the present disclosure. The video transmission system 1 is applied to the transmission of data signals, clock signals, and control signals, and includes a video transmitting apparatus 100 and a video receiving apparatus 200. The video transmission system 1 includes a data lane DL for transmitting data signals representing image data etc., a clock lane CL for transmitting clock signals, and a camera control interface CCI for transmitting control signals, for example, between the video transmitting apparatus 100 and the video receiving apparatus 200. Though FIG. 1 illustrates an example in which one data lane DL is provided, a plurality of data lanes DL may be provided. The camera control interface CCI includes a bidirectional control interface compatible with the $I^2C$ (Inter-Integrated Circuit) standards.

The video transmitting apparatus 100 includes an apparatus for sending out signals according to the MIPI CSI-2 standards, the MIPI CSI-3 standards, or the MIPI DSI standards. The video transmitting apparatus 100 has a CSI transmitter 100A and a CCI slave 100B. The video receiving apparatus 200 has a CSI receiver 200A and a CCI master 200B. In the clock lane CL, the CSI transmitter 100A and the CSI receiver 200A are connected to each other by a clock signal line. In the data lane DL, the CSI transmitter 100A and the CSI receiver 200A are connected to each other by a clock signal line. In the camera control interface CCI, the CCI slave 100B and the CCI master 200B are connected to each other by a control signal line.

The CSI transmitter 100A includes a differential signal transmitting circuit for generating a differential clock signal as a clock signal and outputting the generated differential clock signal to the clock signal line, for example. The CSI transmitter 100A may not necessarily transmit a differential signal, but may transmit a single-ended or three-phase signal. The CSI transmitter 100A also includes a differential signal transmitting circuit for generating a differential data signal as a data signal and outputting the generated differential data signal to the data signal line, for example. The CSI receiver 200A includes a differential signal receiving circuit for receiving a differential clock signal as a clock signal and performing a predetermined processing process on the received differential clock signal. The CSI receiver 200A also includes a differential signal receiving circuit for receiving a differential data signal as a data signal and performing a predetermined processing process on the received differential data signal.

(Video Transmitting Apparatus 100)

Figure 2:
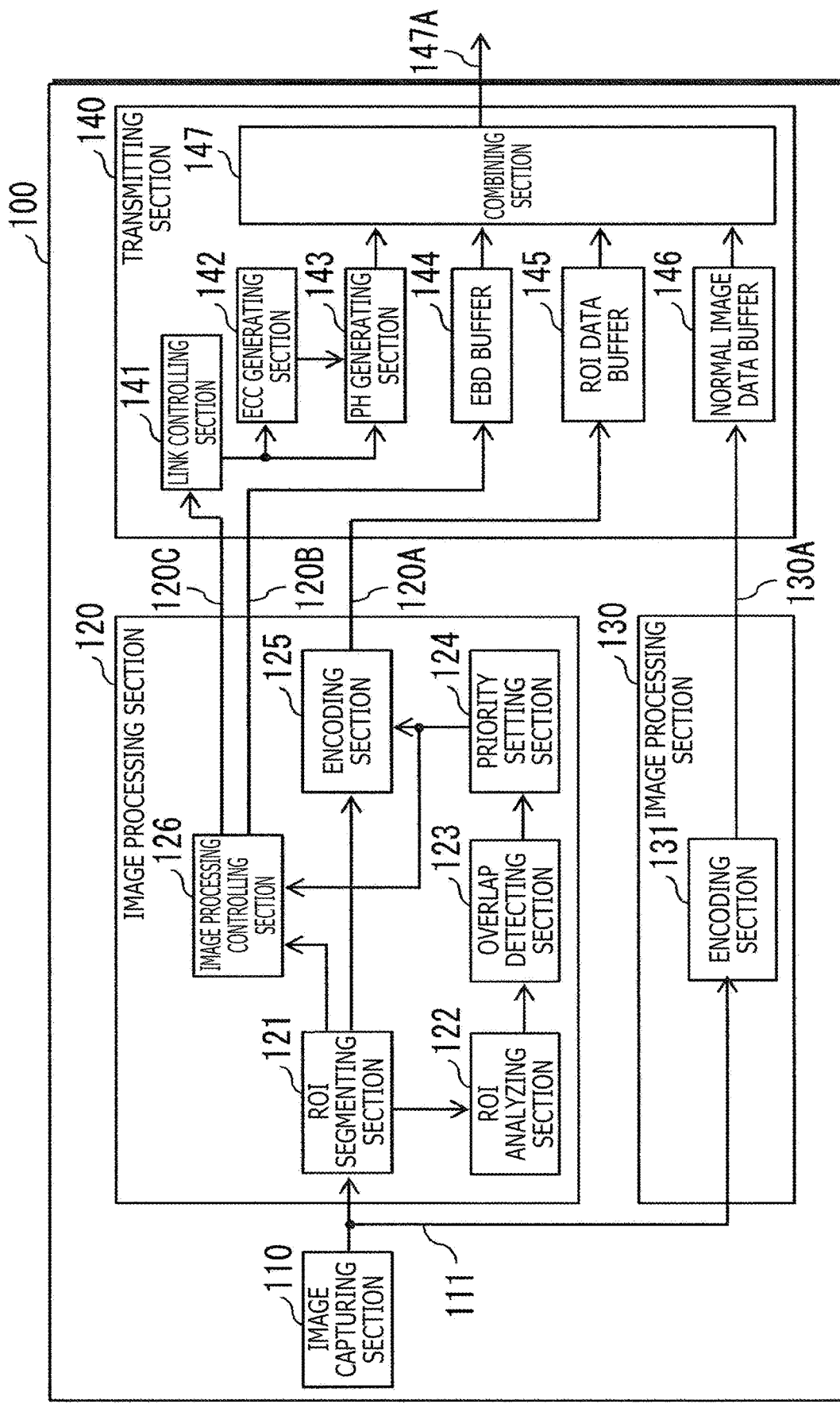
FIG. 2 is a diagram illustrating a general configurational example of a video transmitting apparatus illustrated in FIG. 1.
Figure 3:
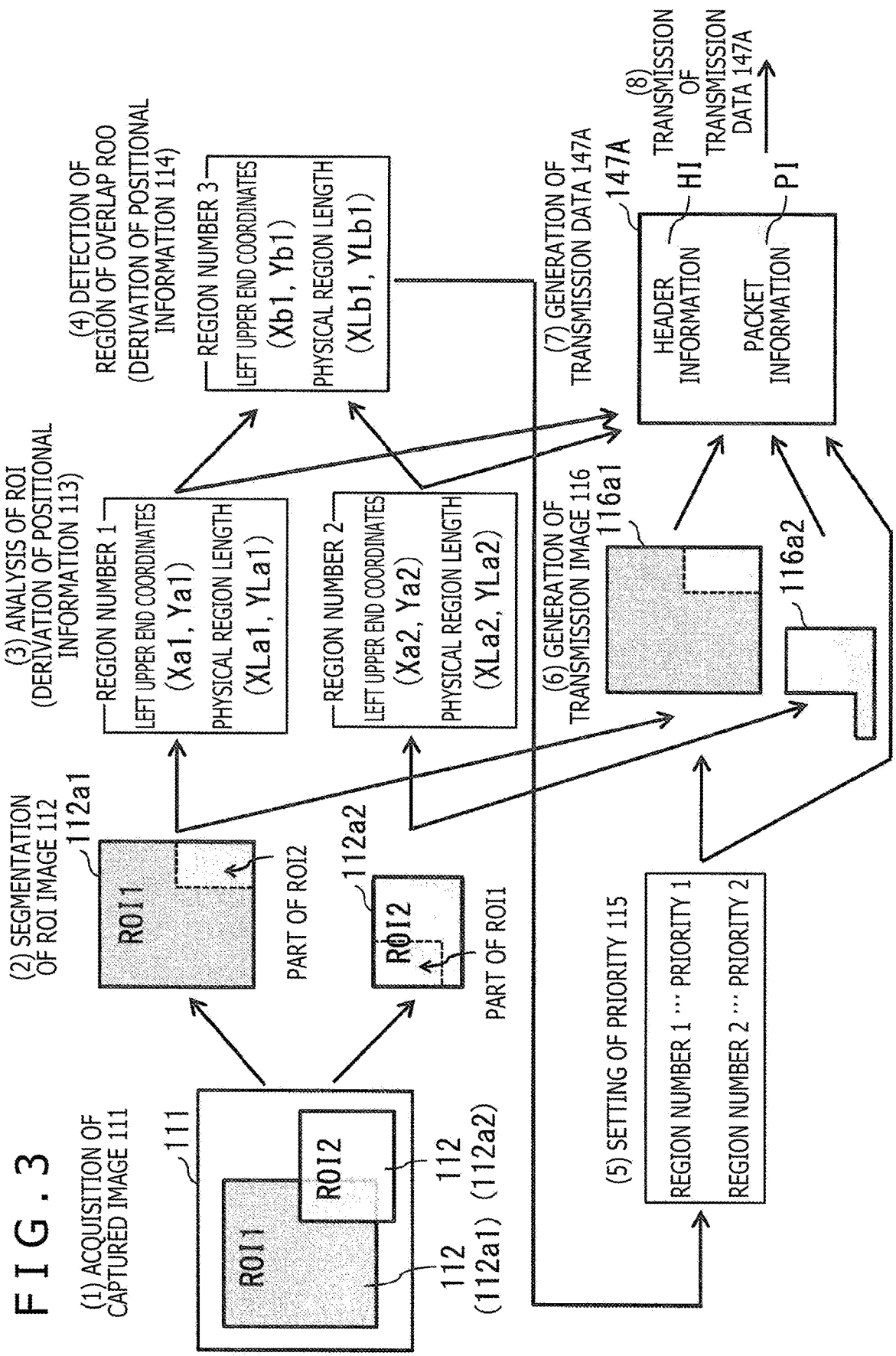
FIG. 3 is a diagram illustrating an example of a procedure for generating transmission data when two ROIs are included is a captured image.

FIG. 2 illustrates a configurational example of the video transmitting apparatus 100. The video transmitting apparatus 100 corresponds to a specific example of the CSI transmitter 100A. The video transmitting apparatus 100 includes an image capturing section 110, image processing sections 120 and 130, and a transmitting section 140, for example. The video transmitting apparatus 100 transmits transmission data 147A generated by performing a predetermined processing process on a captured image 111 obtained by the image capturing section 110 through the data line DL to the video receiving apparatus 200. FIG. 3 illustrates an example of a procedure for generating the transmission data 147A.

The image capturing section 110 converts an optical image obtained through an optical lens into image data, for example. The image capturing section 110 includes a CCD (Charge Coupled Device) image sensor or a CMOS (Complementary Metal Oxide Semiconductor) image sensor. The image capturing section 110 has an analog-to-digital converting circuit that converts analog image data into digital image data. The converted image data may be of a YCbCr data format that represents the colors of pixels with a luminance component Y and color difference components Cb and Cr, or may be of a RGB data format. The image capturing section 110 outputs the captured image 111 (digital image data) obtained by image capturing to the image processing section 120.

The image processing section 120 includes a circuit for performing a predetermined processing process on the captured image 111 input from the image capturing section 110. According to the presupposed technology 1, the image processing section 120 performs a predetermined processing process on the captured image 111 input from the image capturing section 110 in a case where a control signal instructing the image processing section 120 to segment ROIs is input from the video receiving apparatus 200 through the camera control interface CCI. However, the presupposed technology 1 is also applicable where the video transmitting apparatus 100, i.e., the transmission side, gives an instruction as to coordinates for segmenting ROIs. In this case, the transmission side receives information representing "persons" or "objects" to be acquired by ROIs sent out from the reception side, and makes a decision and gives an instruction as to segmenting coordinates, for example. The video receiving apparatus 200 thus generates various kinds of data (120A, 120B and 120C) and outputs them to the transmitting section 140. The image processing section 130 includes a circuit for performing a predetermined processing process on the captured image 111 input from the image capturing section 110. The image processing section 130 performs a predetermined processing process on the captured image 111 input from the image capturing section 110 in a case where a control signal instructing the image processing section 130 to output normal images is input from the video receiving apparatus 200 through the camera control interface CCI. The image processing section 130 thus generates image data 130A and outputs them to the transmitting section 140.

The image processing section 130 has an encoding section 131, for example. The encoding section 131 encodes the captured image 111 to generate compressed image data 130A. The image processing section 130 compresses the captured image 111 in a compression format that conforms to the JPEG (Joint Photographic Experts Group) standards, for example, as the format of the compressed image data 130A.

The image processing section 120 has a ROI segmenting section 121, a ROI analyzing section 122, an overlap detecting section 123, a priority setting section 124, an encoding section 125, and an image processing controlling section 126, for example.

The ROI segmenting section 121 specifies an image or a plurality of images as an imaging target or targets included in the captured image 111 input from the image capturing section 110, and establishes a region of interest ROI per specified object. A region of interest ROI refers to a square-shaped region including a specified object, for example. The ROI segmenting section 121 specifies an image of each region of interest ROI (for example, a ROI image 112 in FIG. 3) from the captured image 111. The ROI segmenting section 121 further assigns a region number as an identifier to each established region of interest ROI. For example, in a case where the ROI segmenting section 121 has established two regions of interest ROI in the captured image 111, the ROI segmenting section 121 assigns a region number 1 to one of the regions of interest ROI (for example, a region of interest ROI1 in FIG. 3) and assigns a region number 2 to the other region of interest ROI (for example, a region of interest ROI2 in FIG. 3). The ROI segmenting section 121 stores the assigned identifiers (region numbers) in a storage section, for example. For example, the ROI segmenting section 121 stores each ROI image 112 segmented from the captured image 111 in the storage section. Furthermore, for example, the ROI segmenting section 121 stores the identifier (region number) assigned to each region of interest ROI, in the storage section in association with the ROI image 112.

The ROI analyzing section 122 derives positional information 113 of each region of interest ROI in the captured image 111. The positional information 113 includes, for example, the left upper end coordinates (Xa, Ya) of the region of interest ROI, the length in an X-axis direction of the region of interest ROI, and the length in a Y-axis direction of the region of interest ROI. The length in the X-axis direction of the region of interest ROI refers, for example, to the physical region length XLa in the X-axis direction of the region of interest ROI. The length in the Y-axis direction of the region of interest ROI refers, for example, to the physical region length YLa in the Y-axis direction of the region of interest ROI. The physical region length represents the physical length, i.e., data length, of the region of interest ROI. The positional information 113 may include the coordinates of a position different from the left upper end of the region of interest ROI. The ROI analyzing section 122 stores the derived positional information in the storage section, for example. The ROI analyzing section 122 stores the derived positional information in the storage section in association with the identifier, i.e., region number, assigned to the region of interest ROI.

The ROI analyzing section 122 may further derive, as the positional information 113 per region of interest ROI, the output region length XLc in the X-axis direction of the region of interest ROI and the output region length YLc in the Y-axis direction of the region of interest ROI, for example. The output region length represents the physical length, i.e., data length, of the region of interest ROI after the resolution of the region of interest ROI has been changed by a decimating process or an addition of pixels, for example. The ROI analyzing section 122 may derive, for example, as the positional information 113 per region of interest ROI, sensing information, exposure information, gain information, AD (Analog-Digital) word length, image format, etc., for example, and store them in the storage section.

The sensing information refers to the contents of calculations about objects included in the region of interest ROI and additional information of a subsequent signal processing process on the ROI image 112. The exposure information refers to an exposure time of the region of interest ROI. The gain information refers to gain information of the region of interest ROI. The AD word length refers to the word length of data per pixel AD-converted in the region of interest ROI. The image format refers to the format of the image of the region of interest ROI. The ROI analyzing section 122 may, for example, derive the number of regions of interest ROI (the number of ROIs) included in the captured image 111 and store the number of ROIs in the storage section.

When a plurality of objects is specified as imaging targets in the captured image 111, the overlap detecting section 123 detects a region of overlap (ROO (Region of Overlap)) where two or more regions of interest ROI overlap each other on the basis of the positional information 113 of a plurality of regions of interest ROI in the captured image 111. Specifically, the overlap detecting section 123 derives positional information 114 of each region of overlap ROO in the captured image 111. The overlap detecting section 123 stores the derived positional information 114 in the storage section, for example. For example, the overlap detecting section 123 stores the derived positional information 114 in the storage section in corresponding relation to the region of overlap ROO. The region of overlap ROO refers to a square-shaped region identical or smaller in size to the smallest region of interest ROI among two or more regions of interest ROI that overlap each other. The positional information 114 includes, for example, the left upper end coordinates (Xb, Yb) of the region of overlap ROO, the length in the X-axis direction of the region of overlap ROO, and the length in the Y-axis direction of the region of overlap ROO. The length in the X-axis direction of the region of overlap ROO refers, for example, to the physical region length XLb. The length in the Y-axis direction of the region of overlap ROO refers, for example, to the physical region length YLb. The positional information 114 may include the coordinates of a position different from the left upper end of the region of interest ROI.

The priority setting section 124 assigns a priority 115 to each region of interest ROI in the captured image 111. The priority setting section 124 stores the assigned priority 115 in the storage section, for example. For example, the priority setting section 124 stores the assigned priority 115 in the storage section in corresponding relation to the region of interest ROI. The priority setting section 124 may assign a priority 115 to each region of interest ROI separately from the region number assigned to each region of interest ROI, or may use the region number assigned to each region of interest ROI instead of a priority 115. The priority setting section 124 may, for example, store the priority 115 in the storage section in association with the region of interest ROI or may store the region number assigned to each region of interest ROI in the storage section in association with the region of interest ROI.

The priority 115 refers to an identifier of each region of interest ROI, and represents discriminating information for discriminating which one of a plurality of regions of interest ROI in the captured image 111 a region of overlap ROO has been eliminated from. For example, the priority setting section 124 assigns "1" as a priority 115 to one of two regions of interest ROI each including a region of overlap ROO and assigns "2" as a priority 115 to the other region of interest ROI. In this case, a region of overlap ROO is eliminated with respect to a region of interest ROI where the numerical value of the priority 115 is larger in generating a transmission image 116 to be described later. Incidentally, the priority setting section 124 may assign the same number as the region number assigned to each region of interest ROI as a priority 115 to the region of interest ROI. For example, the priority setting section 124 stores the priority 115 assigned to each region of interest ROI in the storage section in association with the ROI image 112.

The encoding section 125 encodes each transmission image 116 to generate compressed image data 120A. The encoding section 125 compresses each transmission image 116 in a compress on format that conforms to the JPEG standards, for example, as the format of the compressed mage data 120A. Before performing the above compression process, the encoding section 125 generates each transmission image 116. In order that an image 118 of a region of overlap ROO will not overlappingly be included in a plurality of ROI images 112 obtained from the captured image 111, the encoding section 125 generates a plurality of transmission images 116 where the image 118 has been eliminated from the plurality of ROI images 112 obtained from the captured image 111.

The encoding section 125 determines which one of a plurality of ROI images 112 the image 118 is to be eliminated from, on the basis of the priority 115 assigned to each region of interest ROI, for example. The encoding section 125 may determine, for example, which one of a plurality of ROI images 112 the image 118 is to be eliminated from, by using the region number assigned to each region of interest ROI as a priority 115. The encoding section 125 uses the ROI image 112 as specified above from which the image 118 has been eliminated as a transmission image 116 (for example, a transmission image 116a2 in FIG. 3). The encoding section 125 uses the ROI image 112 that does not include a region of overlap ROO or the ROI image 112 which the image 118 has not been eliminated from as determined above, as a transmission image 116 (for example, a transmission image 116a1 in FIG. 3).

The image processing controlling section 126 generates ROI information 120B and frame information 120C and transmits them to the transmitting section 140. The ROI information 120B includes each positional information 113, for example. Furthermore, the ROI information 120B includes at least one of the data type of each region of interest ROI, the number of regions of interest ROI included in the captured image 111, the region number (or the priority 115) of each region of interest ROI, the data length of each region of interest ROI, and the image format of each region of interest ROI. The frame information 120C includes the number of a virtual channel assigned to each frame, the data type of each region of interest ROI, the payload length per line, etc., for example. The data type includes YUV data, RGB data, or RAW data, for example. Furthermore, the data type includes data of the ROI format, data of the normal format, etc., for example. The payload length represents the number of pixels included in the payload of a long packet, e.g., the number of pixels per region of interest ROI. The payload refers to major data (application data) transmitted between the video transmitting apparatus 100 and the video receiving apparatus 200. The long packet refers to a packet disposed between a packet header PH and a packet footer PF.

The transmitting section 140 includes a circuit for generating and sending out transmission data 147A on the basis of various kinds of data (data 120A, 120B, 120C and 130A) input from the image processing sections 120 and 130. The transmitting section 140 sends out the ROI information 120B regarding each region of interest ROI in the captured image 111 as embedded data. Furthermore, in a case where a control signal indicating the segmentation of ROIs is input from the video receiving apparatus 200 via the camera control interface CCI, the transmitting section 140 sends out the image data (compressed image data 120A) of each region of interest ROI as the payload data of a long packet. At this time, the transmitting section 140 sends out the image data (compressed image data 120A) of each region of interest ROI in a common virtual channel. Furthermore, the transmitting section 140 sends out the image data (compressed image data 120A) of each region of interest ROI as an image data frame, and sends out the ROI information 120B regarding each region of interest ROI as the header of an image data frame. Furthermore, in a case where a control signal indicating the outputting of a normal image is input from the video receiving apparatus 200 via the camera control interface CCI, the transmitting section 140 sends out normal image data (compressed image data 130A) as the payload data of a long packet.

The transmitting section 140 has a LINK controlling section 141, an ECC generating section 142, a PH generating section 143, an EBD buffer 144, a ROI data buffer 145, a normal image data buffer 146, and a combining section 147. In a case where a control signal indicating the segmentation of ROIs is input from the video receiving apparatus 200 via the camera control interface CCI, the LINK controlling section 141, the ECC generating section 142, the PH generating section 143, the EBD buffer 144, and the ROI data buffer 145 output data to the combining section 147. In a control signal indicating the outputting of a normal image is input from the video receiving apparatus 200 via the camera control interface CCI, the normal image data buffer 146 outputs data to the combining section 147.

It is noted that the ROI data buffer 145 may doubles as the normal image data buffer 146. In this case, the transmitting section 140 may have a selector for selecting the out from either one of the ROI data buffer 145 and the ROI data buffer 145, between the output terminals of the ROI data buffer 145 and the ROI data buffer 145 and an input terminal of the combining section 147.

Figure 4:
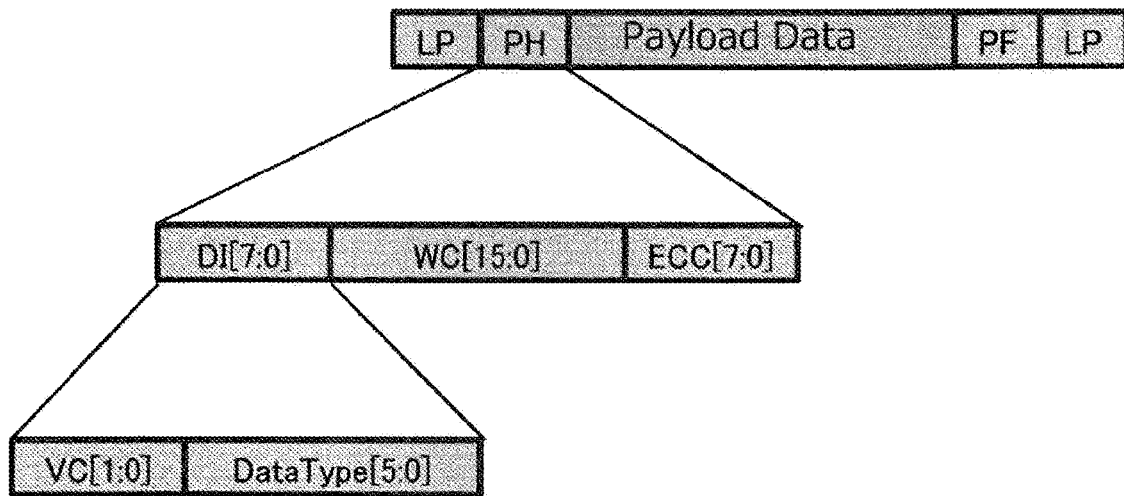
FIG. 4 is a diagram illustrating a configurational example of a packet header.

The LINK controlling section 141 outputs the frame information 120C per line to the LINK controlling section 141 and the ECC generating section 142, for example. The ECC generating section 142 generates an error correcting code for a line in the frame information 120C, for example, on the basis of the data of the line, e.g., the number of the virtual channel, the data type of each region of interest ROI, the payload length per line, etc. The ECC generating section 142 outputs the generated error correcting code to the PH generating section 143, for example. The PH generating section 143 generates a packet header PH per line using the frame information 120C and the error correcting code generated by the ECC generating section 142, for example. At this time, as illustrated in FIG. 4, for example, the packet header PH includes a packet header of the payload data of a long packet. The packet header PH includes DI, WC, and ECC, for example. WC represents an area for indicating the end of a packet with the number of words to the video receiving apparatus 200. WC includes a payload length, for example, and includes the number of pixels per region of interest ROI, for example. ECC represents an area for storing a value for correcting a bit error. ECC includes an error correcting code. DI represents an area for storing a data identifier. DI includes the number of a VC (virtual channel) and DataType (data type of each region of interest ROI). VC (virtual channel) refers to a concept introduced for flow control of packets and represents a mechanism for supporting a plurality of independent data streams that share one link. The PH generating section 143 outputs the generated packet header PH to the combining section 147.

The EBD buffer 144 primarily stores ROI information 120B and outputs the ROI information 120B as embedded data to the combining section 147. The embedded data refer to additional information that can be embedded in the header or footer of an image data frame (see FIG. 5 to be described later). The embedded data include ROI information 120B, for example.

The ROI data buffer 145 primarily stores compressed image data 120A and outputs the compressed image data 120A at predetermined timing as the payload data of a long packet to the combining section 147. In a case where a control signal indicating the segmentation of ROIs is input from the video receiving apparatus 200 via the camera control interface CCI, the ROI data buffer 145 out the compressed image data 120A as the payload data of a long packet to the combining section 147. The normal image data buffer 146 primarily stores compressed image data 130A and outputs the compressed image data 130A at predetermined timing as the payload data of a long packet to the combining section 147. In a case where a control signal indicating the outputting of a normal image is input from the video receiving apparatus 200 via the camera control interface CCI, the normal image data buffer 146 outputs the compressed image data 130A as the payload data of a long packet to the combining section 147.

In a case where a control signal indicating the outputting of a normal image is input from the video receiving apparatus 200 via the camera control interface CCI, the combining section 147 generates transmission data 147A on the basis of input data (compressed image data 130A). The combining section 147 outputs the generated transmission data 147A to the video receiving apparatus 200 via the data lane DL. On the other hand, in a case where a control signal indicating the segmentation of ROIs is input from the video receiving apparatus 200 via the camera control interface CCI, the combining section 147 generates transmission data 147A on the basis of various input data (a packet header PH, ROI information 120B, and compressed image data 120A). The combining section 147 outputs the generated transmission data 147A to the video receiving apparatus 200 via the data lane DL. Specifically, the combining section 147 includes DataType (data type of each region of interest ROI) in the packet header PH of the payload data of a long packet and sends out the data. Furthermore, the combining section 147 sends out image data (compressed image data 120A) of each region of interest ROI in a common virtual channel.

Figure 5:
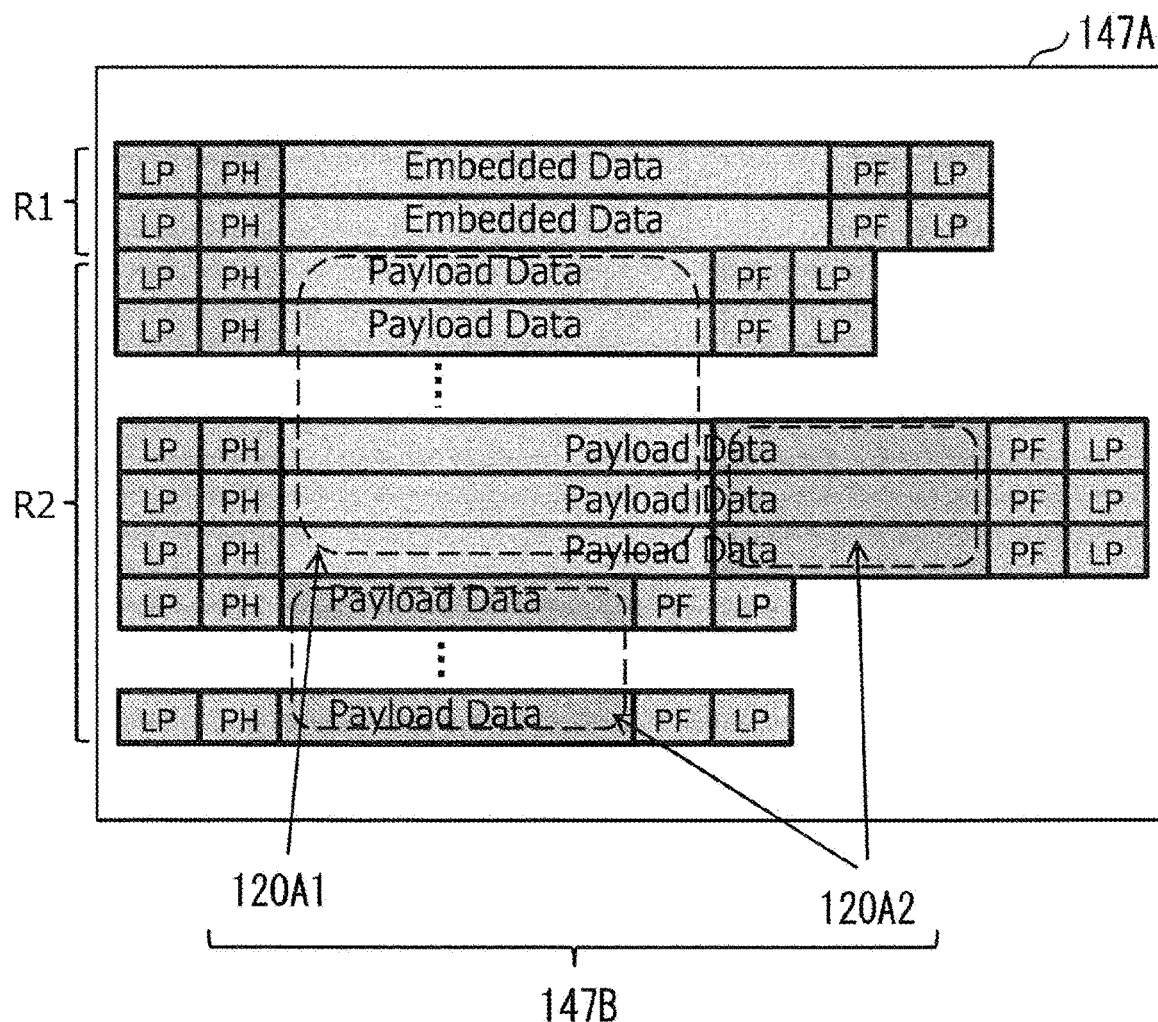
FIG. 5 is a diagram illustrating a configurational example of transmission data.

The transmission data 147A include an image data frame as illustrated in FIG. 5, for example. The image data frame normally has a header area, a packet area, and a footer area. In FIG. 5, the footer area is omitted from illustration for the sake of convenience. The frame header area R1 of the transmission data 147A includes embedded data. At this time, the embedded data include ROI information 120B. In FIG. 5, the packet area R2 of the transmission data 147A includes the payload data of a long packet per line, and also include a packet header PH and a packet footer PF at positions sandwiching the payload data of a long packet. Furthermore, the packet area R2 includes low power modes LP at positions sandwiching the packet header PH and the packet footer PF.

At this time, the packet header PH includes DI, WC, and ECC, for example. WC includes a payload length, for example, and includes the number of pixels per region of interest ROI, for example. ECC includes an error correcting code. DI includes the number of a VC (virtual channel) and DataType (data type of each region of interest ROI). According to the present embodiment, the number of a common virtual channel is assigned to a VC of each line. In FIG. 5, the packet area R2 of the transmission data 147A includes compressed image data 147B. The compressed image data 147B includes one compressed image data 120A or a plurality of compressed image data 120A. Here in FIG. 5, a packet group closer to the packet header PH includes compressed image data 120A (120A1) of the transmission image 116a1 in FIG. 3, and a packet group remoter from the packet header PH includes compressed image data 120A (120A2) of the transmission image 116a2 in FIG. 3. These two compressed image data 120A1 and 120A2 make no the compressed image data 147B. The payload data of a long packet of each line include one line of pixel data in the compressed image data 147B.

Figure 6:
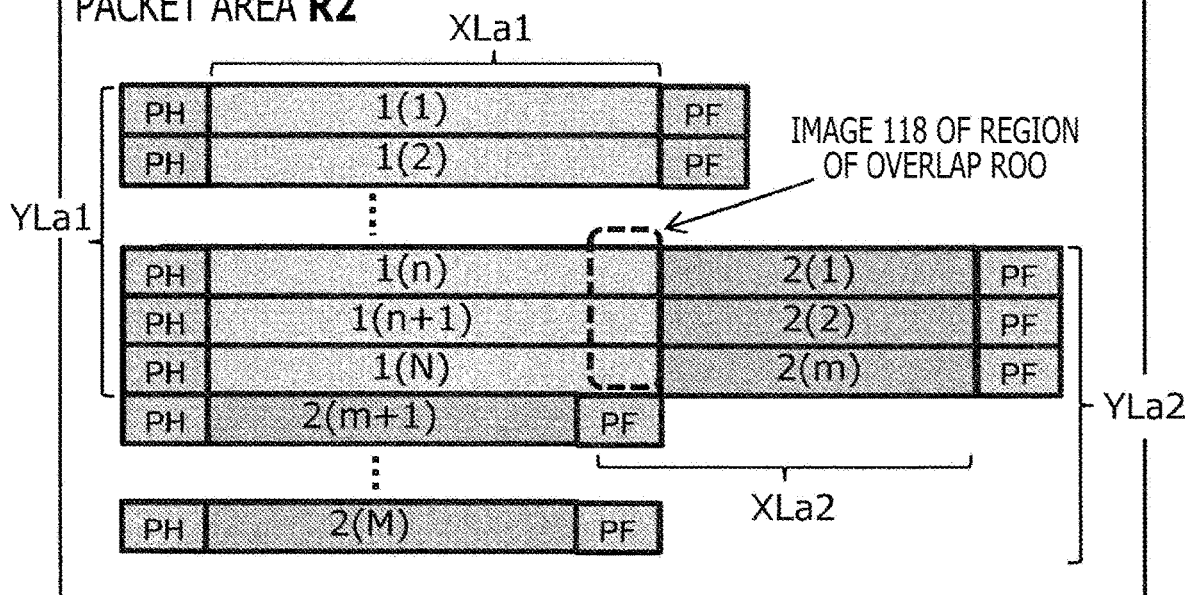
FIG. 6 is a diagram illustrating a configurational example of transmission data.

FIG. 6 illustrates a configurational example of the transmission data 147A. The transmission data 147A include a frame header area R1 and a packet area R2, for example. Incidentally, FIG. 6 illustrates details of the contents of the frame header area R1. Furthermore, low power modes LP are omitted from illustration in FIG. 6.

The frame header area R1 includes a frame number F1 as an identifier of the transmission data 147A, for example. The frame header area R1 includes information regarding compressed image data 147B included in the packet area R2. The frame header area R1 includes, for example, the number of compressed image data 120A (the number of ROIs) included in the compressed image data 147B and information regarding the ROI image 112 (ROI information 120B) corresponding to each compressed image data 120A included in the compressed image data 147B.

The combining section 147 divides and places compressed image data 147B per pixel row of compressed image data 120A in the packet area R2 of the transmission data 147A, for example. Therefore, the packet area R2 of the transmission data 147A does not include overlapping compressed image data corresponding to an image 118 of a region of overlap ROO. Furthermore, the combining section 147 has eliminated therefrom a pixel row not corresponding to each transmission image 116 of the captured image 111 in the packet area R2 of the transmission data 147A, for example. Consequently, the packet area R2 of the transmission data 147A does not include a pixel row not corresponding to each transmission image 116 of the captured image 111. Incidentally, in the packet area R2 in FIG. 6, a zone surrounded by the broken line corresponds to compressed image data of an image 118 of a region of overlap ROO.

The boundary between a packet group closer to the packet header PH (for example, 1(n) in FIG. 6) and a packet group remoter from the packet header PH (for example, 2(1) in FIG. 6) is specified by the physical region length XLa1 of the ROI image 112 corresponding to the compressed image data of the packet group closer to the packet header PH (for example, 1(n) in FIG. 6). A packet starting position in the compressed image data corresponding to an image 118 of a region of overlap ROO included in a packet group closer to the packet header PH (for example, 1(n) in FIG. 6) is specified by the physical region length XLa2 of the ROI image 112 corresponding to a packet group remoter from the packet header PH (for example, 2(1) in FIG. 6).

Figure 7:
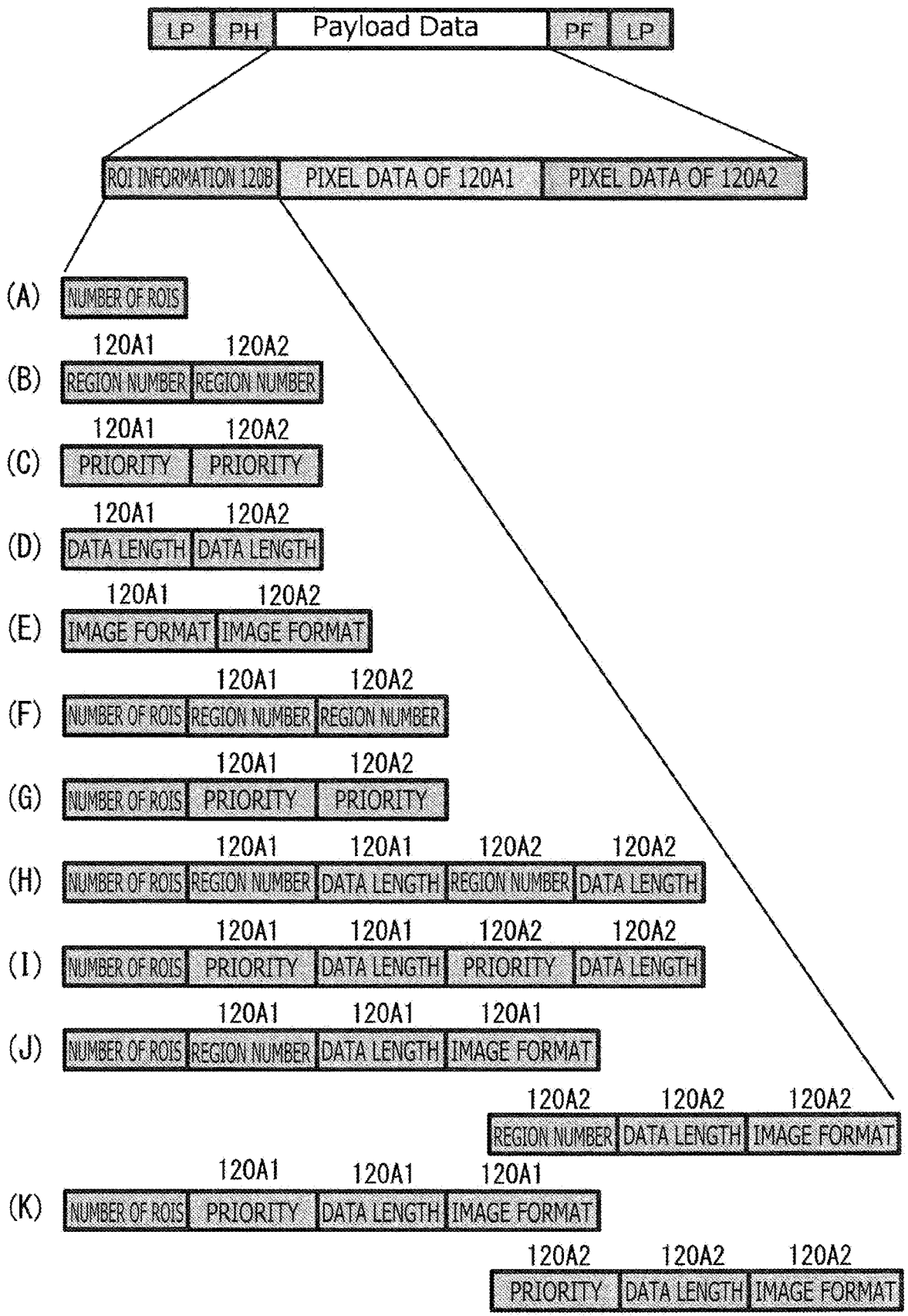
FIG. 7 is a diagram illustrating a configurational example of the payload data of a long packet.

When the payload data of a long packet is to be generated per line in the packet area R2 of the transmission data 147A, for example, the combining section 147 may include ROI information 120B, as illustrated in FIG. 7, for example, other than pixel data of one line in the compressed image data 147B, in the payload data of the long packet. In other words, the combining section 147 may include ROI information 120B in the payload data of a long packet and output the data. At this time, as illustrated in FIG. 7(A) to FIG. 7(K), the ROI information 120B includes at least one of the number of regions of interest ROI (the number of ROIs) included in the captured image 111, the region number (or the priority 115) of each region of interest ROI, the data length of each region of interest ROI, and the image format of each region of interest ROI. The ROI information 120B should preferably be placed in the payload data of a long packet at the end on the packet header PH side (i.e., the leading end of the payload data of the long packet).

(Video Receiving Apparatus 200)

Figure 8:
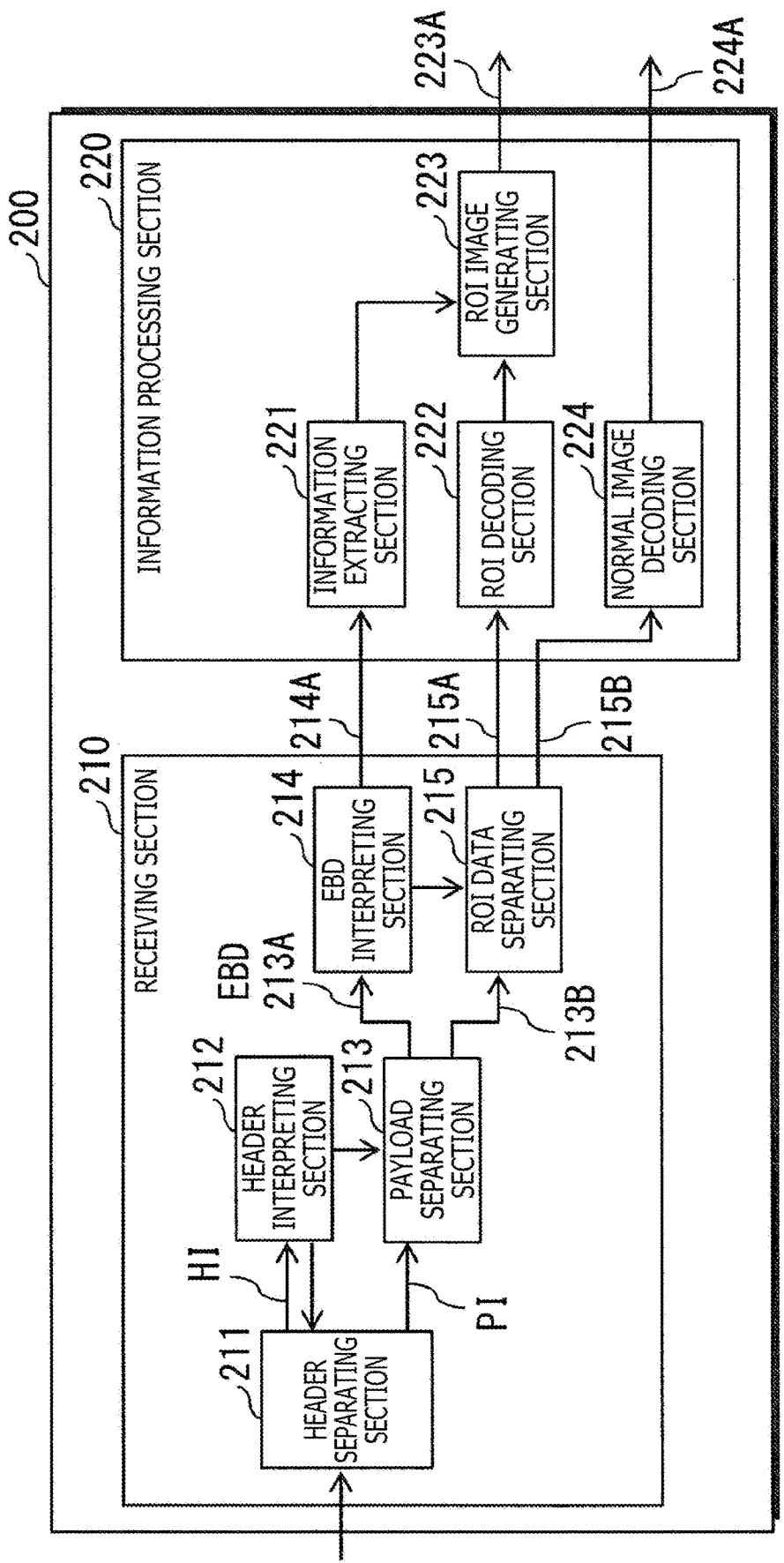
FIG. 8 is a diagram illustrating a general configurational example of a video receiving apparatus illustrated in FIG. 1.
Figure 9:
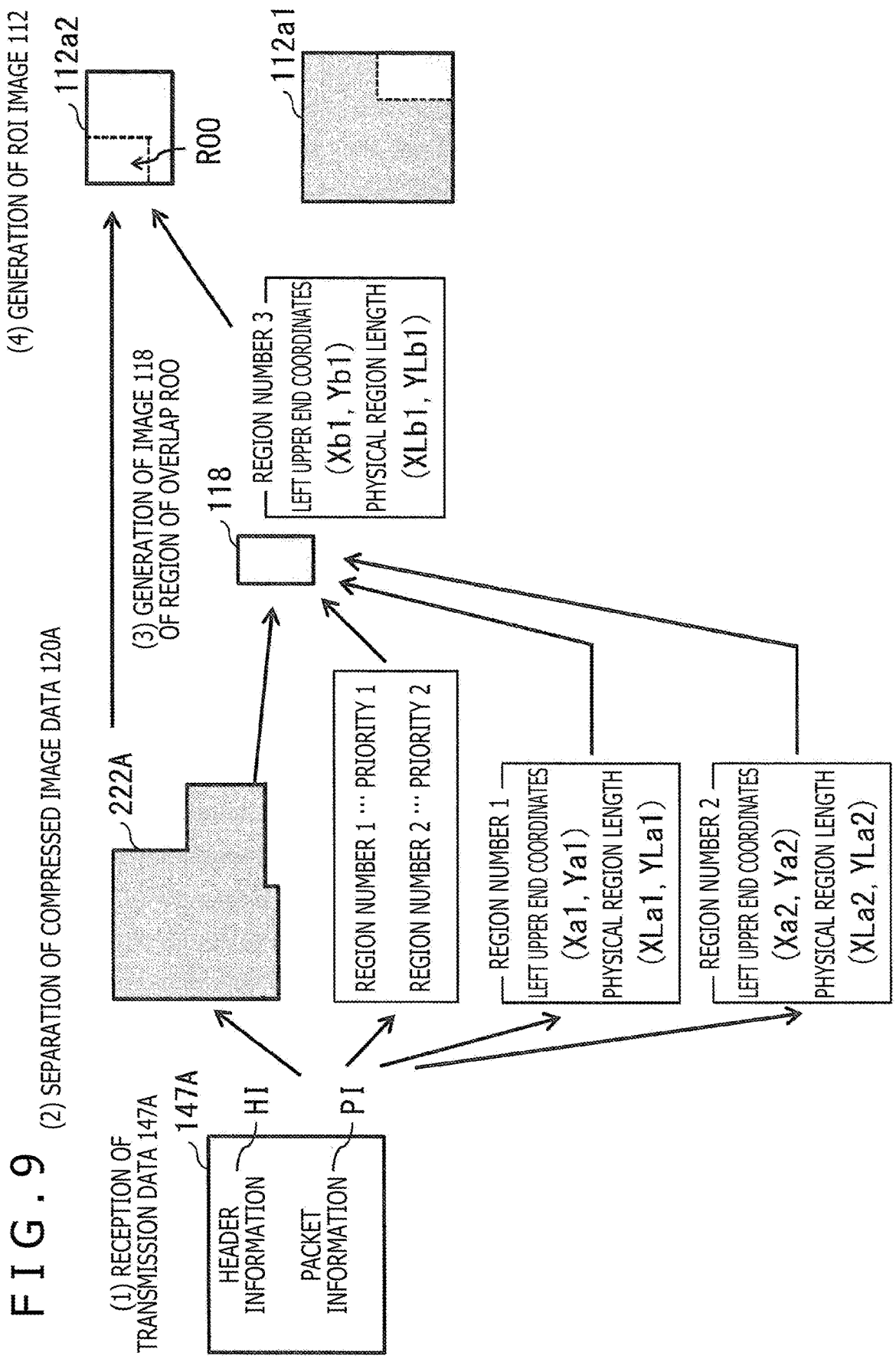
FIG. 9 is a diagram illustrating an example of a procedure for generating two ROI images included in a captured image when two images are included in transmission data.

Next, the video receiving apparatus 200 will be described below. FIG. 8 illustrates a configurational example of the video receiving apparatus 200. FIG. 9 illustrates an example of a procedure for generating a ROI image 223A is the video receiving apparatus 200. The video receiving apparatus 200 includes an apparatus for receiving signals according to standards common to the video transmitting apparatus 100 (for example, the MIPI CSI-2 standards, the MIPI CSI-3 standards, or the MIPI DSI standards). The video receiving apparatus 200 has a receiving section 210 and an information processing section 220. The receiving section 210 includes a circuit for receiving transmission data 147A output from the video transmitting apparatus 100 via the data lane DL, performing a predetermined process on the received transmission data 147A to generate various kinds of data (214A, 215A and 215B), and outputting the generated data to the information processing section 220. The information processing section 220 includes a circuit for generating a ROI image 223A based on various kinds of data (214A and 215A) received from the receiving section 210 and generating a normal image 224A based on data (215B) received from the receiving section 210.

The receiving section 210 has, for example, a header separating section 211, a header interpreting section 212, a payload separating section 213, an EBD interpreting section 214, and a ROI data separating section 215.

The header separating section 211 receives transmission data 147A from the video transmitting apparatus 100 via the data lane DL. Specifically, the header separating section 211 receives transmission data 147A including ROI information 120B regarding each region of interest ROI in the captured image 111 in embedded data and also including image data (compressed image data 120A) of each region of interest ROI in the payload data of a long packet. The header separating section 211 separates the received transmission data 147A into a frame header area R1 and a packet area R2. The header interpreting section 212 specifies the positions of the payload data of long packets included in the packet area R2 on the basis of data (specifically, embedded data) included in the frame header area R1. The payload separating section 213 separates the payload data of the long packets included in the packet area R2 from the packet area R2 on the basis of the positions of the payload data of the long packets that have been specified by the header interpreting section 212.

The EBD interpreting section 214 outputs the embedded data as EBD data 214A to the information processing section 220. Furthermore, the EBD interpreting section 214 discriminates whether the image data included in the payload data of the long packets are the compressed image data 120A of the image data 116 of a ROI or the compressed image data 130A of normal image data, from the data type included in the embedded data. The EBB interpreting section 214 outputs the discriminated result to the ROI data separating section 215.

If the image data included in the payload data of the long packets are the compressed image data 120A of the image data 116 of a ROI, then the ROI data separating section 215 outputs the payload data of the long packet as payload data 215A to the information processing section 220 (specifically, a ROI decoding section 222). If the image data included in the payload data are the compressed image data 130A, then the ROI data separating section 215 outputs the payload data of the long packet as payload data 215A to the information processing section 220 (specifically, a normal image decoding section 224). In a case where the payload data of the long packet include the ROI information 120B, the payload data 215A include the ROI information 120B and one line of pixel data of the compressed image data 147B.

The information processing section 220 extracts the ROI information 120B from the embedded data included in the EBD data 214A. The information processing section 220 extracts an image of each region of interest ROI (ROI image 112) in the captured image 111 from the payload data of the long packet included in the transmission data 147A received by the receiving section 210 on the basis of the ROI information 120B extracted by an information extracting section 221. The information processing section 220 has, for example, the information extracting section 221 the ROI decoding section 222, a ROI image generating section 223, and the normal image decoding section 224.

The normal image decoding section 224 decodes the payload data 215B to generate a normal image 224A. The ROI decoding section 222 decodes the compressed image data 147B included in the payload data 215A to generate image data 222A. The image data 222A represent one transmission image 116 or a plurality of transmission images 116.

The information extracting section 221 extracts the ROI information 120B from the embedded data included in the EBD data 214A. For example, the information extracting section 221 extracts the number of regions of interest ROI included in the captured image 111, the region number (or the priority 115) of each region of interest ROI, the data length of each region of interest ROI, and the image format of each region of interest ROI, for example, from the embedded data included in the EBD data 214A. In other words, the transmission data 147A include the region number (or the priority 115) of a region of interest ROI corresponding to each transmission image 116 as discriminating information for discriminating which one of a plurality of transmission images 116 obtained from the transmission data 147A an image 118 of a region of overlap ROO has been eliminated from.

The ROI image generating section 223 detects a region of overlap ROO where two or more regions of interest ROI overlap each other on the basis of the ROI information 120B obtained by the information extracting section 221.

The information extracting section 221 extracts, for example, coordinates (for example, left upper end coordinates (Xa1, Ya1)), lengths (for example, physical region lengths XLa1 and YLa1), and a region number 1 (or a priority 115 (=1)) of a region of interest ROI corresponding to a ROI image 112a1 from the embedded data included in the EBD data 214A. Furthermore, the information extracting section 221 extracts, for example, coordinates (for example, left upper end coordinates (Xa2, Ya2)), lengths (for example, physical region lengths XLa2, YLa2), and a region number 2 (or a priority 115 (=2)) of a region of interest ROI corresponding to a ROI image 112a2 from the embedded data included in the EBD data 214A.

At this time, the ROI image generating section 223 derives positional information 114 of the region of overlap ROO based on these extracted pieces of information (hereinafter referred to as "extracted information 221A"). The ROI image generating section 223 derives, for example, coordinates (for example, left upper end coordinates Xb1, Yb1) and lengths (for example, physical region lengths XLb1 and YLb1) of the region of overlap ROO as the positional information 114 of the region of overlap ROO.

Incidentally, the ROI image generating section 223 may acquire the ROI information 120B from the payload data 215A instead of acquiring the ROI information 120 from the embedded data included in the EBD data 214A. In this case, the ROI image generating section 223 may detect a region of overlap ROO where two or more regions of interest ROI overlap each other on the basis of the ROI information 120 included in the payload data 215A. Furthermore, the ROI image generating section 223 may extract the extracted information 221A from the ROI information 120B included in the payload data 215A, and may derive the positional information 114 of a region of overlap ROO based on the extracted information 221A thus extracted.

Moreover, the ROI image generating section 223 generates an image (ROI images 112a1 and 112a2) of each region of interest ROI in the captured image 111 on the basis of the image data 222A, the extracted information 221A, and the positional information 114 of the region of overlap ROO. The ROI image generating section 223 outputs the generated images as a ROI image 223A.

[Procedure]

Next, an example of a procedure for transmitting data in the video transmission system 1 will be described below with reference to FIGS. 3 and 9.

First, the image capturing section 110 outputs a captured image 111 (digital image data) obtained by image capturing to the image processing section 120. The ROI segmenting section 121 specifies two regions of interest ROI1 and ROI2 included in the captured image 111 input from the image capturing section 110. The ROI segmenting section 121 segments images of the respective regions of interest ROI1 and ROI2 (ROI images 112a1 and 112a2) from the captured image 111. The ROI segmenting section 121 assigns a region number 1 as an identifier to toe region of interest ROI1 and assigns a region number 2 as an identifier to the region of interest ROI2.

The ROI analyzing section 122 derives positional information 113 of each region of interest ROI in the captured image 111. The ROI analyzing section 122 derives left upper coordinates (Xa1, Ya1) of the region of interest ROI1, a length (XLa1) in the X-axis direction of the region of interest ROI1, and a length (YLa1) in the Y-axis direction of the region of interest ROI1 on the basis of the region of interest ROI1. The ROI analyzing section 122 derives left upper coordinates (Xa2, Ya2) of the region of interest ROI2, a length (XLa2) in the X-axis direction of the region of interest ROI2, and a length (YLa2) in the Y-axis direction of the region of interest ROI2 on the basis of the region of interest ROI2.

The overlap detecting section 123 detects a region of overlap ROO where the two regions of interest ROI1 and ROI2 overlap each other on the basis of the positional information 113 of the two regions of interest ROI1 and ROI2 in the captured image 111. Specifically, the overlap detecting section 123 derives positional information 114 of the region of overlap ROO in the captured image 111. The overlap detecting section 123 derives left upper coordinates (Xb1, Yb1) of the region of overlap ROO, a length (XLb1) in the X-axis direction of the region of overlap ROO, and a length (YLb1) in the Y-axis direction of the region of overlap ROO as the positional information 114 of the region of overlap ROO in the captured image 111.

The priority setting section 124 assigns "1" as a priority 115 to the region of interest ROI1 that is one of the two regions of interest ROI1 and ROI2, and assigns "2" as a priority 115 to the other region of interest ROI2.

The encoding section 125 generates two transmission images 116a1 and 116a2 where an image 118 of the region of overlap ROO has been eliminated from the two ROI images 112a1 and 112a2 obtained from the captured image 111, in order that the image 118 will not overlappingly be included in the two regions of interest ROI1 and ROI2.

The encoding section 125 determines which one of the two ROI images 112a1 and 112a2 the image 118 is to be eliminated from on the basis of region numbers (or the priority 115) of the two regions of interest ROI1 and ROI2.

The encoding section 125 eliminates the image 118 from the ROI image 112a2 corresponding to the region of interest ROI2 whose region number (or the priority 115) is larger among the two regions of interest ROI1 and ROI2, thereby generating a transmission image 116a2. The encoding section 125 uses the ROI image 112a1 itself corresponding to the region of interest ROI1 whose region number (or the priority 115) is smaller among the two regions of interest ROI1 and ROI2, as a transmission image 116a1.

The image processing controlling section 126 generates ROI information 120B and frame information 120C and transmits them to the transmitting section 140. The transmitting section 140 generates transmission data 147A based on various kinds of data (120A, 120B, 120C and 130A) input from the image processing sections 120 and 130. The transmitting section 140 sends out the generated transmission data 147A to the video receiving apparatus 200 via the data lane DL.

The receiving section 210 receives the transmission data 147A output from the video transmitting apparatus 100 via the data lane DL. The receiving section 210 performs a predetermined process on the received transmission data 147A to generate EBD data 214A and payload data 215A and outputs them to the information processing section 220.

The information extracting section 221 extracts ROI information 120B from the embedded data included in the EBD data 214A. The information extracting section 221 extracts coordinates (for example, left upper end coordinates (Xa1, Ya1)), lengths (for example, physical region lengths XLa1 and YLa1), and a region number 1 (or a priority 115 (=1)) of the region of interest ROI corresponding to the ROI image 112a1 from the embedded data included in the EBD data 214A. Furthermore, the information extracting section 221 extracts coordinates (for example, left upper end coordinates (Xa2, Ya2)), lengths (for example, physical region lengths XLa2, YLa2), and a region number 2 (or a priority 115 (=2)) of the region of interest ROI corresponding to the ROI image 112a2 from the embedded data included in the EBD data 214A. The ROI decoding section 222 decodes the compressed image data 147B included in the payload data 215A to generate image data 222A.

The ROI image generating section 223 derives the positional information 114 of the region of overlap ROO based on the extracted pieces of information (extracted information 221A). The ROI image generating section 223 extracts, for example, coordinates (for example, left upper end coordinates Xb1, Yb1) and lengths (for example, physical region lengths XLb1 and YLb1) of the region of overlap ROO as the positional information 114 of the region of overlap ROO. Furthermore, the ROI image generating section 223 generates an image (ROI images 112a1 and 112a2) of each region of interest ROI in the captured image 111 on the basis of the image data 222A, the extracted information 221A, and the positional information 114 of the region of overlap ROO.

[Advantages]

Next, advantages of the video transmission system 1 according to the present embodiment will be described below.

In recent years, there have been growing applications in which large amounts of data are transmitted in bulk. Such applications tend to pose large loads on the transmission system, possibly causing the transmission system to go down in worst-case scenarios and fail to perform data transmission.

To avoid transmission system shutdowns, it has customary in the art to specify an object as an imaging target and transmit only a partial image of the specified object that has been segmented, rather than transmitting an entire captured image.

Incidentally, MIPI CSI-2 may be used as a process of transmitting data from an image sensor to an application sensor. It may not be easy to transmit ROIs according to this process due to various limitations.

On the other hand, according to the present embodiment, ROI information 120B regarding each region of interest ROI in the captured image 111 is sent out as embedded data, and image data of each region of interest ROI are sent out as the payload data of a long packet. Therefore, an apparatus (video receiving apparatus 200) that has received transmission data 147A sent out from the video transmitting apparatus 100 can easily extract the image data (ROI image 112) of each region of interest ROI from the transmission data 147A. As a result, it is possible to transmit regions of interest ROIs regardless of various limitations.

According to the present embodiment, furthermore, the image data (compressed image data 120A) of each region of interest ROI are sent out in a common virtual channel. Since a plurality of ROI images 112 can thus be sent in one packet, it is not necessary to enter an LP mode while the plurality of ROI images 112 is being sent, resulting in a high transmission efficiency.

According to the present embodiment, moreover, a data type of each region of interest ROI is included in the packet header PH of the payload data of the long packet and sent. Therefore, the data type of each region of interest ROI can be obtained simply by accessing the packet header PH of the payload data of the long packet, instead of accessing the embedded data. Inasmuch as this increases the processing rate of the video receiving apparatus 200, a high transmission efficiency can be achieved.

According to the present embodiment, furthermore, in a case where the ROI information 120B is included in the payload data of a long packet and sent, the ROI information 120B can be obtained simply by accessing the payload data of the long packet, instead of accessing the embedded data. Inasmuch as this increases the processing rate of the video receiving apparatus 200, a high transmission efficiency can be achieved.

According to the present embodiment, moreover, the ROI information 120B regarding each region of interest ROI is extracted from the embedded data included in the transmission data 147A and an image of each region of interest ROI (ROI image 112) is extracted from the payload data of the long packet include in the transmission data 147A on the basis of the extracted ROI information 120B. This allows the image of each region of interest ROI (ROI image 112) to be easily extracted from the transmission data 147A. As a result, it is possible to transmit regions of interest ROIs regardless of various limitations.

Figure 10:
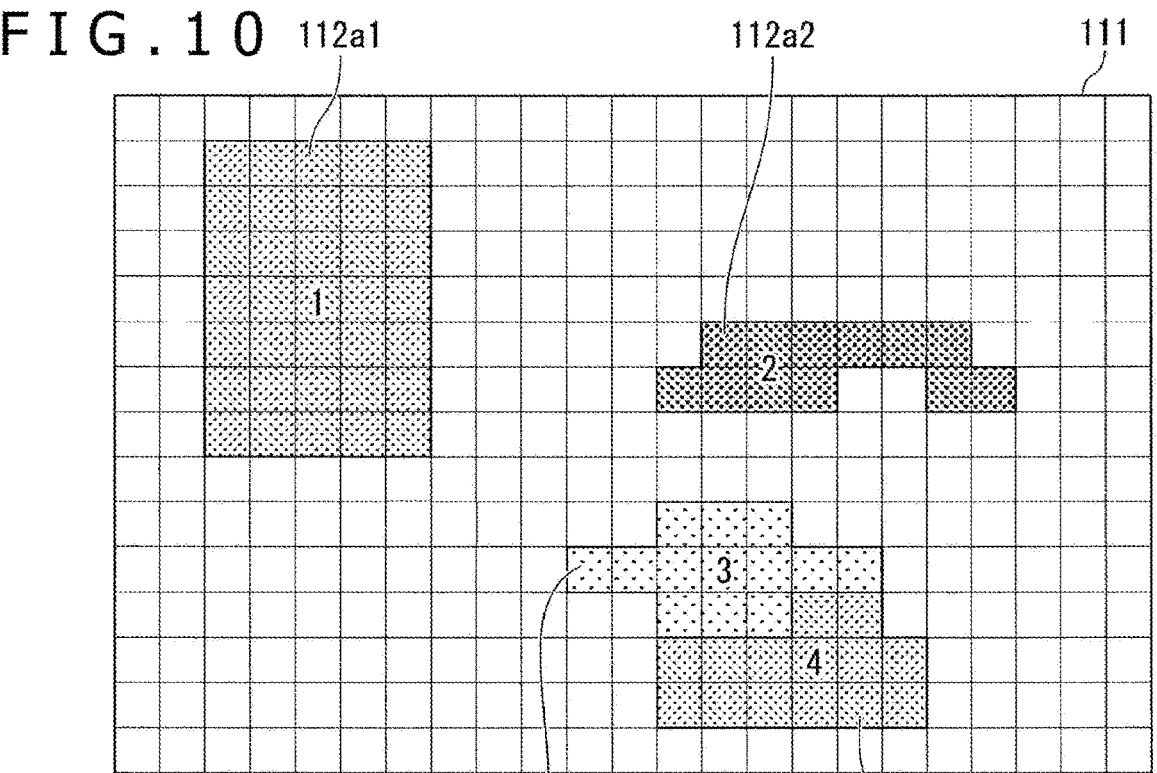
FIG. 10 is a diagram schematically illustrating regions where objects specified in a captured image are placed.
Figure 11:
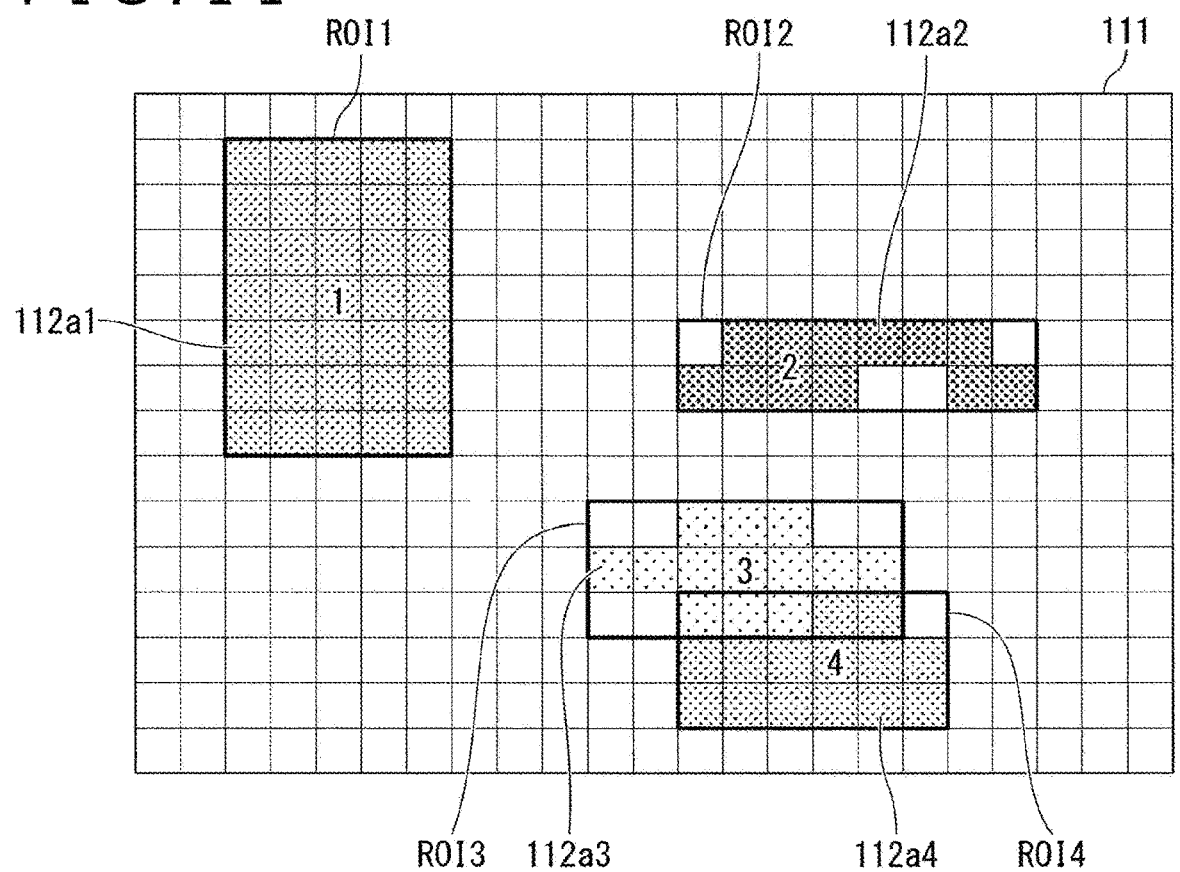
FIG. 11 is a diagram illustrating an example of ROIs established with respect to the specified objects.

2. Technology 2 that is Presupposed for the Present Disclosure:

A technology for transmitting a region of interest (ROI) as a partial region (non-rectangular in shape) segmented from a captured image will be described below using FIGS. 10 through 12 with reference to FIGS. 1 through 9. Specifically, a technology for transmitting and receiving an image of an object as an imaging target that is of a shape other than a square shape (rectangular shape) will be described below. FIG. 10 is a diagram schematically illustrating regions where objects specified in a captured image 111 are placed. For an easier understanding, FIG. 10 depicts the captured image 111 that is captured in an image capturing region including image capturing elements arranged in 15 rows×23 columns. FIG. 11 is a diagram illustrating an example of ROIs established with respect to the specified objects.

According to the presupposed technology 2, as with the presupposed technology 1, there will be described a situation where a predetermined process is performed on the captured image 111 input from the image capturing section 110 in a case where a control signal indicating the segmentation of ROIs is input from the video receiving apparatus 200 via the camera control interface CCI to the video transmitting apparatus 100. However, the presupposed technology 2 is also applicable to a situation where the video transmitting apparatus 100, i.e., the transmission side, indicates coordinates for segmenting ROIs. In such a case, the transmission side is configured to receive information representing "persons" or "objects" to be acquired by ROIs sent out from the reception side, and to make a decision and give an instruction as to segmenting coordinates, for example.

A control signal indicating the segmentation of ROIs is input from the video receiving apparatus 200 via the camera control interface CCI. In response to the control signal, as illustrated in FIG. 10, the ROI segmenting section 121 specifies four objects 1 through 4 included as imaging targets in the captured image 111. The object 1 has a rectangular shape taking up a portion of a left upper region of the captured image 111, for example. The object 2 has a shape taking up a partial region on the right side of the object 1 in the captured image 111 and devoid of both side corners of an upper side of a rectangular shape and a portion of a lower side thereof, for example. The object 3 has a shape taking up a partial region below the object 2 in the captured image 111 and devoid of four corners of a rectangular shape, for example. The object 4 has a shape taking up a partial region below the object 3 in the captured image 111 and devoid of both side corners of an upper side of a rectangular shape, for example. The object 3 and the object 4 partly overlap each other.

As illustrated in FIG. 11, the ROI segmenting section 121 (see FIG. 2) establishes minimum rectangular shapes including the specified objects as regions of interest ROI1 through ROI4, respectively. The ROI segmenting section 121 establishes the region of interest ROI1 for the object 1 and segments a ROI image 112a1. Furthermore, the ROI segmenting section 121 establishes the region of interest ROI2 for the object 2 and segments a ROI image 112a2. Furthermore, the ROI segmenting section 121 establishes the region of interest ROI3 for the object 3 and segments a ROI image 112a3. Furthermore, the ROI segmenting section 121 establishes the region of interest ROI4 for the object 4 and segments a ROI image 112a4.

The ROI segmenting section 121 stores the region of interest ROI1 and a region number "1" assigned to the region of interest ROI1 in the storage section in association with each other. The ROI segmenting section 121 stores the region of interest ROI2 and a region number "2" assigned to the region of interest ROI2 in the storage section in association with each other. The ROI segmenting section 121 stores the region of interest ROI3 and a region number "3" assigned to the region of interest ROI3 in the storage section in association with each other. The ROI segmenting section 121 stores the region of interest ROI4 and a region number "4" assigned to the region of interest ROI4 in the storage section in association with each other.

The ROI analyzing section 122 (see FIG. 2) derive positional information of the respective regions of interest ROI1 through ROI4. The ROI analyzing section 122 derives a physical region length XLa1 in the X-axis direction and a physical region length YLa1 in the Y-axis direction, for example, as the positional information of the region of interest ROI1. The ROI analyzing section 122 derives a physical region length XLa2 in the X-axis direction and a physical region length YLa2 in the Y-axis direction, for example, as the positional information of the region of interest ROI2. The ROI analyzing section 122 derives a physical region length XLa3 in the X-axis direction and a physical region length YLa3 in the Y-axis direction, for example, as the positional information of the region of interest ROI3. The ROI analyzing section 122 derives a physical region length XLa4 in the X-axis direction and a physical region length YLa4 in the Y-axis direction, for example, as the positional information of the region of interest ROI4. Furthermore, the ROI analyzing section 122 may derive, as positional information 113 of each region of interest ROI, an output region length XLc in the X-axis direction of the region of interest ROI and an output region length YLc in the Y-axis direction of the region of interest ROI, for example.

The ROI analyzing section 122 derives sizes and total amounts of data of the respective regions of interest ROI1 through ROI4 as information for a subsequent stage by deriving the lengths in the X-axis direction and the Y-axis directions of the respective regions of interest ROIs. The video receiving apparatus 200 that represents the subsequent stage can thus secure a memory space.

The ROI analyzing section 122 is configured to derive positional information of the ROI images 112a1 through 112a4, not the positional information of the regions of interest ROI, in a case where the objects as imaging targets and the regions of interest do not agree with each other in shape. The ROI analyzing section 122 derives left end coordinates (xn, yn) and physical region lengths XLn in the X-axis direction of the respective rows as the positional information of the ROI images 112a1 through 112a4. Furthermore, in a case where a ROI image is separated as in the second row of the ROI image 112a2, the ROI analyzing section 122 derives respective positional information of the separated portions. The ROI analyzing section 122 stores the region numbers of the regions of interest ROI1 through ROI4 and the positional information of the ROI images 112a1 through 112a4 in the storage section in association with each other.

Moreover, the ROI analyzing section 122 may derive sensing information, exposure information, gain information, AD word length, image format, etc., for example, other than the positional information, of the respective regions of interest ROI1 through ROI4, and store them in the storage section in association with the region numbers.

In a case where objects as imaging targets are of a rectangular shape, the overlap detecting section 123 (see FIG. 2) derives a region where ROI images overlap each other, not a region where regions of interest overlap each other, as a region of overlap. As illustrated in FIG. 11, the overlap detecting section 123 derives a region of overlap ROO as a region where the ROI image 112a3 and the ROI image 123a4 overlap each other. The overlap detecting section 123 stores the derived region of overlap ROO in the storage section in association with the respective positional information of the regions of interest ROI3 and ROI4.

The priority setting section 124 (see FIG. 2) assigns the priority "1" to the region of interest ROI1, and stores the priority "1" in the storage section in association with the region of interest ROI1. The priority setting section 124 assigns the priority "2" that is lower than the priority "1" to the region of interest ROI2, and stores the priority "2" in the storage section in association with the region of interest ROI2. The priority setting section 124 assigns the priority "3" that is lower than the priority "2" to the region of interest ROI3, and stores the priority "3" in the storage section in association with the region of interest ROI3. The priority setting section 124 assigns the priority "4" that is lower than the priority "3" to the region of interest ROI4, and stores the priority "4" in the storage section in association with the region of interest ROI4.

The encoding section 125 (see FIG. 2) generates respective transmission images of the ROI images 112a1 through 112a4. Since the priority of the region of interest ROI4 is lower than the priority of the region of interest ROI3, the encoding section 125 generates a transmission image by eliminating the region of overlap ROO from the ROI image 112a4.

The image processing controlling section 126 (see FIG. 2) generates ROI information and frame information and transmits them to the transmitting section 140 (see FIG. 2). The ROI information includes the respective positional information of the ROI images 112a1 through 112a4, for example. The ROI information also includes, other than the positional information, information (for example, the respective data types of the regions of interest ROI1 through ROI4, the number of the regions of interest ROI1 through ROI4 included in the captured image 111, the region numbers and priority of the regions of interest ROI1 through ROI4, etc.) similar to those in a case where objects as imaging targets are of a rectangular shape. The frame information includes, for example, information similar to those in a case where objects as imaging targets are of a rectangular shape, such as data types of the regions of interest ROI1 through ROI4.

The LINK controlling section 141 provided in the transmitting section 140 (see FIG. 2) outputs the frame information and the ROI information input from the image processing controlling section 126 per line to the ECC generating section 142 and the PH generating section 143 (see FIG. 2 for both). The ECC generating section 142 generates an error correcting code for a line in the frame information on the basis of data of the line (for example, the number of the virtual channel, the respective data types of the regions of interest ROI1through ROI4, the payload length per line, etc.), for example. The ECC generating section 142 outputs the generated error correcting code to the PH generating section 143, for example. The PH generating section 143 generates a packet header PH (see FIG. 4) per line, using the frame information and the error correcting code generated by the ECC generating section 142.

The EBD buffer 144 (see FIG. 2) primarily stores the ROI information and outputs the ROI information at predetermined timing as embedded data to the combining section 147 (see FIG. 2).

The ROI data buffer 145 (see FIG. 2) primarily stores the compressed image data input from the encoding section 125 and outputs the compressed image data 120A as the payload data of a long packet to the combining section 147 in a case where a control signal indicating the segmentation of ROIs is input from the video receiving apparatus 200 via the camera control interface CCI.

In a case where a control signal indicating the segmentation of ROIs is input from the video receiving apparatus 200 via the camera control interface CCI, the combining section 147 generates transmission data 147A based on various input data (the packet header PH, the ROI information, and the compressed image data input from the encoding section 125 via the ROI data buffer 145. The combining section 147 outputs the generated transmission data 147A to the video receiving apparatus 200 via the data lane DL.

Specifically, the combining section 147 includes the respective data types of the regions of interest ROI1 through ROI4 in the packet header PH of the payload data of a long packet and sends out the data. Furthermore, the combining section 147 sends out the respective image data (compressed image data) of the regions of interest ROI1 through ROI4 in a common virtual channel.

In a case where objects as imaging targets are not of a rectangular shape, the positional information of the ROI images 112a1 through 112a4 included in the packet header PH or the payload data of a long packet. The positional information of the ROI images 112a1 through 112a4 is included in the packet header PH by the PH generating section 143. On the other hand, the positional information of the ROI images 112a1 through 112a4 is included in the payload data of a long packet by the combining section 147.

Figure 12:
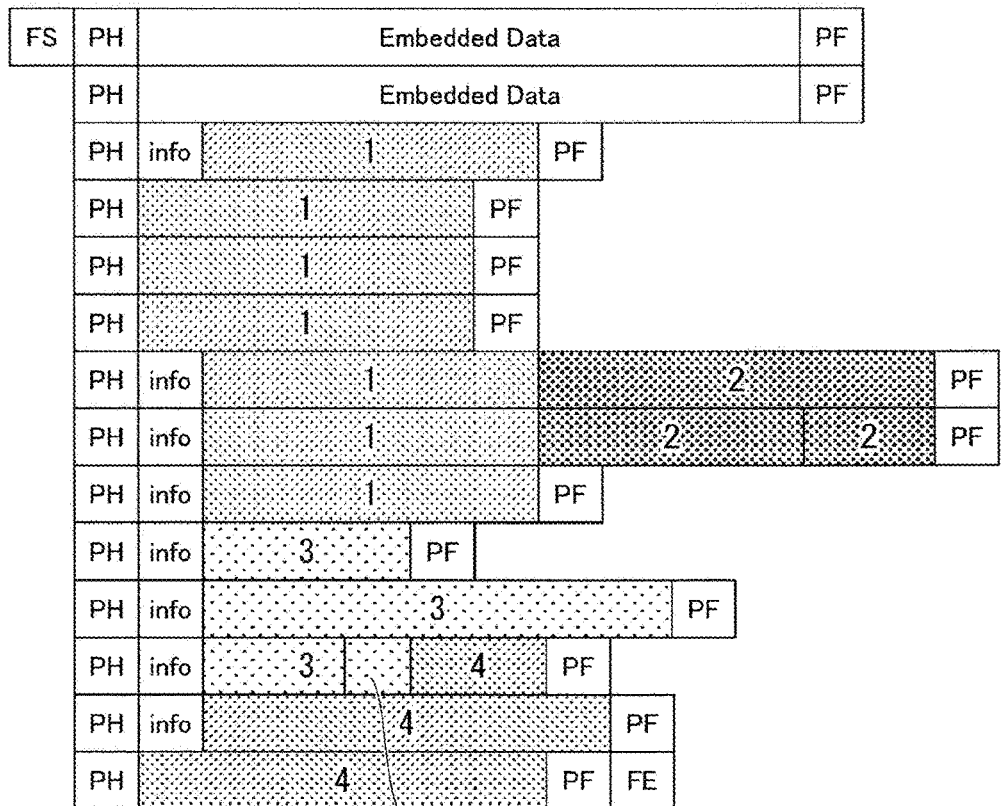
FIG. 12 is a diagram illustrating a configurational example of transmission data where the positional information of ROI images is included in the payload data of a long packet.

FIG. 12 is a diagram illustrating a configurational example of the transmission data 147A where the positional information of the ROI images 112a1 through 112a4 is included in the payload data of a long packet. As illustrated in FIG. 12, the transmission data 147A include a frame header area R1 and a packet area R2, for example. Incidentally, FIG. 12 illustrates details of the contents of the frame header area R1. Furthermore, low power modes LP are omitted from illustration in FIG. 12.

The frame header area R1 includes a frame number F1 as an identifier of the transmission data 147A, for example. The frame header area R1 includes information regarding compressed image data included in the packet area R2. The frame header area R1 includes, for example, the number of compressed image data (the number of ROIs) and information (ROI information) regarding each of the ROI images 112a1 through 112a4 corresponding to each compressed image data. The ROI information includes region numbers, physical region lengths, rectangular output region sizes, priority, exposure information, gain information, AD word lengths, and image formats. A physical region length represents the maximum length of a ROI image, and a rectangular output region size represents the size of a region of interest ROI.

"Info" illustrated in FIG. 12 represents region information stored the payload of a long packet. The positional information of the ROI images 112a1 through 112a4 is stored in "info", for example. The positional information of the ROI images 112a1 through 112a4 is stored in the leading portions of the payloads of long packets. In a case where the physical region lengths the X-axis direction of successive pixel rows making up ROI images are the same and each pixel row does not include a ROI image of a different region number, the region information "info" may not be stored in the payloads of long packets including image data of second and following ones of the pixel rows. According to the present example, in the ROI image 112a1, the physical region lengths in the X-axis direction of successive first through fourth ones of all the pixel rows are the same, and the first through fourth pixel rows do not include a ROI image of a different region number. Therefore, the region information "info" is not stored in the payloads of respective long packets including the image data of the second through fourth pixel rows that correspond to second and following ones of the successive first through fourth pixel rows making up the ROI image 112a1. According to the present example, furthermore, in the ROI image 112a4, the physical region lengths in the X-axis direction of successive second and third ones of all the pixel rows are the same, and the second and third pixel rows do not include a ROI2 mage of a different region number. Therefore, the region information "info" is not stored in the payload of a long packet including the image data of the third pixel row that corresponds to second and following ones of the successive second and third pixel rows making up the ROI image 112a4. It is noted that, even in a case where the physical region lengths in the X-axis direction are the same and the respective pixel rows do not include a ROI image of a different region number, the region information "info" may be stored in the payload of each row.

The combining section 147 divides and places compressed image data generated by compressing the respective ROI images 112a1 through 112a4 per pixel row in the packet area R2 of the transmission data 147A, for example. "1" illustrated in FIG. 12 represents the compressed image data of the ROI image 112a1 stored in the payloads of long packets. "2" illustrated in FIG. 12 represents the compressed image data of the ROI image 112a2 stored in the payloads of long packets. "3" illustrated in FIG. 12 represents the compressed image data of the ROI image 112a3 stored in the payloads of long packets. "4" illustrated in FIG. 12 represents the compressed image data of the ROI image 112a4 stored in the payloads of long packets. In FIG. 12, the compressed image data are illustrated as being divided for an easy understanding. However, the data stored an the payloads of long packets are not divided. Compressed image data 112b corresponding to the image of the region of overlap ROO are not overlappingly included in the packet area R2 of the transmission data 147A. Furthermore, the combining section 147 has eliminated pixel rows that do not correspond to respective transmission images of the captured image 111 from the packet area R2 of the transmission data 147A. Consequently, pixel rows that do not correspond to respective transmission images of the captured image 111 are not included in the packet area R2 of the transmission data 147A.

Next, operation of the video receiving apparatus 200 in a case where it has received transmission data 147A will be described below.

The header separating section 211 of the receiving section 210 (see FIG. 8 for both) receives transmission data 147A from the video transmitting apparatus 100 via the data lane DL. Specifically, the header separating section 211 receives transmission data 147A including ROI information regarding the regions of interest ROI1 through ROI4 is the captured image 111 in the embedded data and also including image data (compressed image data) of the regions of interest ROI1 through ROI4 in the payload data of long packets. The header separating section 211 separates the received transmission data 147A into a frame header area R1 and a packet area R2.

The header interpreting section 212 (see FIG. 8) specifies the positions of the payload data of long packets included in the packet area R2 on the basis of data (specifically, embedded data) included in the frame header area R1.

The payload separating section 213 (see FIG. 8) separates the payload data of the long packets included in the packet area R2 from the packet area R2 on the basis of the positions of the payload data of the long packets that have been specified by the header interpreting section 212.

The EBD interpreting section 214 outputs the embedded data as EBD data to the information processing section 220 (see FIG. 8). Furthermore, the EBD interpreting section 214 discriminates whether the image data included in the payload data of the lone packets are the compressed image data of the image data 116 of a ROI or the compressed image data of normal image data, from the data type included in the embedded data. The EBD interpreting section 214 outputs the discriminated result to the ROI data separating section 215 (see FIG. 8).

If image data where the image data included in the payload data of long packets represent a ROI are input, then the ROI data separating section 215 outputs the payload data of the long packets as payload data to the information processing section 220 (specifically, the ROI decoding section 222). The payload data of the long packets including ROI information include the ROI information and one line of pixel data of the compressed image data.

The information extracting section 221 (see FIG. 8) provided in the information processing section 220 extracts the number (four in the present example) of the regions of interest ROI1 through ROI4 included in the captured image 111, the region numbers 1 through 4 and the priorities 1 through 4 of the regions of interest ROI1 through ROI4, the data lengths of the respective regions of interest ROI1 through ROI4, and the image formats of the respective regions of interest ROI1 through ROI4 from the embedded data included in the EBD data input from the EBD interpreting section 214. Furthermore, the information extracting section 221 extracts the positional information of the ROI images 112a1 through 112a4 from the embedded data.

The ROI decoding section 222 decodes compressed image data 147B included in the payload data to extract the positional information of the ROI images 112a1 through 112a4 and generate image data (making up transmission images). In a case where payload data corresponding to a sixth pixel row, for example, are input, the ROI decoding section 222 extracts one piece of positional information of the ROI image 112a1 and two pieces of positional information of the ROI image 112a2 from the payload data, and generates respective image data (transmission images) of the ROI images 112a1 and 112b1 corresponding to the sixth pixel row.

In a case where payload data corresponding to a tenth pixel row, for example, are input, the ROI decoding section 222 extracts one piece of positional information of the ROI image 112a3 and one piece of positional information of the ROI image 112a4 from the payload data, and generates respective image data (transmission images) of the ROI images 112a3 and 112b4.

The ROI image generating section 223 (see FIG. 8) generates ROI images 112a1 through 112a4 of the regions of interest ROI1 through ROI4 in the captured image on the basis of the ROI information obtained by the information extracting section 221, the positional information of the ROI images 112a1 through 112a4 extracted by the ROI decoding section 222, and the transmission images generated by the ROI decoding section 222. In a case where the one piece of positional information of the ROI image 112a1 and two pieces of positional information of the ROI image 112a2, extracted from the payload data, corresponding to the sixth pixel row, for example, and their transmission images are input, the ROI image generating section 223 generates a ROI image 112a1 of five pixels extending in the X-axis direction, a ROI image 112a2 of four pixels extending in the X-axis direction at a position spaced five pixels from the ROI image 112a1, and a ROI image 112a2 of two pixels extending in the X-axis direction at a position spaced two pixels from the ROI image 112a2 (see FIG. 10).

Furthermore, the ROI image generating section 223 detects a region of overlap ROO where the region of interest ROI3 and the region of interest ROI4 overlap each other on the basis of the ROI information obtained by the information extracting section 221. The ROI image generating section 223 generates a ROI image 112a3 of four pixels extending in the X-axis direction and a ROI image 112a4 of three pixels extending in the X-axis direction with one pixel overlapping the ROI image 112a3 on the basis of the detected region of overlap ROO, the respective positional information of the ROI images 112a3 and 112a4, extracted from the payload, corresponding to the tenth pixel row, and the transmission images (see FIG. 10).

The ROI image generating section 223 outputs the generated images as ROI images to an apparatus at a subsequent stage (not illustrated).

In this manner, the video transmitting apparatus 100 and the video receiving apparatus 200 can send and receive images of objects as imaging targets as ROI images even if the objects are of a shape other than a rectangular shape.

First Embodiment

3. The Principles of High Dynamic Range (HDR) Rendering According to a First Embodiment of the Present Disclosure:

Next, the principles of a high dynamic range rendering process according to the first embodiment of the present disclosure will be described below with reference to FIG. 13. The high dynamic range may be abbreviated "HDR" hereinbelow.

Figure 13:
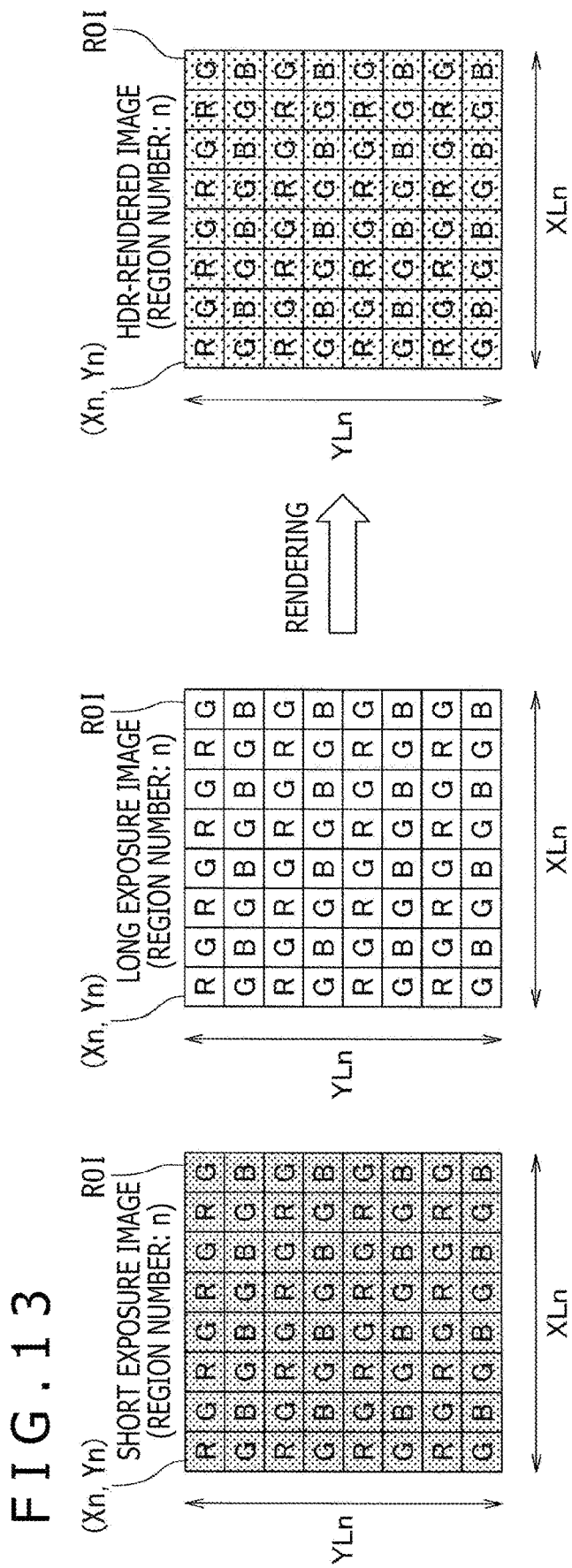
FIG. 13 is a diagram schematically illustrating a high dynamic range rendering process according to a first embodiment.

FIG. 13 is a diagram schematically illustrating a high dynamic range rendering process according to the present embodiment. A plurality of (two in FIG. 13) images having different exposure times is combined to generate an HDR image. According to the present embodiment, HDR rendering is carried out per region of interest ROI.

Regions of interest ROI that are segmented have indefinite scopes and sizes. According to the present embodiment, therefore, HDR rendering is carried out in a case where regions of interest ROI extracted as partial regions from two captured images that have been captured under difference exposure conditions have a certain degree of conformity. Conditions under which to carry out HDR rendering according to the present embodiment are given as the following rendering conditions 1 through 3:

(1) Rendering condition 1: The region numbers of regions of interest ROI are in conformity with each other.
(2) Rendering condition 2: The coordinates of reference pixels of regions of interest ROI that are compared have a certain degree of conformity.
(3) Rendering condition 3: The sizes of regions of interest ROI that are compared have a certain degree of conformity.

The reference pixel in the rendering condition 2 refers to a pixel at a left upper end of a region of interest ROI, for example. Moreover, the certain degree of conformity in the rendering condition 2 represents that the difference between the coordinates of the reference pixels of regions of interest ROI that are compared falls in the range of a predetermined threshold value. The certain degree of conformity in the rendering condition 3 represents that the sizes (the lengths respectively in the X-axis and Y-axis directions) of regions of interest ROI that are compared fall in the range or a predetermined threshold value.

As indicated on the left side of the thick arrow in FIG. 13, a region of interest ROI including pixels (short exposure pixels) having a shorter exposure time (which may be referred to as "short exposure" hereinbelow) of two exposure times to be compared has a region number "n," a reference pixel (a pixel at a left upper end according to the present embodiment) having coordinates "(Xn, Yn)," a length "XLn" in the X-axis directions, and a length "YLn" in the Y-axis directions. On the other hand, a region of interest ROI including pixels (long exposure pixels) having a longer exposure time (which may be referred to as "long exposure" hereinbelow) of the two exposure times to be compared has a region number "n," a pixel having coordinates "(Xn, Yn)" at a left upper end, a length "XLn" in the X-axis directions, and a length "YLn" in the Y-axis directions.

In this case, since the region number of the region of interest ROI at short exposure and the region number of the region of interest ROI at long exposure are in conformity with each other as they are represented by "n," the above rendering condition 1 is satisfied. Furthermore, the coordinates of the pixel at the upper left end of the region of interest ROI at short exposure and the coordinates of the pixel at the upper left end of the region of interest ROI at long exposure are in conformity with each other as they are represented by "(Xn, Yn)." Therefore, since the difference between these coordinates is 0 and falls within the range of the predetermined threshold value, the rendering condition 2 is satisfied. In addition, the length in the X-axis directions of the region of interest ROI at short exposure and the length in the X-axis directions of the region of interest ROI at long exposure are in conformity with each other as they are represented by "XLn." Similarly, the length in the Y-axis directions of the region of interest ROI at short exposure and the length in the Y-axis directions of the region of interest ROI at long exposure are in conformity with each other as they are represented by "YLn." Therefore, since the difference between these lengths is 0 and falls within the range of the predetermined threshold value, the rendering condition 3 is satisfied. As all of the above rendering conditions 1 through 3 are satisfied, an HDR rendering process for the regions of interest ROI is carried out, generating an HDR-rendered image of the regions of interest ROI, as indicated on the right side of the thick arrow in FIG. 13.

In such a fashion, according to the present embodiment, in a case where conditions for determining conformity between regions of interest ROI segmented as partial regions from a plurality of images that have successively been captured under different exposure conditions, for example, are satisfied, an HDR rendering process is carried out for the regions of interest ROI. By thus establishing conditions for performing HDR rendering for regions of interest ROI, HDR rendering is prevented from being performed on different regions of interest ROI, thereby preventing an HDR-rendered image from being disrupted.

Figure 14:
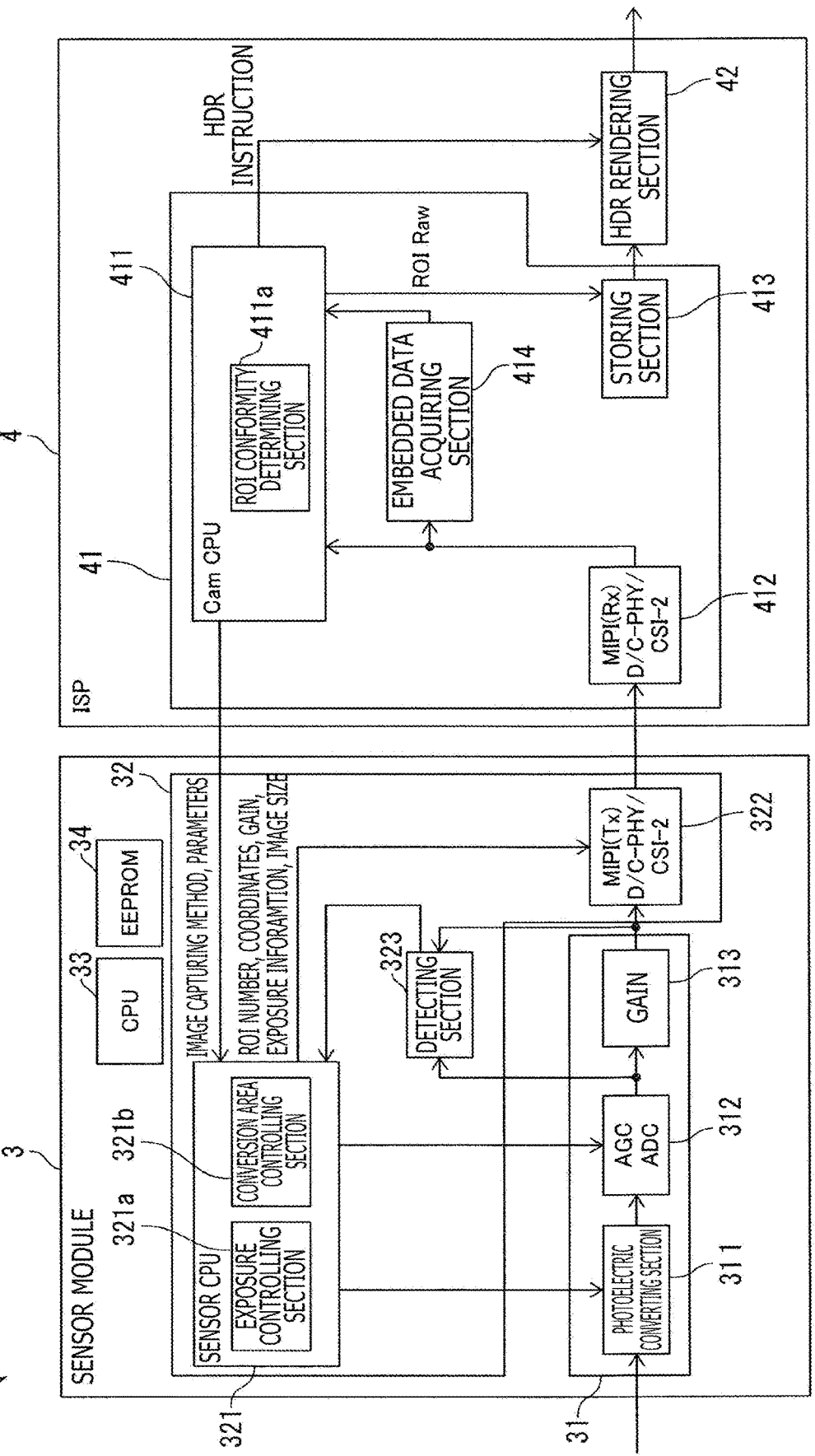
FIG. 14 is a block diagram illustrating a general makeup of a transmitting apparatus, a receiving apparatus, and a transmission system according to the first embodiment.

4. Apparatus and System According to a First Embodiment of the Present Disclosure:

Next, a transmitting apparatus, a receiving apparatus, and a transmission system according to a first embodiment of the present disclosure will be described below with reference to FIGS. 14 and 15. First, a general makeup of the transmitting apparatus, the receiving apparatus, and the transmission system according to the present embodiment will be described below with reference to FIG. 14. FIG. 14 is a block diagram illustrating a general makeup of a video transmitting apparatus 3, a video receiving apparatus 4, and a video transmission system 10 according to the present embodiment.

Figure 19:
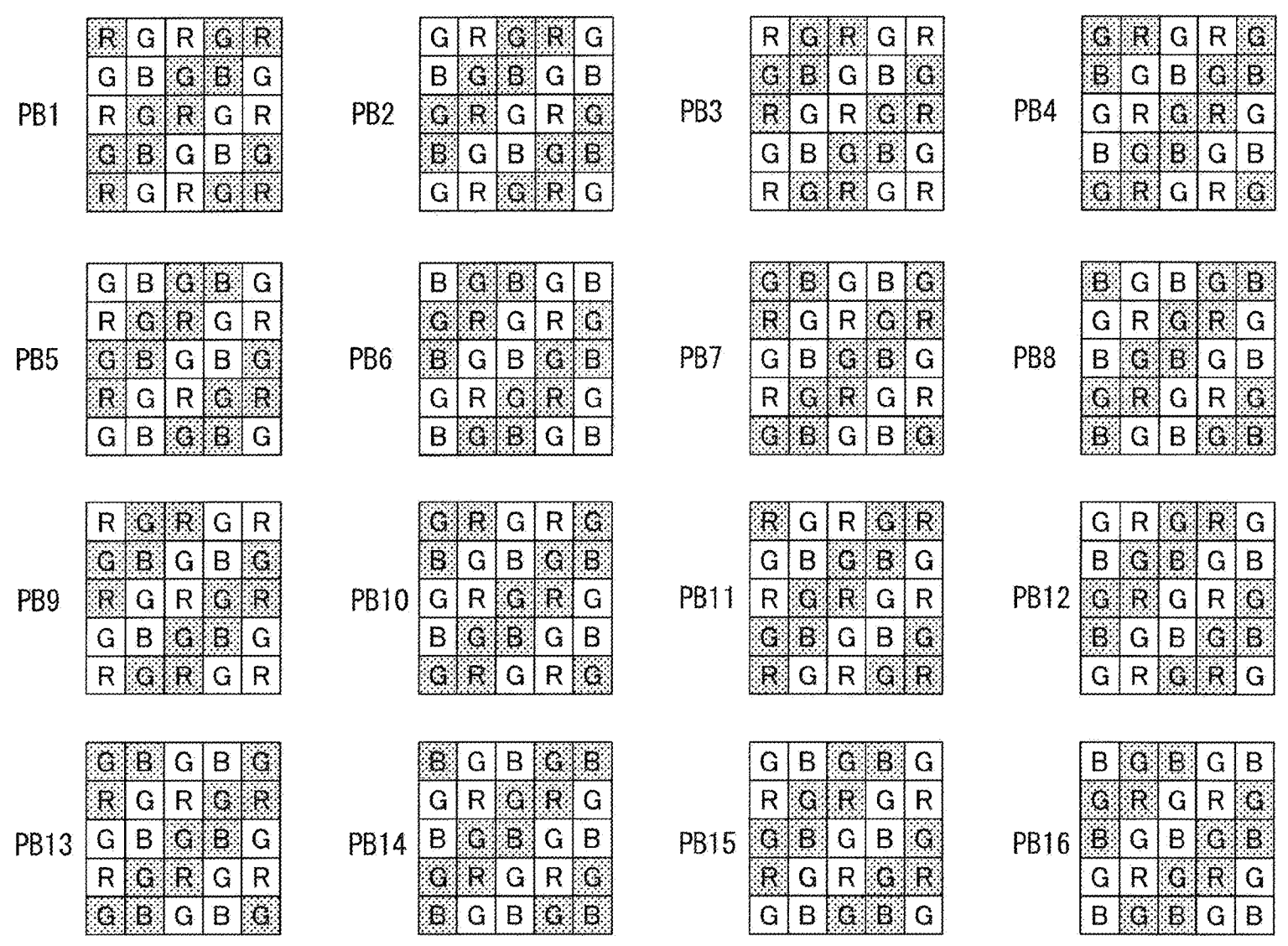

As illustrated in FIG. 19, the video transmission system 10 according to the present embodiment includes the video transmitting apparatus (an example of the transmitting apparatus) 3 that functions as an image sensor and the video receiving apparatus (an example of the receiving apparatus) 4 that functions as an image signal processor (ISP). In the video transmission system (an example of transmission system) 10, the video transmitting apparatus 3 is configured co have a transmitting section 322 send out signals according to the MIPI (Mobile Industry Processor Interface) D-PHY standards, the MIPI C-PHY standards, or the MIPI CSI (Camera Serial Interface)-2 standards. In the video transmission system 10, furthermore, the video receiving apparatus 4 is configured to have a receiving section 412 receive signals according to the MIPI D-PHY standards, the MIPI C-PHY standards, or the MIPI CSI-2 standards. Moreover, the video transmission system 10 may be configured to send and receive signals according to the MPIP CSI-3 standards or the MIPI DSI standards between the video transmitting apparatus 3 and the video receiving apparatus 4, as with the video transmission system 1 according to the presupposed technologies 1 and 2.

The video transmitting apparatus 3 provided in the video transmission system 10 is configured to perform functions equivalent to those of the video transmitting apparatus 100 according to the presupposed technologies 1 and 2. Specifically, the video transmitting apparatus 3 is configured to perform the same process as the video transmitting apparatus 100 on captured images input from an image capturing section 31 in a case where a control signal indicating the segmentation of ROIs is input from the video receiving apparatus 4. Furthermore, the video transmitting apparatus 3 is configured to perform the same process as the video transmitting apparatus 100 on captured images input from the image capturing section 31 in a case where a control signal indicating the outputting of a normal image is input from the video receiving apparatus 4. Moreover, the video transmitting apparatus 3 is configured to acquire high dynamic range information (HDR information) for use in the above HDR rendering process and send out the HDR information to the video receiving apparatus 4.

The video receiving apparatus 4 is configured to perform functions equivalent to those of the video receiving apparatus 200 according to the presupposed technologies 1 and 2. Specifically, the video receiving apparatus 4 is configured to perform the same process as the video receiving apparatus 200 according to the presupposed technologies 1 and 2 on transmission data transmitted from the video transmitting apparatus 3. Furthermore, the video receiving apparatus 4 is configured to perform an HDR rendering process using HDR information transmitted from the video transmitting apparatus 3.

Therefore, FIG. 14 illustrates the video transmitting apparatus 3 and the video receiving apparatus 4 mainly with respect to configurational details regarding the HDR rendering process.

As illustrated in FIG. 14, the video transmitting apparatus 3 includes the image capturing section 31 that captures images of targets. The image capturing section 31 has a photoelectric converting section 311 for converting incident light into electric signals, for example. The photoelectric converting section 311 includes, for example, a CCD image sensor or a CMOS image sensor. Furthermore, the image capturing section 31 has a signal converting section 312 for converting an analog electric signal input from the photoelectric converting section 311 into digital image data. The signal converting section 312 is configured to perform a signal amplifying (AGC) process for amplifying the analog electric signal input from the photoelectric converting section 311 and an analog-to-digital converting (ADC) process for converting the amplified signal into a digital signal. The image capturing section 31 has an amplifying section 313 for applying a digital gain to image data input from the signal converting section 312. The amplifying section 313 outputs the image data with the digital gain applied thereto to the transmitting section 322.

The video transmitting apparatus 3 includes a controlling section 32 for controlling the image capturing section 31 and controlling predetermined signal processing processes. The controlling section 32 has a sensor CPU 321, the transmitting section 322, and a detecting section 323. The sensor CPU 321 is configured to perform the same functions as the image processing sections 120 and 130 (see FIG. 2). The transmitting section 320 is configured to perform the same functions as the transmitting section 140 (see FIG. 2). In the controlling section 32, the sensor CPU 321 may be replaced with image processing sections 120 and 130, and the transmitting section 322 may be replaced with the transmitting section 140.

The detecting section 323 is connected to the signal converting section 312 and the amplifying section 313. The detecting section 323 acquires digital image data from the signal converting section 312. Moreover, the detecting section 323 acquires the gain-adjusted image data from the amplifying section 313. The detecting section 323 is configured to generate detected information including information of luminance and color and information of a digital gain set by the amplifying section 313, and output the detected information to the controlling section 32.

The sensor CPU 321 has an exposure controlling section 321*a* for controlling exposure conditions of the photoelectric converting section 311. The exposure controlling section 321*a* is configured to control exposure conditions on the basis of detected information input from the detecting section 323. Furthermore, the sensor CPU 321 has a conversion area controlling section (an example of a controlling section) 321*b* for controlling the acquisition of high dynamic range information that represents information for use in high dynamic range rendering of image data of ROIs. Each of the sensor CPU 321 having the conversion area controlling section 321*b* and the controlling section 32 corresponds to an example of a controlling section for controlling the acquisition of high dynamic range information that represents information for use in high dynamic range rendering of image data of ROIs. In a case where the exposure controlling section 321*a* instructs the image capturing section 31 to capture images under changed exposure conditions, the exposure controlling section 321*a* instructs the image capturing section 31 to capture images under exposure conditions determined for automatic exposure (reference exposure conditions) in order to capture images in a reference exposure state.

The conversion area controlling section 321*b* is configured to acquire HDR information of a region of interest ROI. In a case where a plurality of regions of interest ROI is established, the conversion area controlling section 321*b* is configured to acquire HDR information of each of the regions of interest ROI. The conversion area controlling section 321*b* is configured to acquire, as HDR information, a single piece of information of one of the coordinates of an end, the size, and the exposure information of a region of interest ROI or combined information representing a combination of any two or more of the coordinates of the end, the size, and the exposure information of the region of interest ROI. The coordinates of an end of a ROI correspond to the coordinates of the reference pixel referred to above, and represent the coordinates of a left upper end of a ROI according to the present embodiment. According to the present embodiment, the conversion area controlling section 321*b* is configured to acquire the coordinates of a left upper end of a region of interest ROI as an end of the region of interest ROI. However, information of either one of ends at four corners or information of any other locations may be used insofar as it can specify the position of a region of interest ROI. The information of the size of a region of interest ROI includes information of the lengths respectively in the X-axis and Y-axis directions of the region of interest ROI.

The HDR rendering process uses regions of interest ROI segmented respectively from different images. Therefore, the conversion area controlling section 321b is configured to acquire the high dynamic range information of two successive frames. The conversion area controlling section 321b acquires HDR information associated with respective regions of interest ROI per frame. The conversion area controlling section 321b outputs the acquired HDR information to the transmitting section 322.

Even if an object to be segmented is not of a rectangular shape, the sensor CPU 321 establishes a minimum rectangular shape including the object as a region of interest ROI, as with the ROI segmenting section 121 (see FIG. 2). Moreover, the sensor CPU 321 is configured to derive the positional information (a left upper end, a length in the X-axis directions, and a length in the Y-axis directions) of a region of interest ROI, and send out the derived positional information to the video receiving apparatus 4, as with the ROI analyzing section 122 (see FIG. 2).

As illustrated in FIG. 14, the sensor CPU 321 is configured to be supplied with input information representing an image capturing method and parameters such as exposure conditions output from a Cam CPU 411 (to be described is detail later) is the video receiving apparatus 4. The sensor CPU 321 is configured to control the exposure controlling section 321a on the basis of the input information.

The video transmitting apparatus 3 includes a controlling section 33 and a nonvolatile storage section 34. In a case where the video transmitting apparatus 3 determines a target whose image is to be captured, the controlling section 33 controls detection of the target whose image is to be captured, image recognition, etc. The nonvolatile storage section 34 stores initial adjustment data for the video transmitting apparatus 3 and the video receiving apparatus 4, etc.

The transmitting section 322 generates transmission data (see FIGS. 6 and 12) including the coordinates (segmentation coordinates) and size of a region of interest ROI, the HDR information, etc. input from the sensor CPU 321, and image data input from the image capturing section 31, and sends out the generated transmission data to the video receiving apparatus 4. The high dynamic range information is included in ROI information and sent out from the transmitting section 322. The ROI information is included in the embedded data in a packet area of the transmission data and sent out from the transmitting section 322. According to the present embodiment, therefore, the HDR information is included in the embedded data and sent out from the transmitting section 322.

In such a manner, the video transmitting apparatus 3 sends out the high dynamic range information included in the embedded data or payload data from the transmitting section 322. Specifically, the video transmitting apparatus 3 sends out information representing the coordinates of an end and size of a region of interest ROI and exposure information as high dynamic range information from the transmitting section 322. Furthermore, the video transmitting apparatus 3 sends out high dynamic range information of two successive frames from the transmitting section 322.

As illustrated in FIG. 14, the video transmitting apparatus 3 includes the transmitting section 322 that sends out image data of regions of interest ROI as payload data and information regarding the regions of interest ROI as embedded data. The transmitting section 322 includes HDR information as one piece of information regarding regions of interest ROI in embedded data or payload data (embedded data according to the present embodiment) and sends out the HDR information to the video receiving apparatus 4. The transmitting section 322 is configured to send out transmission data including demosaicing information according to the MIPI D-PHY standards, the MIPI C-PHY standards, or the MIPI CSI-2 standards.

As illustrated in FIG. 14, the video receiving apparatus 4 includes a controlling section 41 for controlling a predetermined signal processing process using transmission data transmitted from the video transmitting apparatus 3. The controlling section 41 has a Cam CPU 411, a receiving section 412, a storage section 413, and an embedded data acquiring section 414. The Cam CPU 411 is configured to perform the similar functions to the information processing section 220 (see FIG. 8), except for the information extracting section 221 (see FIG. 8). The transmitting section 322 is configured to perform the similar functions to the receiving section 210 (see FIG. 8), except for the EBD interpreting section 214 (see FIG. 8). In the video receiving apparatus 4, the embedded data acquiring section 414 is configured to perform the similar functions to the FBI) interpreting section 214 and the information extracting section 221. In the controlling section 41, the receiving section 412 and the embedded data acquiring section 414 may be replaced with the receiving section 210. In this case, the functions of the information extracting section 221 that are performed by the embedded data acquiring section 414 are performed by the receiving section 220.

As illustrated in FIG. 14, the video receiving apparatus 4 includes the receiving section 412 that receives a transmission signal where image data of regions of interest ROI are included in the payload data and ROI information is included in the embedded data. The receiving section 412 is configured to receive transmission data input from the video transmitting apparatus 3. The receiving section 412 receives the transmission data according to the MIPI D-PHY standards, the MIPI C-PHY standards, or the MIPI CSI-2 standards. The receiving section 412 generates various data from the input transmission data and outputs the generated data to the Cam CPU 411, the storage section 413, and the embedded data acquiring section 414.

The storage section 413 is configured to store image data ROI Raw of regions of interest ROI. The image data ROI Raw are unprocessed image data called Raw data, Raw image, or undeveloped data, acquired by the photoelectric converting section 311.

As illustrated in FIG. 14, the video receiving apparatus 4 includes the embedded data acquiring section (an example of a controlling section) 414 that controls the extraction of high dynamic range information that represents information for use in high dynamic range rendering of image data of regions of interest ROI from the transmission signal (transmission data) received by the receiving section 412. The controlling section 41 that has the embedded data acquiring section 414 corresponds to an example of a controlling section that controls the extraction of high dynamic range information that represents information for use in high dynamic range rendering of image data of regions of interest ROI from the transmission signal (transmission data) received by the receiving section 412. The embedded data acquiring section 414 is configured to extract high dynamic range information from the ROI information included in the transmission signal (transmission data) input from the receiving section 412. The embedded data acquiring section 414 is configured to extract, as high dynamic range information, a single piece of information of the coordinates of an end, the size, and the exposure information of a region of interest ROI or combined information representing a combination of any two or more of the coordinates of the end, the size, and the exposure information of the region of interest ROI. The HDR information received by the receiving section 412 is information transmitted from the transmitting section 322. Consequently, the coordinates of the end of the ROI in the HDR information received by the receiving section 412 correspond to the coordinates of the reference pixel referred to above, and represent the coordinates of the pixel at the left upper end of the ROI according to the present embodiment. According to the present embodiment, the embedded data acquiring section 414 is configured to acquire the coordinates of a left upper end of a region of interest ROI as an end of the region of interest ROI. However, information of either one of ends at four corners or information of any other locations may be used insofar as it can specify the position of a region of interest ROI. The information of the size of a region of interest ROI includes information of the lengths respectively in the X-axis and Y-axis directions of the region of interest ROI. The embedded data acquiring section 414 extracts high dynamic range information of two successive frames.

The embedded data acquiring section 414 acquires, per frame, the coordinates of a pixel at a left upper end, for example, of a region of interest ROI, information regarding the size (a length in the X-axis directions and a length in the Y-axis directions) of the region of interest ROI, and column information of the region of interest ROI, and outputs the acquired information to the Cam CPU 411.

The embedded data acquiring section 414 acquires, other than the HDR information, various pieces of information (for example, the number of regions of interest ROI, the region numbers and priority of the regions of interest ROI, the data lengths of the regions of interest ROI, the image format of the regions of interest ROI, etc.) included in the embedded data. The embedded data acquiring section 414 outputs the acquired various pieces of information to the Cam CPU 411.

As illustrated in FIG. 14, the Cam CPU 411 is configured to send out an image capturing method and parameters such as exposure conditions to the sensor CPU 321. The Cam CPU 411 sends out information indicative of image capturing for use in an HDR rendering process, for example, as the image capturing method, to the sensor CPU 321.

Moreover, the Cam CPU 411 has a ROI conformity determining section 411a. The ROI conformity determining section (an example of a controlling section) 411a is configured to decide whether or not the regions of interest ROI of respective two frames are in conformity with each other on the basis of single information or combined information of the regions of interest ROI of the respective two frames where the pieces of identifying information of the regions of interest ROI are in conformity with each other and which are successive. Each of the Cam CPU 411 that has the ROI conformity determining section 411a and the controlling section 41 that has the Cam CPU 411 corresponds to an example of a controlling section for deciding whether or not the regions of interest ROI of respective two frames are in conformity with each other on the basis of single information or combined information of the regions of interest ROI of the respective two frames where the pieces of identifying information of the regions of interest ROI are in conformity with each other and which are successive. Specifically, the ROI conformity determining section 411a is configured to determine conformity between regions of interest ROI in different frames on the basis of various pieces of information input from the embedded data acquiring section 414. In other words, the ROI conformity determining section 411a determines whether or not two regions of interest ROI in different frames satisfy the above rendering conditions 1 through 3 on the basis of various pieces of information input from the embedded data acquiring section 414. In a case where information regarding a plurality of regions of interest ROI in one frame is input from the embedded data acquiring section 414, the ROI conformity determining section 411a determines whether or not each region of interest ROI is in conformity with the region of interest ROI in another frame.

In a case where information regarding regions of interest ROI is input from the embedded data acquiring section 414, the ROI conformity determining section 411a determines whether or not there exists a region of interest ROI that satisfies the rendering conditions 1 through 3 in order to determine whether or not HDR rendering is to be performed. The ROI conformity determining section 411a determines whether or not there exists a region of interest ROI that satisfies the rendering condition 1 among different frames. If the ROI conformity determining section 411a determines that there exists a region of interest ROI that satisfies the rendering condition 1, then the ROI conformity determining section 411a next determines whether or not the region of interest ROI satisfies the rendering condition 2.

In order to determine whether or not the rendering condition 2 is satisfied, the ROI conformity determining section 411a determines whether or not the coordinates (an example of the single information) of the reference pixels of two regions of interest ROI, for example, that satisfy the rendering condition 1 (i.e., the region numbers are in conformity with each other) have a predetermined degree of conformity. Here, the X-coordinate of a reference pixel of a region of interest ROI in an i−1 frame (i is a natural number) is represented by "Xr(i−1)," and the Y-coordinate of the reference pixel is represented by "Yr(i−1)." Moreover, the X-coordinate of a reference pixel of a region of interest ROI in an i frame (i is a natural number) is represented by "Xr(i)," and the Y-coordinate of the reference pixel is represented by "Yr(i)." Furthermore, a predetermined threshold value for X coordinates is represented by "Xth," and a predetermined threshold value for Y coordinates is represented by "Yth." The ROI conformity determining section 411a determines whether or not the coordinates of the reference pixels of the two regions of interest ROI that satisfy the rendering condition 1 satisfy both the following formulas (1) and (2):

$$Xr(i)-Xr(i-1) \leq Xth \quad (1)$$

$$Yr(i)-Yr(i-1) \leq Yth \quad (2)$$

If the ROI conformity determining section 411a has determined that the rendering condition 2 is satisfied, then the ROI conformity determining section 411a determines whether or not the regions of interest ROI that satisfy the rendering condition 2 satisfy the rendering condition 3. In order to determine whether or not the rendering condition 3 is satisfied, the ROI conformity determining section 411a determines whether or not the sizes (an example of the single information) of the regions of interest ROI that satisfy the rendering condition 2 have a predetermined degree of conformity. Here, the length in the X-axis directions (horizontal directions) of a region of interest ROI in an i−1 frame (i is a natural number) is represented by "XL(i−1)," and the length in the Y-axis directions (vertical directions) is represented by "YL(i−1)." Moreover, the length in the X-axis directions (horizontal directions) of a region of interest ROI in an i frame (i is a natural number) is represented by "XL(i)," and the length in the Y-axis directions (vertical directions) is represented by "YL(i)." Furthermore, a predetermined threshold value in the X-axis directions (horizontal directions) is represented by "XLth," and a predetermined threshold value in the Y-axis directions (vertical directions) is represented by "YLth." The ROI conformity determining section 411a determines whether or not the sizes of the two regions of interest ROI that satisfy the rendering condition 2 satisfy both the following formulas (3) and (4):

$$XL(i)-XL(i-1) \leq XLth \quad (3)$$

$$YL(i)-YL(i-1) \leq YLth \quad (4)$$

The X-coordinate threshold value, the Y-coordinate threshold value, the X-direction threshold value, and the Y-direction threshold value are established depending on the resolution of the image capturing region of the image capturing section 31 and the usage of the video transmitting apparatus 3, the video receiving apparatus 4, and the video transmission system 10. For example, the higher the resolution of the image capturing region of the image capturing section 31, the larger values the respective threshold values are set to. If the resolution of the image capturing region of the image capturing section 31 is higher, then even when the two regions of interest ROI deviate somewhat in position and size from each other, the user is more unlikely to visually perceive the effect of the deviation in an HDR-rendered image, resulting in practically no problem. Furthermore, in uses where there are larger tolerances for the effect of the deviation in an HDR-rendered image, the X-coordinate threshold value, the Y-coordinate threshold value, the X-direction threshold value, and the Y-direction threshold value may be set to larger values. Moreover, some of the X-coordinate threshold value, the Y-coordinate threshold value, the X-direction threshold value, and the Y-direction threshold value may be set to larger values (smaller values), whereas the remaining ones may be set to smaller values (larger values) than those some threshold values.

In such a manner, the ROI conformity determining section 411a decides whether or not each of the rendering condition 2 and the rendering condition 3 is satisfied on the basis of the single information. Therefore, with respect to the rendering conditions 1 through 3 as viewed in their entirety, the ROI conformity determining section 411a decides whether or not the respective regions of interest ROI in two frames are in conformity with each other on the basis of combined information representing a combination of two single pieces of information. The sequence in which to determine the rendering condition 2 and the rendering condition 3 is not limited to the sequence described above. The ROI conformity determining section 411a may determine the rendering condition 3 first and then may determine the rendering condition 2 providing the rendering condition 3 is satisfied. Moreover, if one rendering condition is not satisfied, then the ROI conformity determining section 411a can reduce the processing load by omitting to determine the remaining rendering conditions.

If the ROI conformity determining section 411a has determined that regions of interest ROI that satisfy the rendering conditions 1 through 3 exist on the basis of the HDR information input from the embedded data acquiring section 414, then the Cam CPU 411 outputs an HDR instruction signal including the region numbers of the regions of interest ROI that have satisfied the conditions for performing an HDR rendering process and instruction information that instructs the execution of the HDR rendering process to an HDR rendering section 42 (to be described in detail later). On the other hand, if the ROI conformity determining section 411a has determined that no regions of interest ROI that satisfy the rendering conditions 1 through 3 exist on the basis of the HDR information input from the embedded data acquiring section 414, then the Cam CPU 411 outputs an HDR instruction signal including instruction information that instructs the non-execution of the HDR rendering process to the HDR rendering section 42.

As illustrated in FIG. 14, the video receiving apparatus 4 includes the HDR rendering section (an example of a processing section) 42 that processes high dynamic range rendering of the image data of the regions of interest ROI using the high dynamic range information extracted by the embedded data acquiring section 414. In a case where the HDR rendering section 42 has received an HDR instruction signal including instruction information instructing the execution of the HDR rendering process, the HDR rendering section 42 reads the image data of the regions of interest ROI included in the HDR instruction signal from the storage section 413, and generates an HDR-rendered image using the read image data. Specifically, in two frames where the region numbers (an example of identifying information) of regions of interest ROI are in conformity with each other and which are successive, in a case where the difference between the coordinates of ends of the regions of interest ROI and the difference between the sizes of the regions of interest ROI are equal to or smaller than respective predetermined threshold values, the HDR rendering section 42 performs high dynamic range rendering on the image data of the regions of interest ROI on the basis of exposure information of the regions of interest ROI.

On the other hand, in a case where the HDR rendering section 42 has received an HDR instruction signal including instruction information instructing the non-execution of the HDR rendering process, the HDR rendering section 42 reads the image data under reference exposure conditions of the regions of interest ROI included in the HDR instruction signal from the storage section 413, and outputs the read image data to an apparatus in a subsequent stage. Specifically, in two frames where the region numbers (an example of identifying information) or regions of interest ROI are in conformity with each other and which are successive, in a case where at least one of the difference between the coordinates of ends of the regions of interest ROI and the difference between the sizes of the regions of interest ROI is larger than a predetermined threshold value, the HDR rendering section 42 does not perform high dynamic range rendering on the image data of the regions of interest ROI.

The video receiving apparatus 4 may have an image quality adjusting section (not illustrated) in a stage subsequent to the HDR rendering section 42. The image quality adjusting section may be configured to perform an RGB process for adjusting gamma correction and white balance and a YC process for adjusting the gradation and lightness of the image quality on the image data input from the HDR rendering section 42, thereby adjusting the image quality. The image quality adjusting section is configured to output an image whose image quality has been adjusted to a display device (not illustrated), for example. An image where HDR rendering has been performed as required at locations corresponding to the regions of interest ROI is thus displayed on the display device.

(High Dynamic Range Rendering Process)

Next, a high dynamic range rendering processing method in the transmitting apparatus, the receiving apparatus, and the transmission system according to the present embodiment will be describe below using FIG. 15 with reference to FIG. 14. FIG. 15 is a flowchart illustrating an example of sequence of the high dynamic range rendering process in the transmitting apparatus, the receiving apparatus, and the transmission system according to the present embodiment.

(Step S31)

Figure 15:
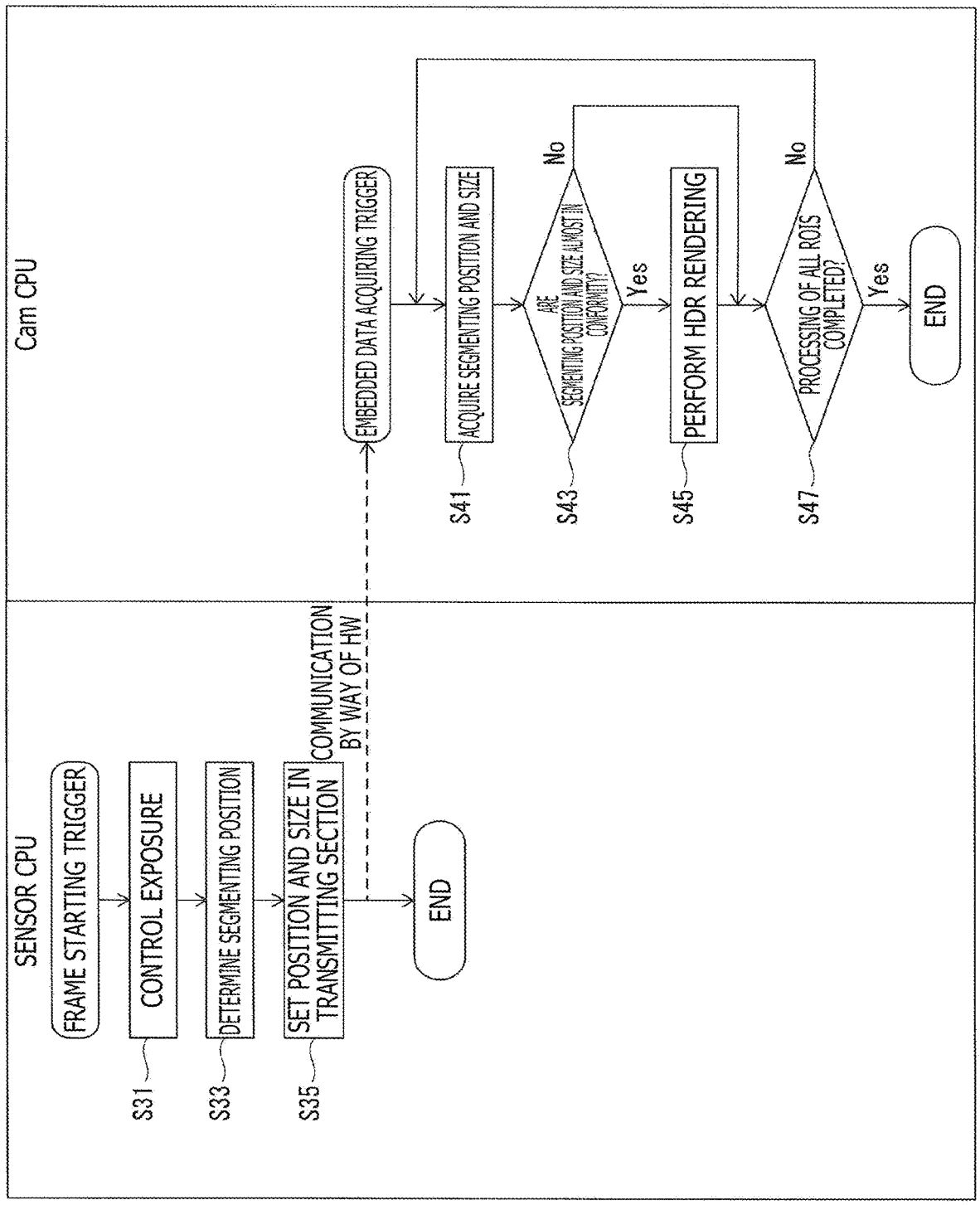
FIG. 15 is a flowchart illustrating an example of sequence of the high dynamic range rendering process in the transmitting apparatus, the receiving apparatus, and the transmission system according to the first embodiment.

As illustrated in FIG. 15, in a case where the sensor CPU 321 included in the video transmitting apparatus 3 detects a frame starting trigger and image capturing in a high dynamic range has been determined, the sensor CPU 321 initially establishes exposure conditions for controlling the exposure in the image capturing section 31, and then goes to the processing of step S33. The sensor CPU 321 establishes a plurality of exposure conditions based on detected information input from the detecting section 323. Moreover, the sensor CPU 321 establishes the exposure conditions as including reference exposure conditions.

(Step S33)

The sensor CPU 321 determines a segmenting position for segmenting an image from the image capturing region of the image capturing section 31 and goes to the processing of step S35. In step S33, the sensor CPU 321 determines the segmenting position, i.e., the coordinates of a reference pixel of a region of interest ROI (the coordinates of a left upper end of a region of interest ROI according to the present embodiment), and an image size (lengths in the X-axis direction and the Y-axis direction) thereof. Moreover, the sensor CPU 321 sets the determined coordinates and image size of the region of interest ROI and information where the exposure conditions and digital gain of the region of interest ROI are associated with the region number of the region of interest ROI, as HDR information in the embedded data. The sensor CPU 321 acquires HDR information per frame input from the image capturing section 31 and sets the acquired. HDR information in the embedded data.

(Step S35)

The sensor CPU 321 sets transmission data including the embedded data where the HDR information and various other pieces of information are set in the transmitting section 322, whereupon the HDR rendering process is ended.

The transmission data set in step S35 is transmitted from the video transmitting apparatus 3 to the video receiving apparatus 4 by way of communication through hardware (HW) using MIPI.

The receiving section 412 included in the video receiving apparatus 4 extracts the embedded data from the received transmission data and outputs the embedded data to the embedded data acquiring section 414. The embedded data acquiring section 414 decodes the embedded data input from the receiving section 412, acquires various pieces of information (for example, the number of regions of interest ROI, the region numbers and priority of the regions of interest ROI, the data lengths of the regions of interest ROI, the image format of the regions of interest ROI, etc.), and outputs the acquired various pieces of information to the Cam CPU 411.

(Step S41)

The Cam CPU 411, triggered by the timing at which the embedded data are decoded by the embedded data acquiring section 414, acquires the coordinates (position and size) or a region of interest ROI whose priority is highest on the basis of the various pieces of information acquired and input by the embedded data acquiring section 414 from the transmission data received by the receiving section 412, and then goes to the processing of step S43. Moreover, in step S41, the Cam CPU 411 acquires, per frame, the segmenting position and size (i.e., the coordinates of the reference pixel, the length in the X-axis direction, and the length in the Y-axis direction) of the region of interest ROI whose priority is highest on the basis of the HDR information included in the various pieces of information.

(Step S43)

The Cam CPU 411 determines whether or not the segmenting positions and sizes of the regions of interest ROI in frames are in conformity with each other on the basis of the HDR information of the acquired regions of interest ROI. If the Cam CPU 411 determines that all of the rendering conditions 1 through 3 are satisfied on the basis of the ROI conformity determining section 411*a* determining whether or not the rendering conditions 1 through 3 are satisfied, then the Cam CPU 411 goes to the processing of step S45. If the Cam CPU 411 determines that at least one of the rendering conditions 1 through 3 is not satisfied, then the Cam CPU 411 goes to the processing of step S47.

(Step S45)

The Cam CPU 411 outputs an HDR instruction signal including the region numbers of the regions of interest ROI that have satisfied the conditions for performing an HDR rendering process and instruction information that instructs the execution of the HDR rendering process to the HDR rendering section 42, and goes to the processing of step S47.

On the basis of the HDR instruction signal input from the Cam CPU 411, the HDR rendering section 42 reads the image data of the regions of interest ROI from the storage section 413 and performs the HDR rendering process on the read image data.

(Step S47)

The Cam CPU 411 determines whether or not the processing of steps 341 through 345 has been performed on all the regions of interest ROI input from the embedded data acquiring section 414. If the Cam CPU 411 determines that the processing has been performed on all the regions of interest ROI (Yes), then the Cam CPU 411 ends the HDR rendering process. On the other hand, if the Cam CPU 411 determines that the processing has not been performed on all the regions of interest ROI (No), then the Cam CPU 411 goes back to the processing of step S41. The Cam CPU 411 repeats the processing from step S41 to step S47 until the HDR rendering process is completed on all the regions of interest ROI.

As described above, the transmitting apparatus, the receiving apparatus, and the transmission system according to the present embodiment can perform the high dynamic range rendering process on some regions of interest (ROI) segmented from a captured image.

Moreover, the transmitting apparatus, the receiving apparatus, and the transmission system according to the present embodiment can perform high dynamic range rendering on a partial image representing a segmented object specified as an imaging target without transmitting a captured image in its entirety. Since the transmitting apparatus, the receiving apparatus, and the transmission system according to the present embodiment can thus reduce the processing load according to high dynamic range rendering, they can reduce electric power consumption. Furthermore, long and short exposure in the transmitting apparatus, the receiving apparatus, and the transmission system according to the present embodiment can be countermeasures against flickering.

(Modification 1)

A transmitting apparatus, a receiving apparatus, and a transmission system according to Modification 1 of the above first embodiment will be reference to FIG. 14. The transmitting apparatus, the receiving apparatus, and the transmission system according to the present modification are characterized in that the ROI conformity determining section 411a according to the first embodiment is disposed in the video transmitting apparatus 3, not in the video receiving apparatus 4. According to the present modification, the ROI conformity determining section will be described below using the same reference character as the ROI conformity determining section 411a according to the first embodiment for the convenience of explanation.

The ROI conformity determining section (an example of a controlling section) 411a according to the present modification is connected to the conversion area controlling section 321b and disposed in the sensor CPU 321. Therefore, the ROI conformity determining section 411a is supplied with single information representing either one of the coordinates of an end of, the size, and the exposure information of a region of interest ROI, or combined information representing a combination of two or more of the coordinates, the size, and the exposure information, as input information from the conversion area controlling section 321b. The ROI conformity determining section 411a is configured to perform the similar functions to the ROI conformity determining section 411a according to the first embodiment. Consequently, the ROI conformity determining section 411a can decide whether or not the respective regions of interest ROI in two frames are in conformity with each other on the basis of single information or combined information of the regions of interest ROI of the respective two frames where the pieces of identifying information of the regions of interest ROI are in conformity with each other and which are successive.

Therefore, the sensor CPU 321 having the ROI conformity determining section and the controlling section 32 having the sensor CPU 321 according to the present modification correspond to an example of a controlling section for deciding whether or not the regions of interest ROI in respective two frames are in conformity with each other on the basis of the single information or the combined information.

The ROI conformity determining section 411a is connected to the transmitting section 322, for example. Therefore, the ROI conformity determining section 411a can output information regarding the result of the decision as to whether or not the regions of interest ROI in respective two frames are in conformity with each other and information associated with the identifying information of the regions of interest ROI. In this manner, the transmitting section 322 can include, in ROI information, single information or combined information including the information regarding the result of the decision as to whether or not the regions of interest ROI in respective two frames are in conformity with each other, the information associated with the identifying information of the regions of interest ROI, and information of defective pixels with the conversion area controlling section 321b, and sends out the ROI information to the receiving section 412 included in the video receiving apparatus 4.

The receiving section 412 receives a transmission signal including the ROI information that has the single information or combined information including the information regarding the result of the decision as to whether or not the regions of interest ROI in respective two frames are in conformity with each other, the information associated with the identifying information of the regions of interest ROI, and the information of defective pixels, from the video transmitting apparatus 3. The embedded data acquiring section 414 can acquire the information regarding the result of the decision, the identifying information of the regions of interest ROI, and the information of defective pixels, from the ROI information received by the receiving section 412. The HDR rendering section 42 can perform an HDR rendering process on the basis of the information regarding the result of the decision, the identifying information of the regions of interest ROI, and the information of defective pixels acquired by the embedded data acquiring section 414.

(Modification 2)

A transmitting apparatus, a receiving apparatus, and a transmission system according to Modification 2 of the above first embodiment will be reference to FIG. 14. The transmitting apparatus, the receiving apparatus, and the transmission system according to the present modification are characterized in that the HDR rendering section 42 according to Modification 1 is disposed in the video transmitting apparatus 3, not in the video receiving apparatus 4. According to the present modification, the ROI conformity determining section and the HDR rendering section 42 will be described below using the same reference characters as the ROI conformity determining section 411a and the HDR rendering section 42 according to the first embodiment for the convenience of explanation.

According to the present modification, the ROI conformity determining section 411a is connected to the HDR rendering section (an example of a controlling section) 42, not to the transmitting section 322. Furthermore, the conversion area controlling section 321b is connected to the HDR rendering section 42 in addition to the ROI conformity determining section 411a. The HDR rendering section 42 is thus supplied with information regarding the result of the decision as to whether or not the regions of interest ROI in respective two frames are in conformity with each other, identifying information of the regions of interest ROI, and information of defective pixels, as input information.

Therefore, in a case where the ROI conformity determining section 411a decides that the regions of interest ROI in two respective frames are in conformity each other, the HDR rendering section 42 can perform high dynamic range rendering on image data of the regions of interest ROI on the basis of exposure information. On the other hand, in a case where the ROI conformity determining section 411a decides that the regions of interest ROI in two respective frames are not in conformity each other, the HDR rendering section 42 does not perform high dynamic range rendering on image data of the regions of interest ROI.

According to the present modification, the HDR rendering section 42 is connected to the transmitting section 322. Therefore, in a case where the HDR rendering section 42 has performed high dynamic range rendering, the HDR rendering section 42 can output image data rendered by high dynamic range render ring to the transmitting section 322. The transmitting section 322 can include the image data rendered by high dynamic range rendering by the HDR rendering section in ROI information, and send out the ROI information.

In a case where the image data rendered by HDR rendering are input from the video transmitting apparatus 3 to the video receiving apparatus 4, the video receiving apparatus 4 may perform an RGB process for adjusting gamma correction and white balance and a YC process for adjusting the gradation and lightness of the image quality, for example, on the image data, thereby adjusting the image quality. The image receiving apparatus 4 is configured to output images that have been adjusted in image quality to a display device (not illustrated), for example. An image where HDR rendering has been performed as required at locations corresponding to the regions of interest ROI is thus displayed on the display device.

As described above, the transmitting apparatus, the receiving apparatus, and the transmission systems according to Modification 1 and Modification 2 offer the similar advantages to the transmitting apparatus, the receiving apparatus, and the transmission system according to the first embodiment.

Second Embodiment

5. The Principles of a High Dynamic Range Rendering Process According to a Second Embodiment of the Present Disclosure:

Next, the principles of a high dynamic range rendering process according to the second embodiment of the present disclosure will be described below with reference to FIGS. 16 through 21. The HDR rendering process according to the present embodiment is characterized in that it is applied to situations where images captured under different exposure conditions are mixedly present in one region of interest ROI.

Figure 16:
FIG. 16 is a diagram schematically illustrating a high dynamic range rendering process according to a second embodiment.

FIG. 16 is a diagram schematically illustrating a high dynamic range rendering process according to the present embodiment. As indicated on the left side of the thick arrow in FIG. 16, a region of interest ROI has an alternate array of two rows of images of short exposure and two rows of images of long exposure. In a case where pixels (i.e., photoelectric transducers) controlled under different exposure conditions are thus mixedly present in one region of interest ROI, according to the present embodiment, an HDR rendering process is carried out per region of interest ROI by specifying the coordinates of a reference pixel of a region of interest ROI and an exposure pattern where short exposure and long exposure are combined. Consequently, an HDR-rendered image can be generated in the region of interest ROI, as indicated on the right side of the thick arrow in FIG. 16.

Figure 17:
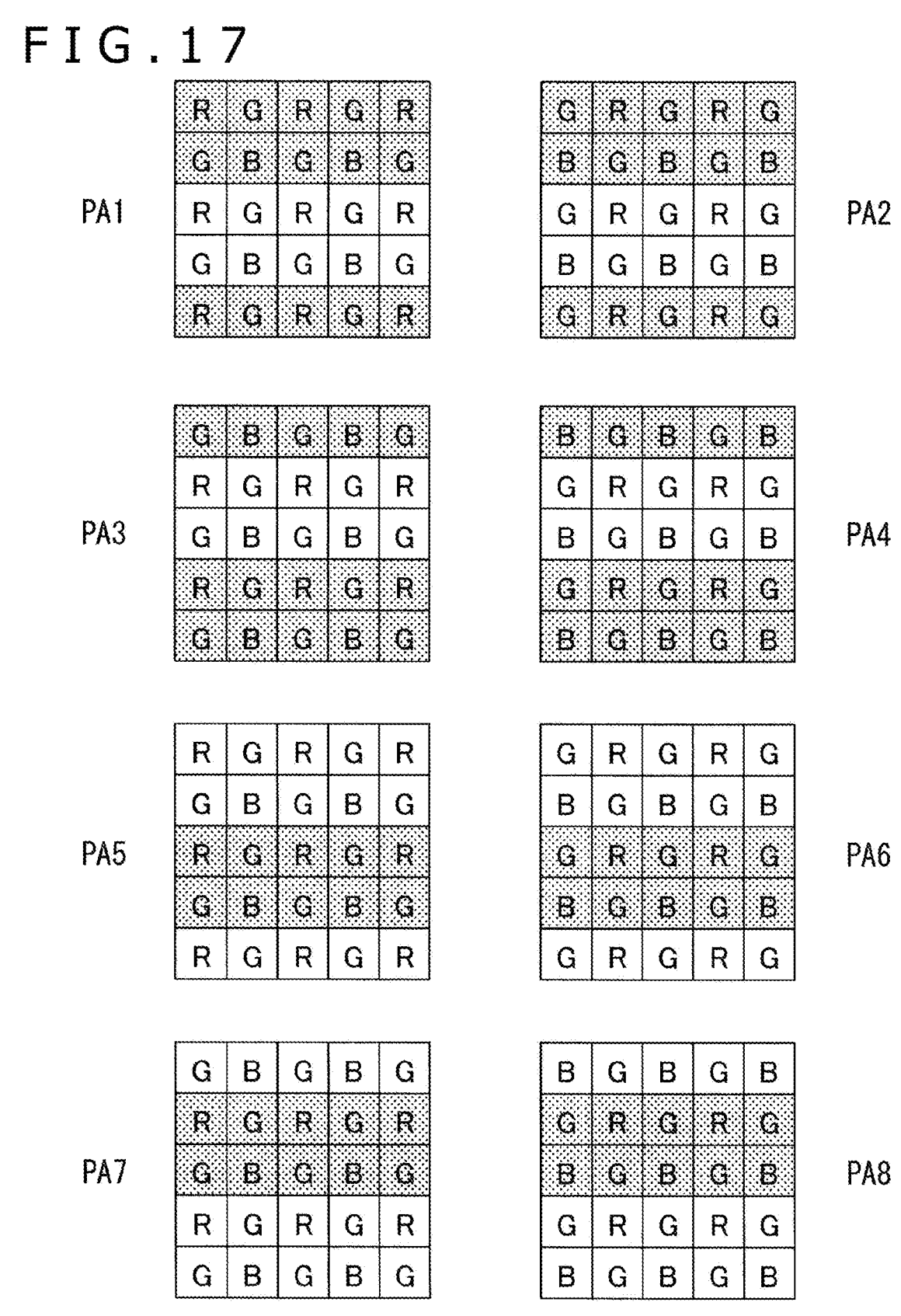

The exposure pattern will be described hereinbelow using FIGS. 17 through 19 with reference to FIG. 16. FIG. 17 is a diagram illustrating exposure patterns PA1 through PA4 of image capturing elements extracted from an image capturing region illustrated on the right side of the thick arrow in FIG. 16. An array where exposures and colors in the image capturing region illustrated on the right side of the thick arrow in FIG. 16 are combined will be referred to as "array example A."

The captured image illustrated on the right side of the thick arrow in FIG. 16 has an alternate array of two rows of images of short exposure and two rows of images of long exposure, as described above. In other words, the image capturing region in an array example 1 has an alternate array of two rows of images of short exposure and two rows of images of long exposure. Moreover, the image capturing region in the array example 1 has a red pixel (hereinafter also referred to as "R pixel") disposed at a left upper end thereof. Furthermore, the image capturing region in the array example 1 has odd-numbered rows where an R pixel is located at a left end and R pixels and green pixels (hereinafter referred to as "G pixel") are alternately disposed, and even-numbered rows where a G pixel is located at a left end and G pixels and blue pixels (hereinafter referred to as "B pixel") are alternately disposed.

A color array of pixels in the entire image capturing region in the array example A is fixedly established. Therefore, in a case where a region of interest ROI is segmented from the entire image capturing region in the array example A, there are eight exposure patterns PA1 through PA8 as combinations of exposures and color arrays included in the region of interest ROI, as illustrated in FIG. 17, depending on segmenting positions.

As illustrated in FIG. 17, providing a reference pixel is located at a left upper end of the region of interest ROI, the left upper end of the exposure pattern PA1 corresponds to an R pixel of short exposure. The coordinates of the left upper end of the exposure pattern PA1 include an X coordinate represented by "2×m−1" and a Y coordinate represented by "1+(n−1)×d" where m and n are natural numbers and d the number of kinds of array patterns in the Y-axis directions (vertical directions), d being "4" in the present example. Hereinafter, m, n, and d mean the same throughout the array patterns according to the present embodiment. If a segmented region has a size of 5 rows and 5 columns, then, as illustrated in FIG. 17, the exposure pattern PA1 has a first row of "R pixel, G pixel, R pixel, G pixel, R pixel" of short exposure and a second row of "G pixel, B pixel, G pixel, B pixel, G pixel" of short exposure. Furthermore, the exposure pattern PA1 has a third row of "R pixel, G pixel, R pixel, G pixel, R pixel" of long exposure and a fourth row of "G pixel, B pixel, G pixel, B pixel, G pixel" of long exposure. Moreover, the exposure pattern PA1 has a fifth row whose exposure condition and color array are the same as the first row.

As illustrated in FIG. 17, the left upper end of the exposure pattern PA2 corresponds to a G pixel of short exposure. The coordinates of the left upper end of the exposure pattern PA2 include an X coordinate represented by "2×m" and a Y coordinate represented by "1+(n−1)×d." If a segmented region has a size of 5 rows and 5 columns, then, as illustrated in FIG. 17, the exposure pattern PA2 has a first row of "G pixel, R pixel, G pixel, R pixel, G pixel" of short exposure and a second row of "B pixel, G pixel, B pixel, G pixel, B pixel" of short exposure. Furthermore, the exposure pattern PA2 has a third row of "G pixel, R pixel, G pixel, R pixel, G pixel" of long exposure and a fourth row of "B pixel, G pixel, B pixel, G pixel, B pixel" of long exposure. Moreover, the exposure pattern PA2 has a fifth row whose exposure condition and color array are the same as the first row.

As illustrated in FIG. 17, the left upper end of the exposure pattern PA3 corresponds to a G pixel of short exposure. The coordinates of the left upper end of the exposure pattern PA3 include an X coordinate represented by "2×m−1" and a Y coordinate represented by "2+(n−1)×d." If a segmented region has a size of 5 rows and 5 columns, then, as illustrated in FIG. 17, the exposure pattern PA3 has a first row of "G pixel, B pixel, G pixel, B pixel, G pixel" of short exposure and a second row of "R pixel, G pixel, R pixel, G pixel, R pixel" of long exposure. Furthermore, the exposure pattern PA3 has a third row of "G pixel, B pixel, G pixel, B pixel, G pixel" of long exposure and a fourth row of "R pixel, G pixel, R pixel, G pixel, R pixel" of short exposure. Moreover, the exposure pattern PA3 has a fifth row whose exposure condition and color array are the same as the first row.

As illustrated in FIG. 17, the left upper end of the exposure pattern PA4 corresponds to a B pixel of short exposure. The coordinates of the left upper end of the exposure pattern PA4 include an X coordinate represented by "2×m" and a Y coordinate represented by "2+(n−1)×d." If a segmented region has a size of 5 rows and 5 columns, then, as illustrated in FIG. 17, the exposure pattern PA4 has a first row of "B pixel, G pixel, B pixel, G pixel, B pixel" of short exposure and a second row of "G pixel, R pixel, G pixel, R pixel, G pixel" of long exposure. Furthermore, the exposure pattern PA4 has a third row of "B pixel, G pixel, B pixel, G pixel, B pixel" of long exposure and a fourth row of "G pixel, R pixel, G pixel, R pixel, G pixel" of short exposure. Moreover, the exposure pattern PA4 has a fifth row whose exposure condition and color array, are the same as the first row.

As illustrated in FIG. 17, the left upper end of the exposure pattern PA5 corresponds to an R pixel of long exposure. The coordinates of the left upper end of the exposure pattern PA5 include an X coordinate represented by "2×m−1" and a Y coordinate represented by "3+(n−1)×d." If a segmented region has a size of 5 rows and 5 columns, then, as illustrated in FIG. 17, the exposure pattern PA5 has a color array that is identical to the color array of the exposure pattern PA1 and a pattern of short exposure and long exposure that is inverse to the pattern of short exposure and long exposure of the exposure pattern PA1.

As illustrated in FIG. 17, the left upper end of the exposure pattern PA6 corresponds to a G pixel of long exposure. The coordinates of the left upper end of the exposure pattern PA6 include an X coordinate represented by "2×m" and a Y coordinate represented by "3+(n−1)×d." If a segmented region has a size of 5 rows and 5 columns, then, as illustrated in FIG. 17, the exposure pattern PA6 has a color array that is identical to the color array of the exposure pattern PA2 and a pattern of short exposure and long exposure that is inverse to the pattern of short exposure and long exposure of the exposure pattern PA2.

As illustrated in FIG. 17, the left upper end of the exposure pattern PA7 corresponds to a G pixel of long exposure. The coordinates of the left upper end of the exposure pattern PA7 include an X coordinate represented by "2×m−1" and a Y coordinate represented by "4+(n−1)×d." If a segmented region has a size of 5 rows and 5 columns, then, as illustrated in FIG. 17, the exposure pattern PA7 has a color array that is identical to the color array of the exposure pattern PA3 and a pattern of short exposure and long exposure that is inverse to the pattern of short exposure and long exposure of the exposure pattern PA3.

As illustrated in FIG. 17, the left upper end of the exposure pattern PA8 corresponds to a B pixel of long exposure. The coordinates of the left upper end of the exposure pattern PA8 include an X coordinate represented by "2×m" and a Y coordinate represented by "4+(n−1)×d." If a segmented region has a size of 5 rows and 5 columns, then, as illustrated in FIG. 17, the exposure pattern PA8 has a color array that is identical to the color array of the exposure pattern PA4 and a pattern of short exposure and long exposure that is inverse to the pattern of short exposure and long exposure of the exposure pattern PA4.

FIG. 18 is a diagram schematically illustrating an array example B of a combination of exposure conditions and color arrays of image capturing elements provided in the image capturing region of an image capturing section. FIG. 19 is a diagram illustrating exposure patterns PB1 through PB16 of the image capturing elements segmented from the array example B illustrated in FIG. 18.

As illustrated in FIG. 18, the array example B has odd-numbered rows where R pixels and G pixels are alternately arrayed and even-numbered rows where G pixels and B pixels are alternately arrayed. Moreover, the array example B has R pixels located at left ends of the odd-numbered rows and G pixels located at left ends of the even-numbered rows. Furthermore, the array example B includes sets of a G pixel and a pixel adjacent to the G pixel on the right side thereof, the sets having exposure conditions of short exposure and long exposure that are alternately repeated. In the array example B, moreover, the exposure condition at the left ends of the first, fourth, fifth, and sixth rows represents short exposure, and the exposure condition at the left ends of the remaining rows represents long exposure.

A color array of pixels in the entire image capturing region in the array example B is fixedly established. Therefore, in a case where a region of interest ROI is segmented from the entire image capturing region in the array example B, there are sixteen exposure patterns PB1 through PB16 as combinations of exposures and color arrays included in the region of interest ROI, as illustrated in FIG. 19, depending on segmenting positions.

As illustrated in FIG. 19, providing a reference pixel is located at a left upper end of the region of interest ROI, the left upper end of the exposure pattern PB1 corresponds to an R pixel of short exposure. The coordinates of the left upper end of the exposure pattern PB1 include an X coordinate represented by "1+(m−1)×dx" and a Y coordinate represented by "1+(n−1)×dy" where dx represents the number of kinds of array patterns in the X-axis directions (horizontal directions), dx being "4" is the present example, and dy the number of kinds of array patterns in the Y-axis directions (vertical directions), dy being "4" in the present example. If a segmented region has a size of 5 rows and 5 columns, then, as illustrated in FIG. 19, the exposure pattern PB1 has a first row of "short-exposure R pixel, long-exposure G pixel, long-exposure R pixel, short-exposure G pixel, short-exposure R pixel" and a second row of "long-exposure G pixel, long-exposure B pixel, short-exposure G pixel, short-exposure B pixel, long-exposure G pixel." Here, the short-exposure R pixel," for example, means an R pixel whose exposure condition is short exposure, and the "long-exposure R pixel" means an R pixel whose exposure condition is long exposure. Combinations of other exposure conditions and color pixels are similarly represented. Moreover, the exposure pattern PB1 has a third row of "long-exposure R pixel, short-exposure G pixel, long-exposure R pixel, short-exposure G pixel, long-exposure R pixel" and a fourth row of "short-exposure G pixel, short-exposure B pixel, long-exposure G pixel, long-exposure B pixel, short-exposure G pixel." Furthermore, the exposure pattern PB1 has a fifth row whose exposure conditions and color array are identical to those of the first row.

As illustrated in FIG. 19, the left upper end of the exposure pattern PB2 corresponds to a G pixel of long exposure. The coordinates of the left upper end of the exposure pattern PB2 include an X coordinate represented by "2+(m−1)×dx" and a Y coordinate represented by "1+(n−1)×dy." If a segmented region has a size of 5 rows and 5 columns, then, as illustrated in FIG. 19, the exposure pattern PB2 has a first row of "long-exposure G pixel, long-exposure R pixel, short-exposure G pixel, short-exposure R pixel, long-exposure G pixel" and a second row of "long-exposure B pixel, short-exposure G pixel, short-exposure B pixel, long-exposure G pixel, long-exposure B pixel." Moreover, the exposure pattern PB2 has a third row of "short-exposure G pixel, short-exposure R pixel, long-exposure G pixel, long-exposure R pixel, short-exposure G pixel" and a fourth row of "short-exposure B pixel, short-exposure G pixel, long-exposure B pixel, long-exposure G pixel, short-exposure B pixel." Furthermore, the exposure pattern PB2 has a fifth row whose exposure conditions and color array are identical to those of the first row.

As illustrated in FIG. 19, the left upper end of the exposure pattern PB3 corresponds to an R pixel of long exposure. The coordinates of the left upper end of the exposure pattern PB3 include an X coordinate represented by "3+(m−1)×dx" and a Y coordinate represented by "1+(n−1)×dy." If a segmented region has a size of 5 rows and 5 columns, then, as illustrated in FIG. 19, the exposure pattern PB3 has a first row of "long-exposure R pixel, short-exposure G pixel, short-exposure R pixel, long-exposure G pixel, long-exposure R pixel" and a second row of "short-exposure G pixel, short-exposure B pixel, long-exposure G pixel, long-exposure B pixel, short-exposure G pixel." Moreover, the exposure pattern PB3 has a third row of "short-exposure R pixel, long-exposure G pixel, long-exposure R pixel, short-exposure G pixel, short-exposure R pixel" and a fourth row of "long-exposure G pixel, long-exposure B pixel, short-exposure G pixel, short-exposure B pixel, long-exposure G pixel." Furthermore, the exposure pattern PB3 has a fifth row whose exposure conditions and color array are identical to those of the first row.

As illustrated in FIG. 19, the left upper end of the exposure pattern PB4 corresponds to a G pixel of short exposure. The coordinates of the left upper end of the exposure pattern PB4 include an X coordinate represented by "4+(m−1)×dx" and a Y coordinate represented by "1+(n−1)×dy." If a segmented region has a size of 5 rows and 5 columns, then, as illustrated in FIG. 19, the exposure pattern PB4 has a first row of "short-exposure G pixel, short-exposure R pixel, long-exposure G pixel, long-exposure R pixel, short-exposure G pixel" and a second row of "short-exposure B pixel, long-exposure G pixel, long-exposure B pixel, short-exposure G pixel, short-exposure B pixel." Moreover, the exposure pattern PB5 has a third row of "long-exposure G pixel, long-exposure R pixel, short-exposure G pixel, short-exposure R pixel, long-exposure G pixel" and a fourth row of "long-exposure B pixel, short-exposure G pixel, short-exposure B pixel, long-exposure G pixel, long-exposure B pixel." Furthermore, the exposure pattern PB4 has a fifth row whose exposure conditions and color array are identical to those of the first row.

As illustrated in FIG. 19, the left upper end of the exposure pattern PB5 corresponds to a G pixel of long exposure. The coordinates of the left upper end of the exposure pattern PB5 include an X coordinate represented by "1+(m−1)×dx" and a Y coordinate represented by "2+(n−1)×d." if a segmented region has a size of 5 rows and 5 columns, then, as illustrated in FIG. 17, the exposure pattern PB5 has a first row of "long-exposure G pixel, long-exposure B pixel, snort-exposure G pixel, short-exposure B pixel, long-exposure G pixel" and a second row of "long-exposure R pixel, short-exposure G pixel, short-exposure R pixel, long-exposure G pixel, long-exposure R pixel." Moreover, the exposure pattern PB5 has a third row of "short-exposure G pixel, short-exposure B pixel, long-exposure G pixel, long-exposure B pixel, short-exposure G pixel" and a fourth row of "short-exposure R pixel, long-exposure G pixel, long-exposure R pixel, short-exposure G pixel, short-exposure R pixel." Furthermore, the exposure pattern PB5 has a fifth row whose exposure conditions and color array are identical to those of the first row.

As illustrated in FIG. 19, the left upper end of the exposure pattern PB5 corresponds to a G pixel of long exposure. The coordinates of the left upper end of the exposure pattern PB5 include an X coordinate represented by "1+(m−1)×dx" and a Y coordinate represented by "2+(n−1)×d." If a segmented region has a size of 5 rows and 5 columns, then, as illustrated in FIG. 19, the exposure pattern PB5 has first row of "long-exposure G pixel, long-exposure B pixel, short-exposure G pixel, short-exposure B pixel, long-exposure G pixel" and a second row of "long-exposure R pixel, short-exposure G pixel, short-exposure B pixel, long-exposure G pixel, long-exposure B pixel." Moreover, the exposure pattern PB5 has a third row of "short-exposure G pixel, short exposure B pixel, long-exposure G pixel, long-exposure B pixel, short-exposure G pixel" and a fourth row of "short-exposure R pixel, long-exposure G pixel, long-exposure R pixel, short-exposure G pixel, short-exposure R pixel." Furthermore, the exposure pattern PB5 has a fifth row whose exposure conditions and color array are identical to those of the first row.

As illustrated in FIG. 19, the left upper end of the exposure pattern PB6 corresponds to a B pixel of long exposure. The coordinates of the left upper end of the exposure pattern PB6 include an X coordinate represented by "2+(m−1)×dx" and a Y coordinate represented by "2+(n−1)×d." If a segmented region has a size of 5 rows and 5 columns, then, as illustrated in FIG. 19, the exposure pattern PB6 has a first row of "long-exposure B pixel, short-exposure G pixel, short-exposure B pixel, long-exposure G pixel, long-exposure B pixel" and a second row of "short-exposure G pixel, short-exposure R pixel, long-exposure G pixel, long-exposure R pixel, short-exposure G pixel." Moreover, the exposure pattern PB6 has a third row of "short-exposure B pixel, long-exposure G pixel, long-exposure B pixel, short-exposure G pixel, short-exposure B pixel" and a fourth row of "long-exposure exposure G pixel, long-exposure R pixel, short-exposure G pixel, short-exposure R pixel, long-exposure G pixel." Furthermore, the exposure pattern PB6 has a fifth row whose exposure conditions and color array are identical to those of the first row.

As illustrated in FIG. 19, the left upper end of the exposure pattern PB7 corresponds to a G pixel of short exposure. The coordinates of the left upper end of the exposure pattern PB7 include an X coordinate represented by "3+(m−1)×dx." and a Y coordinate represented by "2+(n−1)×dy." If a segmented region has a size of 5 rows and 5 columns, then, as illustrated in FIG. 19, the exposure pattern PB7 has a first row of "short-exposure G pixel, short-exposure B pixel, long-exposure G pixel, long-exposure B pixel, short-exposure G pixel" and a second row of "short-exposure R pixel, long-exposure G pixel, long-exposure R pixel, short-exposure G pixel, short-exposure R pixel." Moreover, the exposure pattern PB7 has a third row of "long-exposure G pixel, long-exposure B pixel, short-exposure G pixel, short-exposure B pixel, long-exposure G pixel" and a fourth row of "long-exposure R pixel, short-exposure G pixel, short-exposure R pixel, long-exposure G pixel, long-exposure R pixel." Furthermore, the exposure pattern PB7 has a fifth row whose exposure conditions and color array are identical to those of the first row.

As illustrated in FIG. 19, the left upper end of the exposure pattern PB8 corresponds to a B pixel of short exposure. The coordinates of the left upper end of the exposure pattern PB8 include an X coordinate represented by "4+(m−1)×dx" and a Y coordinate represented by "2+(n−1)×dy." If a segmented region has a size of 5 rows and 5 columns, then, as illustrated in FIG. 19, the exposure pattern PB8 has a first row of "short-exposure B pixel, long-exposure G pixel, long-exposure B pixel, short-exposure G pixel, short-exposure B pixel" and a second row of "long-exposure G pixel, long-exposure R pixel, short-exposure G pixel, short-exposure R pixel, long-exposure G pixel." Moreover, the exposure pattern PB8 has a third row of "long-exposure B pixel, short-exposure G pixel, short-exposure B pixel, long-exposure G pixel, long-exposure B pixel" and a fourth row of "short-exposure G pixel, short-exposure R pixel, long-exposure G pixel, long-exposure R pixel, short-exposure G pixel." Furthermore, the exposure pattern PB4 has a fifth row whose exposure conditions and color array are identical to those of the first row.

As illustrated in FIG. 19, the left upper end of the exposure pattern PB9 corresponds to an R pixel of long exposure. The coordinates of the left upper end of the exposure pattern PB9 include an X coordinate represented by "1+(m−1)×dx" and a Y coordinate represented by "3+(n−1)×dy." If a segmented region has a size of 5 rows and 5 columns, then, as illustrated in FIG. 19, the exposure pattern PB9 has a color array that is identical to the color array of the exposure pattern PB1 and a pattern of short exposure and long exposure that is inverse to the pattern of short exposure and long exposure of the exposure pattern PB1.

As illustrated in FIG. 19, the left upper end of the exposure pattern PB10 corresponds to a G pixel of short exposure. The coordinates of the left upper end of the exposure pattern PB10 include an Y coordinate represented by "2+(m−1)×dx" and a Y coordinate represented by "3+(n−1)×dy." If a segmented region has a size of 5 rows and 5 columns, then, as illustrated in FIG. 19, the exposure pattern PB10 has a color array that is identical to the color array of the exposure pattern PB2 and a pattern of short exposure and long exposure that is inverse to the pattern of short exposure and long exposure of the exposure pattern PB2.

As illustrated in FIG. 19, the left upper end of the exposure pattern PB11 corresponds to an R pixel of short exposure. The coordinates of the left upper end of the exposure pattern PB11 include an X coordinate represented by "3+(m−1)×dx" and a Y coordinate represented by "3+(n−1)×dy." if a segmented region has a size of 5 rows and 5 columns, then, as illustrated in FIG. 19, the exposure pattern PB11 has a color array that is identical to the color array of the exposure pattern PB3 and a pattern of short exposure and long exposure that is inverse to the pattern of short exposure and long exposure of the exposure pattern PB3.

As illustrated in FIG. 19, the left upper end of the exposure pattern PB12 corresponds to a G pixel of long exposure. The coordinates of the left upper end of the exposure pattern PB12 include an X coordinate represented by "4+(m−1)×dx" and a Y coordinate represented by "3+(n−1)×dy." if a segmented region has a size of 5 rows and 5 columns, then, as illustrated in FIG. 19, the exposure pattern PB12 has a color array that is identical to the color array of the exposure pattern PB4 and a pattern of short exposure and long exposure that is inverse to the pattern of short exposure and long exposure of the exposure pattern PB4.

As illustrated in FIG. 19, the left upper end of the exposure pattern PB13 corresponds to a G pixel of short exposure. The coordinates of the left upper end of the exposure pattern PB13 include an X coordinate represented by "1+(m−1)×dx" and a Y coordinate represented by "4+(n−1)×dy." If a segmented region has a size of 5 rows and 5 columns, then, as illustrated in FIG. 19, the exposure pattern PB13 has a color array that is identical to the color array of the exposure pattern PB5 and a pattern of short exposure and long exposure that is inverse to the pattern of short exposure and long exposure of the exposure pattern PB5.

As illustrated in FIG. 19, the left upper end of the exposure pattern PB14 corresponds to a B pixel of short exposure. The coordinates of the left upper end of the exposure pattern PB14 include an X coordinate represented by "2+(m−1)×dx" and a Y coordinate represented by "4+(n−1)×dy." If a segmented region has a size of 5 rows and 5 columns, then, as illustrated in FIG. 19, the exposure pattern PB14 has a color array that is identical to the color array of the exposure pattern PB6 and a pattern of short exposure and long exposure that is inverse to the pattern of short exposure and long exposure of the exposure pattern PB6.

As illustrated in FIG. 19, the left upper end of the exposure pattern PB15 corresponds to a G pixel of long exposure. The coordinates of the left upper end of the exposure pattern PB15 include an X coordinate represented by "3+(m−1)×dx" and a Y coordinate represented by "4+(n−1)×dy." If a segmented region has a size of 5 rows and 5 columns, then, as illustrated in FIG. 19, the exposure pattern PB15 has a color array that is identical to the color array of the exposure pattern PB7 and a pattern of short exposure and long exposure that is inverse to the pattern of short exposure and long exposure of the exposure pattern PB7.

As illustrated in FIG. 19, the left upper end of the exposure pattern PB16 corresponds to a B pixel of long exposure. The coordinates of the left upper end of the exposure pattern PB16 include an X coordinate represented by "4+(m−1)×dx" and a Y coordinate represented by "4+(n−1)×dy." If a segmented region has a size of 5 rows and 5 columns, then, as illustrated in FIG. 19, the exposure pattern PB16 has a color array that is identical to the color array of the exposure pattern PB8 and a pattern or short exposure and long exposure that is inverse to the pattern of short exposure and long exposure of the exposure pattern PB8.

In such a manner, in a case where the exposure conditions of an image capturing region in its entirety are known, the exposure conditions of pixels included in a region of interest ROI can be fixedly established when information of the exposure condition and coordinates of a pixel at the left upper end of the region of interest ROI and the size of the region to be segmented is obtained. Therefore, when the video transmitting apparatus transmits information regarding the exposure conditions and coordinates of the pixels of each region of interest ROI and the size thereof as HDR information to the video receiving apparatus, the video receiving apparatus can perform an HDR rendering process on the regions of interest ROI.

It is assumed, for example, that each of the video transmitting apparatus and the video receiving apparatus has stored, in a nonvolatile storage device, the information that the image capturing section has an image capturing region having a color array according to the array example A, and the information of the left upper end of the exposure pattern PA1 and the information of the size of the region of interest ROI has been transmitted as HDR information from the video transmitting apparatus to the video receiving apparatus. On the basis of the HDR information, the video receiving apparatus can determine which one of the exposure patterns PA1 through PA8 illustrated in FIG. 17 is represented by the exposure conditions of the region of interest ROI. The video receiving apparatus performs an HDR rendering process based on the determined exposure conditions of the region of interest ROI. In this fashion, an HDR-rendered image is produced according to the HDR rendering process, as indicated on the right side of the thick arrow in FIG. 16.

Figure 20:
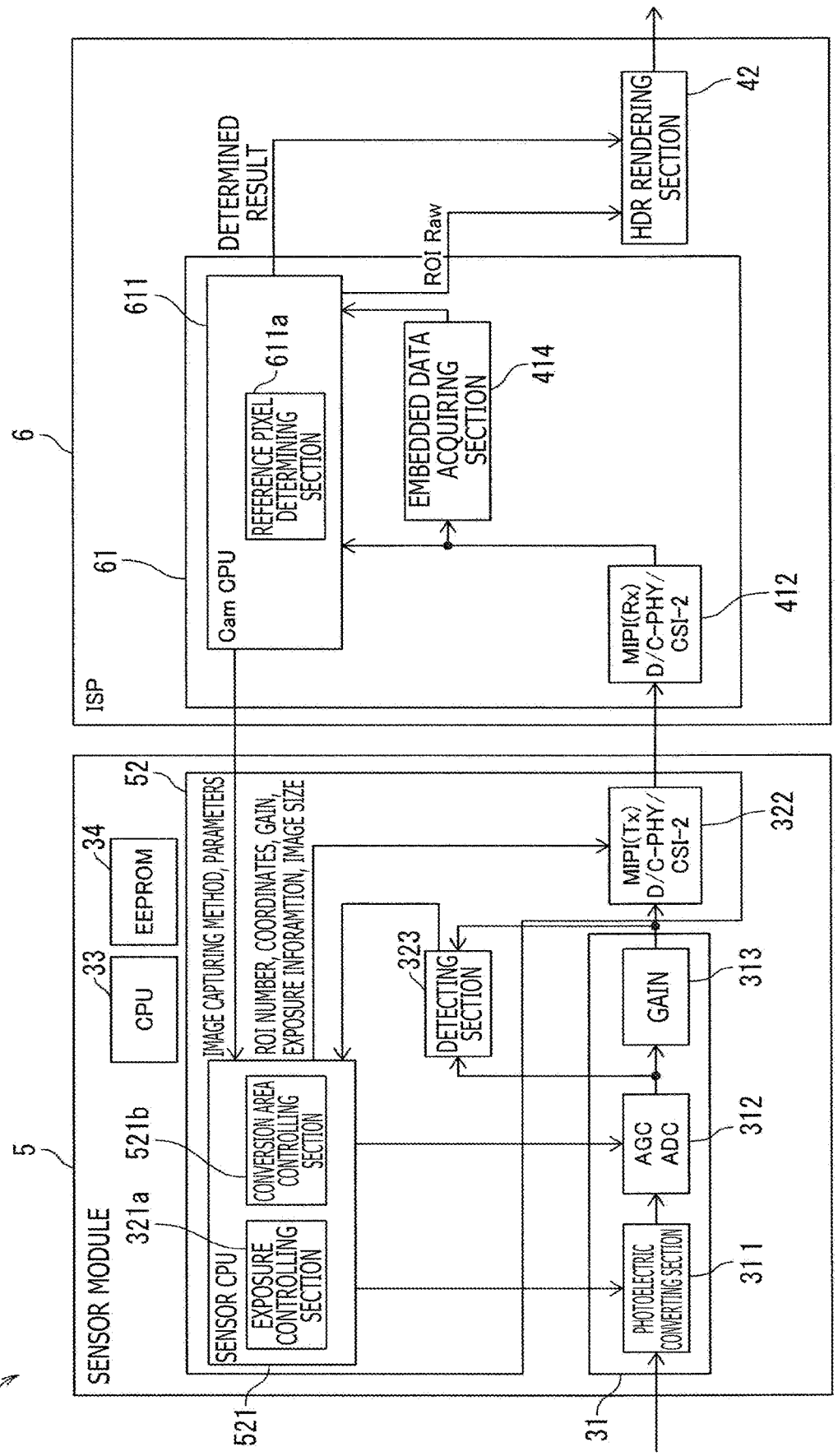
FIG. 20 is a block diagram illustrating a general makeup of a transmitting apparatus, a receiving apparatus, and a transmission system according to the second embodiment.

6. Apparatus and System According to a Second Embodiment of the Present Disclosure:

Next, a transmitting apparatus, a receiving apparatus, and a transmission system according to a second embodiment will be described below using FIGS. 20 and 21. First, a general makeup of the transmitting apparatus, the receiving apparatus, and the transmission system according to the present embodiment will be described below using FIG. 20. FIG. 20 is a block diagram illustrating a general makeup of the video transmitting apparatus 5, the video receiving apparatus 6, and the video transmission system 20 according to the present embodiment. Incidentally, those components that are identical in operation and function to those of the video transmitting apparatus 3, the video receiving apparatus 4, and the video transmission system 10 according to the first embodiment are denoted by identical reference characters, and will be omitted from description.

As illustrated in FIG. 20, a video transmitting apparatus 5 according to the present embodiment is similar in configuration to the video transmitting apparatus 3 according to the first embodiment except that the HDR information included in the embedded data is different in its content. A conversion area controlling section 521*b* provided in the video transmitting apparatus 5 is configured to acquire HDR information of a region of interest ROI. In a case where a plurality of regions of interest ROI is established, the conversion area controlling section 521*b* is configured to acquire HDR information of each of the regions of interest ROI. The conversion area controlling section 521*b* is configured to acquire, as HDR information, a single piece of information of one of the coordinates of a reference pixel, the size, and the exposure information of a region of interest ROI or combined information representing a combination of any two or more of the coordinates of the reference pixel, the size, and the exposure information of the region of interest ROI. The information of the size of a region of interest ROI includes information of the lengths respectively in the X-axis and Y-axis directions of the region of interest ROI.

The conversion area controlling section 521*b* is configured to acquire the exposure condition of a reference pixel (the pixel at the left upper end of a region of interest ROI according to the present embodiment) as exposure information. According co the present embodiment, the conversion area controlling section 521*b* is configured to acquire the coordinates of a left upper end of a region of interest ROI as an end of the region of interest ROI. However, information of either one of ends at four corners or information of any other locations may be used insofar as it can specify the position of a region of interest ROI and the exposure pattern of the region of interest ROI. In other words, a reference pixel that provides exposure information is sufficient to be a pixel that can be associated with the exposure conditions of all pixels of the image capturing region of the image capturing section 31. For example, in a case where the exposure patterns illustrated in FIGS. 17 and 19 are generated with respect to the right lower end of the region of interest ROI, the pixel at the right lower end becomes a pixel that can be associated with the exposure conditions of all pixels of the image capturing region of the image capturing section 31. In this case, therefore, the conversion area controlling section 521*b* determines the pixel at the right lower end of the region of interest ROI as a reference pixel and acquires the coordinates and exposure condition of the pixel.

The conversion area controlling section 321*b* outputs the size of the region of interest ROI, the coordinates of the reference pixel of the region of interest ROI, the exposure conditions thereof, and the value of a digital gain performed on the image data of the coordinates, which have been acquired, as HDR information, in association with the region number of the region of interest ROI, to the transmitting section 322. In a case where a plurality of regions of interest ROI is established, the conversion area controlling section 321*b* acquires HDR information of each of the regions of interest ROI and outputs the acquired HDR information to the transmitting section 322. The transmitting section 322 generates transmission data in which ROI information including the HDR information input from the conversion area controlling section 521*b* and other information are included is the embedded data, and sends out the generated transmission data to a video receiving apparatus 6.

A sensor CPU 521 is similar in configuration to, and is configured to perform the similar functions to, the sensor CPU 321 according to the first embodiment, except that the conversion area controlling section 521*b* is different in function. Moreover, a controlling section 52 is similar in configuration to, and is configured to perform the similar functions to, the controlling section 32 according to the first embodiment, except that the conversion area controlling section 521*b* is different in function. Consequently, the sensor CPU 521 and the controlling section 52 will be omitted from description.

As illustrated in FIG. 20, a Cam CPU 611 included in the video receiving apparatus 6 has a reference pixel determining section 611*a*. The reference pixel determining section 611*a* is configured to acquire the coordinates and exposure condition of a reference pixel of a region of interest ROI (the coordinates of a pixel at a left upper end of the region of interest ROI according to the present embodiment) and the size of the region of interest ROI (the lengths in the respective Z-axis and Y-axis directions) on the basis of the various pieces of information input from the embedded data acquiring section 414, and specify a pixel pattern (i.e., an exposure pattern) of the region of interest ROI. For example, the Cam CPU 411 stores, in its storage section, a plurality of exposure patterns as illustrated in FIGS. 17 and 19. The reference pixel determining section 611*a* specifies an exposure pattern of the region of interest ROI on the basis of the coordinates and exposure condition of the reference pixel of the region of interest ROI acquired from the various pieces of information input from the embedded data acquiring section 414 and the exposure patterns stored in the storage section of the Cam CPU 411.

A plurality of exposure patterns is stored in a storage section of the sensor CPU 521, and the video transmitting apparatus 5 may be configured to send out the exposure patterns together with the HDR information to the video receiving apparatus 6. Moreover, the conversion area controlling section 521*b* may be configured to select an exposure pattern based on the coordinates and exposure pattern of the reference pixel of the region of interest ROI. Furthermore, both the sensor CPU 521 and the Cam CPU 611 may have a plurality of exposure patterns in association with pattern numbers. In this case, the video transmitting apparatus 5 may send out the pattern number of an exposure pattern that the conversion area controlling section 521*b* has selected on the basis of the coordinates and exposure pattern of the reference pixel of the region of interest ROI, to the video receiving apparatus 6.

The reference pixel determining section 611*a* outputs an HDR instruction signal including the coordinates and exposure pattern of the reference pixel of the region of interest ROI determined on the basis of the HDR information input from the embedded data acquiring section 414, the exposure pattern and the region number of the region of interest ROI, and the instruction information that instructs the execution of the HDR rendering process, to the HDR rendering section 42. In a case where the reference pixel determining section 611*a* has failed to determine the coordinates and exposure pattern of the reference pixel of the region of interest ROI on the basis of the HDR information input from the embedded data acquiring section 414, the Cam CPU 411 outputs an HDR instruction signal including instruction information that instructs the non-execution of the HDR rendering process to the HDR rendering section 42.

In a case where the HDR rendering section 42 has received an HDR instruction signal including instruction information instructing the execution of the HDR rendering process, the HDR rendering section 42 reads the image data of the region numbers of the regions of interest ROI included in the HDR instruction signal from the Cam CPU 611, and generates an HDR-rendered image using the read image data.

The Cam CPU 611 is similar in configuration to, and is configured to perform the similar functions to, the Cam CPU 411 according to the first embodiment except that the Cam CPU 611 has the reference pixel determining section 611*a*. A controlling section 61 is similar in configuration to, and is configured to perform the similar functions to, the controlling section 41 according to the first embodiment except that the Cam CPU 411 has the reference pixel determining section 611*a* and does not have the storage section 413. Therefore, the Cam CPU 611 and the controlling section 61 will be omitted from description.

(High Dynamic Range Rendering Process)

Next, a demosaicing process in the transmitting apparatus, the receiving apparatus, and the transmission system according to the present embodiment will be describe below using FIG. 21 with reference to FIG. 20. FIG. 21 is a flowchart illustrating an example of sequence of the high dynamic range rendering process in the transmitting apparatus, the receiving apparatus, and the transmission system according to the present embodiment.

(Step S51)

Figure 21:
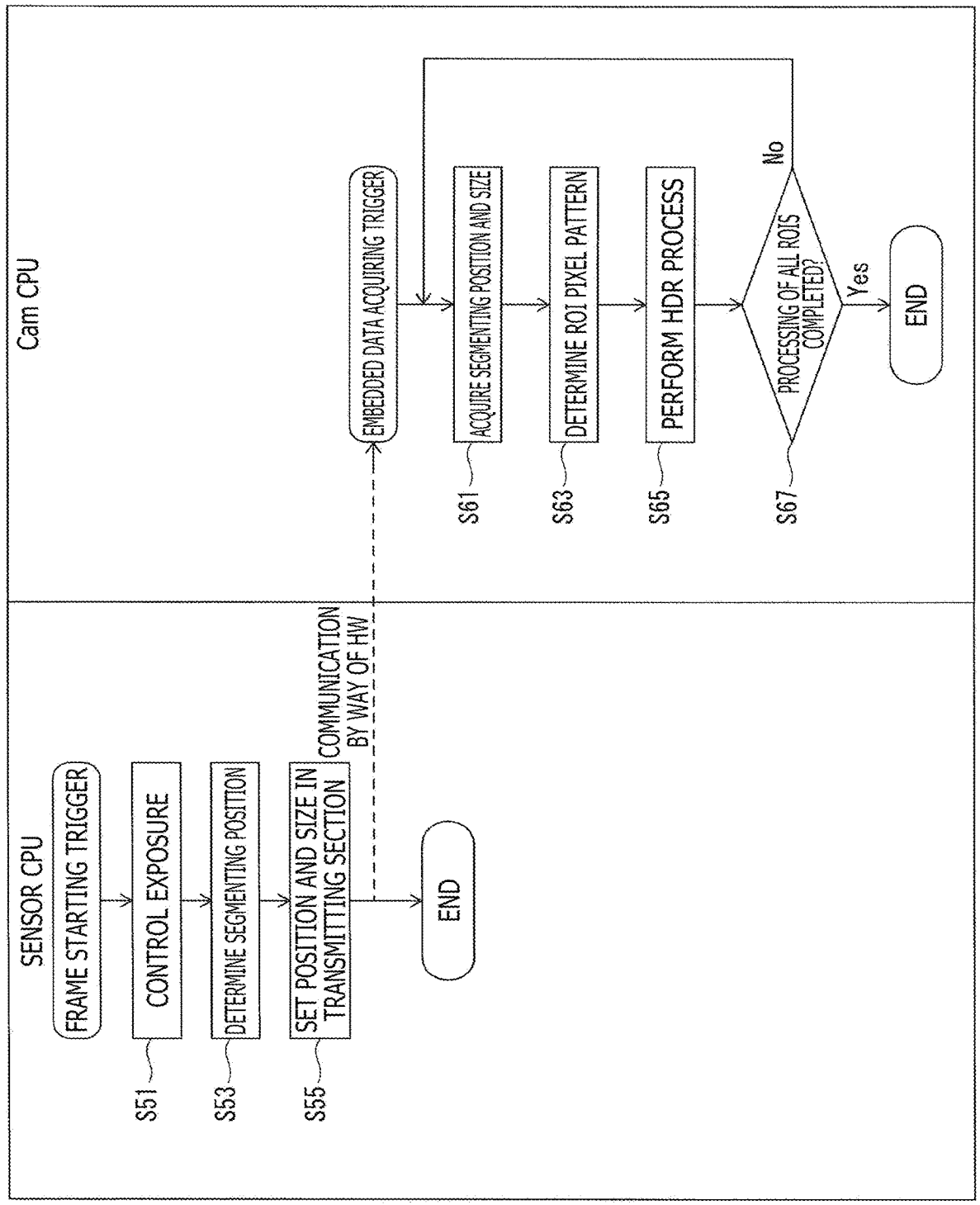
FIG. 21 is a flowchart illustrating an example of sequence of the high dynamic range rendering process in the transmitting apparatus, the receiving apparatus, and the transmission system according to the second embodiment.

As illustrated in FIG. 21, in a case where the sensor CPU 521 included in the video transmitting apparatus 5 detects a frame starting trigger and image capturing in a high dynamic range has been determined, the sensor CPU 521 initially establishes exposure conditions for controlling the exposure in the image capturing section 31, and then goes to the processing of step S53. The sensor CPU 521 establishes a plurality of exposure conditions based on detected information input from the detecting section 323. Moreover, the sensor CPU 521 establishes the exposure conditions as including reference exposure conditions.

(Step S53)

The sensor CPU 521 determines a segmenting position for segmenting an image from the image capturing region of the image capturing section 31 and goes to the processing of step S55. In step S53, the sensor CPU 521 determines the segmenting position, i.e., the coordinates of a reference pixel of a region of interest ROI (the coordinates of a left upper end of a region of interest ROI according to the present embodiment), and an image size (lengths in the X-axis direction and the Y-axis direction) thereof. Moreover, the sensor CPU 521 sets information where the exposure condition and digital gain of the determined reference pixel of the region of interest ROI are associated with the region number of the region of interest ROI, as HDR information in the embedded data. The sensor CPU 521 acquires HDR information per frame input from the image capturing section 31 and sets the acquired HDR information is the embedded data.

(Step S55)

The sensor CPU 521 sets transmission data including the embedded data where the HDR information and various other pieces of information are set in the transmitting section 322, whereupon the HDR rendering process is ended.

The transmission data set in step S55 is transmitted from the video transmitting apparatus 5 to the video receiving apparatus 6 by way of communication through hardware (HW) using MIPI.

The receiving section 412 included in the video receiving apparatus 6 extracts the embedded data from the received transmission data and outputs the embedded data to the embedded data acquiring section 414. The embedded data acquiring section 414 decodes the embedded data input from the receiving section 412, acquires various pieces of information (for example, the number of regions of interest ROI, the region numbers and priority of the regions of interest ROI, the data lengths of the regions of interest ROI, the image format of the regions of interest ROI, etc.), and outputs the acquired various pieces of information to the Cam CPU 611.

(Step S61)

The Cam CPU 611, triggered by the timing at which the embedded data are decoded by the embedded data acquiring section 414, acquires the coordinates (position and size) of a region of interest ROI whose priority is highest on the basis of the various pieces of information acquired and input by the embedded data acquiring section 414 from the transmission data received by the receiving section 412, and then goes to the processing of step S63. Moreover, in step S61, the Cam CPU 611 acquires the segmenting position and size (i.e., the coordinates of the reference pixel, the length in the X-axis direction, and the length in the Y-axis direction) of the region of interest ROI whose priority is highest on the basis of the HDR information included in the various pieces of information.

(Step S63)

The Cam CPU 611 determines a pixel pattern (i.e., exposure pattern) of the region of interest ROI on the basis of the acquired coordinates of the reference pixel of the region of interest ROI, and then goes to the processing of step S65.

(Step S65)

The Cam CPU 611 outputs an HDR instruction signal including the region number of the region of interest ROI, the coordinates and exposure pattern of the reference pixel of the region of interest ROI, the value of the digital gain, and instruction information that instructs the execution of the HDR rendering process to the HDR rendering section 42, and goes to the processing of step S67.

On the basis of the HDR instruction signal input from the Cam CPU 611, the HDR rendering section 42 reads the image data of the region of interest ROI from the Cam CPU 611 and performs the HDR rendering process on the dread image data.

(Step S67)

The Cam CPU 611 determines whether or not the processing of steps S61 through S65 has been performed on all the regions of interest ROI input from the embedded data acquiring section 414. If the Cam CPU 611 determines that the processing has been performed on all the regions of interest ROI (Yes), then the Cam CPU 611 ends the HDR rendering process. On the other hand, if the Cam CPU 611 determines that the processing has not been performed on all the regions of interest ROI (No), then the Cam CPU 611 goes back to the processing of step S61. The Cam CPU 611 repeats the processing from step S61 to step S67 until the HDR rendering process is completed on all the regions of interest ROI.

As described above, the transmitting apparatus, the receiving apparatus, and the transmission system according to the present embodiment can perform the high dynamic range rendering process on some regions of interest (ROI) segmented from a captured image.

Moreover, the transmitting apparatus, the receiving apparatus, and the transmission system according to the present embodiment can perform a high dynamic range rendering process on each region of interest ROI even if different exposure conditions are mixedly present in the pixels that make up the image capturing region of the image capturing section.

Moreover, the transmitting apparatus, the receiving apparatus, and the transmission system according to the present embodiment can perform high dynamic range rendering on a partial image representing a segmented object specified as an imaging target without transmitting a captured image in its entirety. Since the transmitting apparatus, the receiving apparatus, and the transmission system according to the present embodiment can thus reduce the processing load according to high dynamic range rendering, they can reduce electric power consumption. Furthermore, long and short exposure in the transmitting apparatus, the receiving apparatus, and the transmission system according to the present embodiment can be countermeasures against flickering.

As with Modification 1 and Modification 2 described above, the transmitting apparatus, the receiving apparatus, and the transmission system according to the present embodiment can have at least one of the ROI conformity determining section 411*a* and the HDR rendering section 42, though not described in detail. The transmitting apparatus, the receiving apparatus, and the transmission system according to the present embodiment can offer the similar advantages to those of the transmitting apparatus, the receiving apparatus, and the transmission system according to Modification 1 and Modification 2.

The present disclosure is not limited to the above embodiments, but can be modified in various ways.

The video receiving apparatus 4 according to the first embodiment is configured such that the ROI conformity determining section 411*a* provided in the Cam CPU 411 performs the determination of conformity between regions of interest ROI in frames. However, the present disclosure is not limited to such details. For example, the ROI conformity determining section may be hardware-implemented.

The video receiving apparatus 6 according to the second embodiment is configured such that the reference pixel determining section 611*a* provided in the Cam CPU 611 performs a process of determining the coordinates of a reference pixel of a region of interest ROI and a process of determining an exposure pattern thereof. However, the present disclosure is not limited to such details. For example, the reference pixel determining section may be hardware-implemented.

The first and second embodiments have been described with respect to an example in which an object to be segmented is of a rectangular shape. However, the present disclosure is also applicable to an object to be segmented that is not of a rectangular shape. For example, the video transmitting apparatuses 3 and 5, as with Technology 2, may be configured to send out the positional information and HDR information of an object with the information included in the payload per pixel row to the video receiving apparatuses 4 and 6.

The present disclosure has been described above with respect to the presupposed technologies, the embodiments, and the modifications. However, the present disclosure is not limited to the above embodiments, etc., but various changes and modifications may be made therein. Incidentally, the advantages set forth in the present description are given by way of illustrative example only. The advantages of the present disclosure are not limited to those set forth in the present description. The present disclosure may have other advantages than the advantages set forth in the present description.

Furthermore, the present disclosure may have the following arrangements, for example:

(1)

A transmitting apparatus including:
  a controlling section that controls acquisition of high dynamic range information as information for use in high dynamic range rendering of image data of a ROI (Region of interest), and
  a transmitting section that sends out the image data of the ROI as payload data and sends out ROI information as embedded data.

(2)

The transmitting apparatus according to (1), in which the high dynamic range information is included in ROI information and sent out from the transmitting section.

(3)

The transmitting apparatus according to (1) or (2), in which the controlling section acquires, as the high dynamic range information, a single piece of information of any one of coordinates of an end, a size, and exposure information of the ROI or combined information representing a combination of any two or more of the coordinates of the end, the size, and the exposure information of the ROI.

(4)

The transmitting apparatus according to (3), in which the controlling section acquires the high dynamic range information of two successive frames.

(5)

The transmitting apparatus according to (4), in which the controlling section decides whether or not the ROIs of the respective two frames are in conformity with each other on the basis of the single piece of information or the combined information of the ROI of each of the two frames where pieces of identifying information of the ROIs are in conformity with each other and that are successive.

(6)

The transmitting apparatus according to (5), in which the transmitting section includes information regarding a result of the decision by the controlling section as to whether or not the ROIs in the respective two frames are in conformity with each other and information associated with the identifying information of the ROIs in the ROI information, and sends out the ROI information.

(7)

The transmitting apparatus according to (5), further including:

a processing section that performs the high dynamic range rendering on the image data of the ROI on the basis of the exposure information in a case where the controlling section decides that the ROIs in the respective two frames are in conformity with each other, and that does not perform the high dynamic range rendering on the image data of the ROI in a case where the controlling section decides that the ROIs in the respective two frames are not in conformity with each other, in which the transmitting section includes the image data rendered by the high dynamic range rendering in the processing section in the ROI information and sends out the ROI information.

(8)

The transmitting apparatus according to any one of (1) through (7), in which the transmitting section sends out a signal according to MIPI (Mobile Industry Processor Interface) D-PHY standards, MIPI C-PHY standards, or MIPI CSI (Camera Serial Interface)-2 standards.

(9)

A receiving apparatus including:
  a receiving section that receives a transmission signal including image data of a ROI (Region Of Interest) in payload data and including ROI information in embedded data;
  a controlling section that controls extraction of high dynamic range information as information for use in high dynamic range rendering of the image data of the ROI from the transmission signal received by the receiving section; and
  a processing section that processes the high dynamic range rendering of the image data of the ROI using the high dynamic range information extracted by the controlling section.

(10)

The receiving apparatus according to (9), in which the controlling section extracts the high dynamic range information from the ROI information included in the transmission signal.

(11)

The receiving apparatus according to (9) or (10), in which the controlling section extracts, as the high dynamic range information, a single piece of information of any one of coordinates of an end, a size, and exposure information of the ROI or combined information representing a combination of any two or more of the coordinates of the end, the size, and the exposure information of the ROI.

(12)

The receiving apparatus according to (11), in which the controlling section extracts the high dynamic range information of two successive frames.

(13)

The receiving apparatus according to (12), in which the controlling section decides whether or not the ROIs of the respective two frames are in conformity with each other on the basis of the single piece of information or the combined information of the ROI of each of the two frames where pieces of identifying information of the ROIs are in conformity with each other and that are successive.

(14)

The receiving apparatus according to (12), in which, in a case where a difference between the coordinates of the ends of the ROIs and a difference between the sizes of the ROIs in the two frames where pieces of identifying information of the ROIs are in conformity with each other and that are successive are equal to or smaller than respective predetermined threshold values, the processing section performs the high dynamic range rendering on the image data of the ROIs on the basis of the exposure information.

(15)

The receiving apparatus according to (12) or (14), in which, in a case where a difference between the coordinates of the ends of the ROIs and a difference between the sizes of the ROIs in the two frames where pieces of identifying information of the ROIs are in conformity with each other and that are successive are larger than respective predetermined threshold values, the processing section does not perform the high dynamic range rendering on the image data of the ROIs.

(16)

The receiving apparatus according to (13), in which the receiving section receives the transmission signal including information regarding a result of the decision as to whether or not the ROIs in the respective two frames are is conformity with each other and the ROI information having information associated with the identifying information of the ROIs.

(17)

The receiving apparatus according to any one of (9) through (16), in which the receiving section receives a signal according to MIPI (Mobile industry Processor Interface) D-PHY standards, MIPI C-PHY standards, or MIPI CSI (Camera Serial Interface)-2 standards.

(18)

A transmission system including:
  a transmitting apparatus including a controlling section that controls acquisition of high dynamic range information as information for use in high dynamic range rendering of image data of a ROI (Region of Interest), and a transmitting section that sends out the image data of the ROI as payload data and sends out ROI information as embedded data; and
  a receiving apparatus including a receiving section that receives a transmission signal including the image data of the ROI in the payload data and including the ROI information in the embedded data, a controlling section that controls extraction of the high dynamic range information as information for use in the high dynamic range rendering of the image data of the ROI from the transmission signal received by the receiving section, and a processing section that processes the high dynamic range rendering of the image data of the ROI using the high dynamic range information extracted by the controlling section.

It will be understood that those skilled in the art can anticipate various corrections, combinations, sub-combinations, and changes depending on design requirements and other factors as failing within the scope of attached claims and the scope of their equivalents.

REFERENCE SIGNS LIST 1, 10, 20: Video transmission system
3, 5, 100: Video transmitting apparatus
4, 6, 200: Video receiving apparatus
31, 110: Image capturing section
32, 33, 41, 52, 61: Controlling section
34: Nonvolatile storage section
42: HDR rendering section
100A: CSI transmitter
100B: CCI slave
111: Captured image
112, 112a1, 112a2, 112a3, 112a4, 112b1, 112b4, 123a4, 223A: ROI image 112b: Compressed image data
113, 114: Positional information
115: Priority
116, 116a1, 116a2: Transmission image
118: Image
120, 130: Image processing section
120A, 120A1, 120A2, 130A, 147B: Compressed image data
120B: ROI information
120C: Frame information
121: ROI segmenting section
122: ROI analyzing section
123: Detecting section
124: Priority setting section
125, 131: Encoding section
126: Image processing controlling section
140: Transmitting section
141: LINK controlling section
142: ECC generating section
143: PH generating section
144: EBD buffer
145: ROI data buffer
146: Normal image data buffer
147: Combining section
147A: Transmission data
200A: CSI receiver
200B: CCI master
210: Receiving section
211: Header separating section
212: Header interpreting section
213: Payload separating section
214: EBD interpreting section
214A: EBD data
215: ROI data separating section
215A, 215B: Payload data
220: Information processing section
221: Information extracting section
221A: Extracted information
222: ROI decoding section
222A: Image data
223: ROI image generating section
224: Normal image decoding section
224A: Normal image
311: Photoelectric converting section
312: Signal converting section
313: Amplifying section
321, 521: Sensor CPU.
321a: Exposure controlling section
321b: Conversion area controlling section
322: Transmitting section
411, 611: Cam CPU
411a: ROI conformity determining section
412: Receiving section
413: Storage section
414: Embedded data acquiring section
521: Sensor CPU
CCI: Camera control interface
CL: Clock lane
The invention claimed is:
1. A transmitting apparatus comprising:
a controlling circuit that controls acquisition of high dynamic range information as information for use in high dynamic range rendering of image data of a ROI (Region of Interest);
and a transmitting circuit that sends out the image data of the ROI as payload data and sends out ROI information as embedded data.

2. The transmitting apparatus according to claim 1, wherein
the high dynamic range information is included in ROI information and sent out from the transmitting circuit.

3. The transmitting apparatus according to claim 1, wherein
the controlling circuit acquires, as the high dynamic range information, a single piece of information of any one of coordinates of an end, a size, and exposure information of the ROI or combined information representing a combination of any two or more of the coordinates of the end, the size, and the exposure information of the ROI.

4. The transmitting apparatus according to claim 3, wherein
the controlling circuit acquires the high dynamic range information of two successive frames.

5. The transmitting apparatus according to claim 4, wherein
the controlling circuit decides whether or not the ROIs of the respective two frames are in conformity with each other on a basis of the single piece of information or the combined information of the ROI of each of the two frames where pieces of identifying information of the ROIs in conformity with each other and that are successive.

6. The transmitting apparatus according to claim 5, wherein
the transmitting circuit includes information regarding a result of the decision by the controlling circuit as to whether or not the ROIs in the respective two frames are in conformity with each other and information associated with the identifying information of the ROIs in the ROI information, and sends out the ROI information.

7. The transmitting apparatus according to claim 5, further comprising:
a processing circuit that performs the high dynamic range rendering on the image data of the ROI on a basis of the exposure information is a case where the controlling circuit decides that the ROIs in the respective two frames are in conformity with each other, and that does not perform the high dynamic range rendering on the image data of the ROI in a case where the controlling circuit decides that the ROIs in the respective two frames are not in conformity with each other, wherein
the transmitting circuit includes the image data rendered by the high dynamic range rendering in the processing circuit in the ROI information and sends out the ROI information.

8. The transmitting apparatus according to claim 1, wherein
the transmitting circuit sends out a signal according to MIPI (Mobile Industry Processor Interface) D-PHY standards, MIPI C-PHY standards, or MIPI CSI (Camera Serial Interface)-2 standards.

9. A receiving apparatus comprising:
a receiving circuit that receives a transmission signal including image data of a ROI (Region Of Interest) in payload data and including ROI information in embedded data;
a controlling circuit that controls extraction of high dynamic range information as information for use in high dynamic range rendering of the image data of the ROI from the transmission signal received by the receiving circuit; and a processing circuit that processes the high dynamic range rendering of the image data of the ROI using the high dynamic range information extracted by the controlling circuit.

10. The receiving apparatus according to claim 9, wherein the controlling circuit extracts the high dynamic range information from the ROI information included in the transmission signal.

11. The receiving apparatus according to claim 9, wherein the controlling circuit extracts, as the high dynamic range information, a single piece of information of any one of coordinates of an end, a size, and exposure information of the ROI or combined information representing a combination of any two or more of the coordinates of the end, the size, and the exposure information of the ROI.

12. The receiving apparatus according to claim 11, wherein
the controlling circuit extracts the high dynamic range information of two successive frames.

13. The receiving apparatus according to claim 12, wherein
the controlling circuit decides whether or not the ROIs of the respective two frames are in conformity with each other on a basis of the single piece of information or the combined information of the ROI of each of the two frames where pieces of identifying information of the ROIs are is conformity with each other and that are successive.

14. The receiving apparatus according to claim 12, wherein,
in a case where a difference between the coordinates of the ends of the ROIs and a difference between the sizes of the ROIs in the two frames where pieces of identifying information of the ROIs are in conformity with each other and that are successive are equal to or smaller than respective predetermined threshold values, the processing circuit performs the high dynamic range rendering on the image data of the ROIs on a basis of the exposure information.

15. The receiving apparatus according to claim 12, wherein,
in a case where a difference between the coordinates of the ends of the ROIs and a difference between the sizes of the ROIs in the two frames where pieces of identifying information of the ROIs are in conformity with each other and that are successive are larger than respective predetermined threshold values, the processing circuit does not perform the high dynamic range rendering on the image data of the ROIs.

16. The receiving apparatus according to claim 13, wherein
the receiving circuit receives the transmission signal including information regarding a result of the decision as to whether or not the ROIs in the respective two frames are in conformity with each other and the ROI information having information associated with the identifying information of the ROIs.

17. The receiving apparatus according to claim 9, wherein
the receiving circuit receives a signal according to MIPI (Mobile Industry Processor Interface) D-PHY standards, MIPI C-PHY standards, or MIPI CSI (Camera Serial Interface)-2 standards.

18. A transmission system comprising:
a transmitting apparatus including a controlling circuit that controls acquisition of high dynamic range information as information for use in high dynamic range rendering of image data of a ROI (Region of Interest), and a transmitting circuit that sends out the image data of the ROI as payload data and sends out ROI information as embedded data; and
a receiving apparatus including a receiving circuit that receives a transmission signal including the image data of the ROI in the payload data and including the ROI information in the embedded data, a controlling circuit that controls extraction of the high dynamic range information as information for use in the high dynamic range rendering of the image data of the ROI from the transmission signal received by the receiving circuit, and a processing circuit that processes the high dynamic range rendering of the image data of the ROI using the high dynamic range information extracted by the controlling circuit.

* * * * *